(12) United States Patent
Rudduck et al.

(10) Patent No.: US 7,610,783 B2
(45) Date of Patent: Nov. 3, 2009

(54) FASTENERS AND OTHER ASSEMBLIES

(75) Inventors: Dickory Rudduck, Chicago, IL (US); Lachlan Richard Goldspink, Chicago, IL (US); Nicholas Anthony Ng, Chicago, IL (US); Lee David Blattmann, Wilmette, IL (US); Joshua Robert Park, Sydney (AU); Christopher Gerarh Kelliher, Chicago, IL (US); Edward David Farren-Price, Chicago, IL (US)

(73) Assignee: Telezygology Inc., Chicago, IL (US)

( * ) Notice: Subject to any disclaimer, the term of this patent is extended or adjusted under 35 U.S.C. 154(b) by 111 days.

(21) Appl. No.: 10/579,583

(22) PCT Filed: Nov. 17, 2004

(86) PCT No.: PCT/AU2004/001580

§ 371 (c)(1),
(2), (4) Date: May 17, 2006

(87) PCT Pub. No.: WO2005/047714

PCT Pub. Date: May 26, 2005

(65) Prior Publication Data

US 2007/0071575 A1  Mar. 29, 2007

(30) Foreign Application Priority Data

| Nov. 17, 2003 | (AU) | ................................ 2003906324 |
| Mar. 16, 2004 | (AU) | ................................ 2004901371 |
| May 13, 2004 | (WO) | ............... PCT/AU2004/000623 |
| Jul. 14, 2004 | (AU) | ................................ 2004903861 |
| Aug. 13, 2004 | (AU) | ................................ 2004904582 |
| Sep. 20, 2004 | (AU) | ................................ 2004905399 |

(51) Int. Cl.
*A44B 21/00* (2006.01)
*E05B 47/00* (2006.01)
(52) U.S. Cl. .............................. 70/277; 24/602; 24/603
(58) Field of Classification Search ...................... None
See application file for complete search history.

(56) References Cited

U.S. PATENT DOCUMENTS

| 3,416,823 | A | | 12/1968 | Ulrich |
| 4,117,701 | A | * | 10/1978 | Del Mei ........................ 70/150 |
| 4,772,112 | A | | 9/1988 | Zider |
| 5,120,175 | A | | 6/1992 | Arbesgast et al. |

(Continued)

FOREIGN PATENT DOCUMENTS

DE  19649739  6/1998

(Continued)

*Primary Examiner*—Jack W. Lavinder
(74) *Attorney, Agent, or Firm*—Heather A. Kartsounes

(57) ABSTRACT

The invention discloses several types of fastener, fastening systems, fastener assemblies and related areas.

In particular, the invention discloses a releasable fastening system (150) which has a pin (152) with a locking cavity (163). The pin is intended for insertion in an aperture (154). A locking means (158, 160) engages the locking cavity (163) of the pin (152) when the pin (152) is received in the aperture (154). The system (150) also includes unlocking means (162) which includes material adapted to contract when activated. When a material contracts, engagement means (158) included in the locking means (158, 160), disengage the locking cavity (154).

15 Claims, 46 Drawing Sheets

U.S. PATENT DOCUMENTS

| | | | |
|---|---|---|---|
| 5,129,753 | A | 7/1992 | Wesley et al. |
| 5,160,233 | A | 11/1992 | McKinnis |
| 5,193,929 | A | 3/1993 | Kahn |
| 5,212,751 | A | 5/1993 | Brownjohn |
| 5,248,233 | A | 9/1993 | Webster |
| 5,312,152 | A | 5/1994 | Woebkenberg, Jr. et al. |
| 5,456,243 | A | 10/1995 | Jones |
| 5,536,126 | A | 7/1996 | Gross |
| 5,618,066 | A * | 4/1997 | Fu-Hsiang .................... 292/62 |
| 5,630,671 | A | 5/1997 | Larson |
| 5,722,709 | A | 3/1998 | Lortz et al. |
| 5,771,742 | A | 6/1998 | Bokaie et al. |
| 6,008,992 | A * | 12/1999 | Kawakami ................... 361/726 |
| 6,126,115 | A | 10/2000 | Carrier et al. |
| 6,175,989 | B1 | 1/2001 | Carpenter et al. |
| 6,287,039 | B1 | 9/2001 | Leconte et al. |
| 6,321,654 | B1 | 11/2001 | Robinson |
| 6,349,767 | B2 | 2/2002 | Gissler |
| 6,398,450 | B1 | 6/2002 | Jarvis |
| 6,422,797 | B2 | 7/2002 | Pas |
| 6,450,064 | B1 | 9/2002 | Christiansen et al. |
| 6,467,987 | B1 | 10/2002 | Larsen et al. |
| 6,474,702 | B1 | 11/2002 | Malone et al. |
| 6,494,822 | B1 | 12/2002 | Hopkins |
| 6,508,437 | B1 | 1/2003 | Davis et al. |
| 6,530,718 | B2 | 3/2003 | Nygren et al. |
| 6,543,976 | B1 | 4/2003 | Malofsky et al. |
| 6,585,442 | B2 | 7/2003 | Brei et al. |
| 6,646,240 | B2 | 11/2003 | Jarvis |
| 6,712,542 | B2 | 3/2004 | Buder |
| 6,760,211 | B2 | 7/2004 | Ruiz et al. |
| 6,769,830 | B1 | 8/2004 | Nygren |
| 6,779,955 | B2 | 8/2004 | Rivin |
| 6,780,042 | B1 | 8/2004 | Badescu et al. |
| 6,871,519 | B2 * | 3/2005 | Butera et al. .................. 70/256 |
| 7,017,345 | B2 * | 3/2006 | Von Behrens et al. ......... 60/527 |
| 7,331,616 | B2 * | 2/2008 | Brei et al. .................... 292/100 |
| 7,380,843 | B2 * | 6/2008 | Alacqua et al. ............. 292/163 |
| 7,406,846 | B2 * | 8/2008 | Chu ......................... 70/278.7 |
| 2002/0050045 | A1 | 5/2002 | Chiodo et al. |
| 2002/0102130 | A1 | 8/2002 | Nygren et al. |
| 2002/0137390 | A1 | 9/2002 | Jarvis |
| 2004/0104580 | A1 | 6/2004 | Spiessel et al. |
| 2004/0247386 | A1 | 12/2004 | Sugiyama et al. |

FOREIGN PATENT DOCUMENTS

| | | |
|---|---|---|
| EP | 0402263 | 9/1993 |
| EP | 1115982 | 3/2000 |
| EP | 111 5615 | 7/2001 |
| EP | 1191271 | 3/2002 |
| FR | 2684141 | 5/1993 |
| JP | 02-038706 | 2/1990 |
| JP | 2001-015956 | 1/2001 |
| WO | WO 99/47819 | 9/1999 |
| WO | WO/ 02/07971 | 1/2002 |
| WO | WO 02/074612 | 9/2002 |
| WO | WO 2004/001235 | 12/2003 |
| WO | WO 2004/010011 | 1/2004 |
| WO | WO 2004/046568 | 6/2004 |
| WO | WO/2004/085860 | 7/2004 |
| WO | WO 2004/082444 | 9/2004 |
| WO | WO 2004/101216 | 11/2004 |
| WO | WO 2005/007584 | 8/2005 |

* cited by examiner

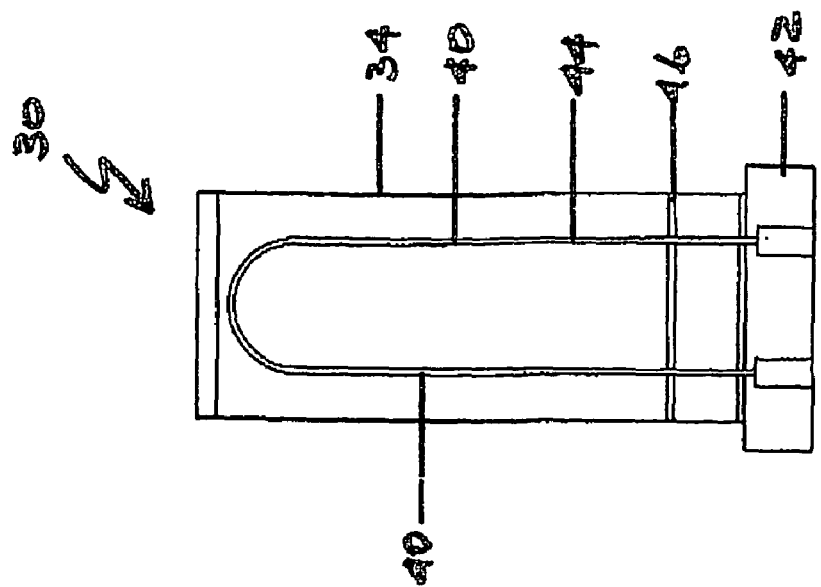
Figure 3
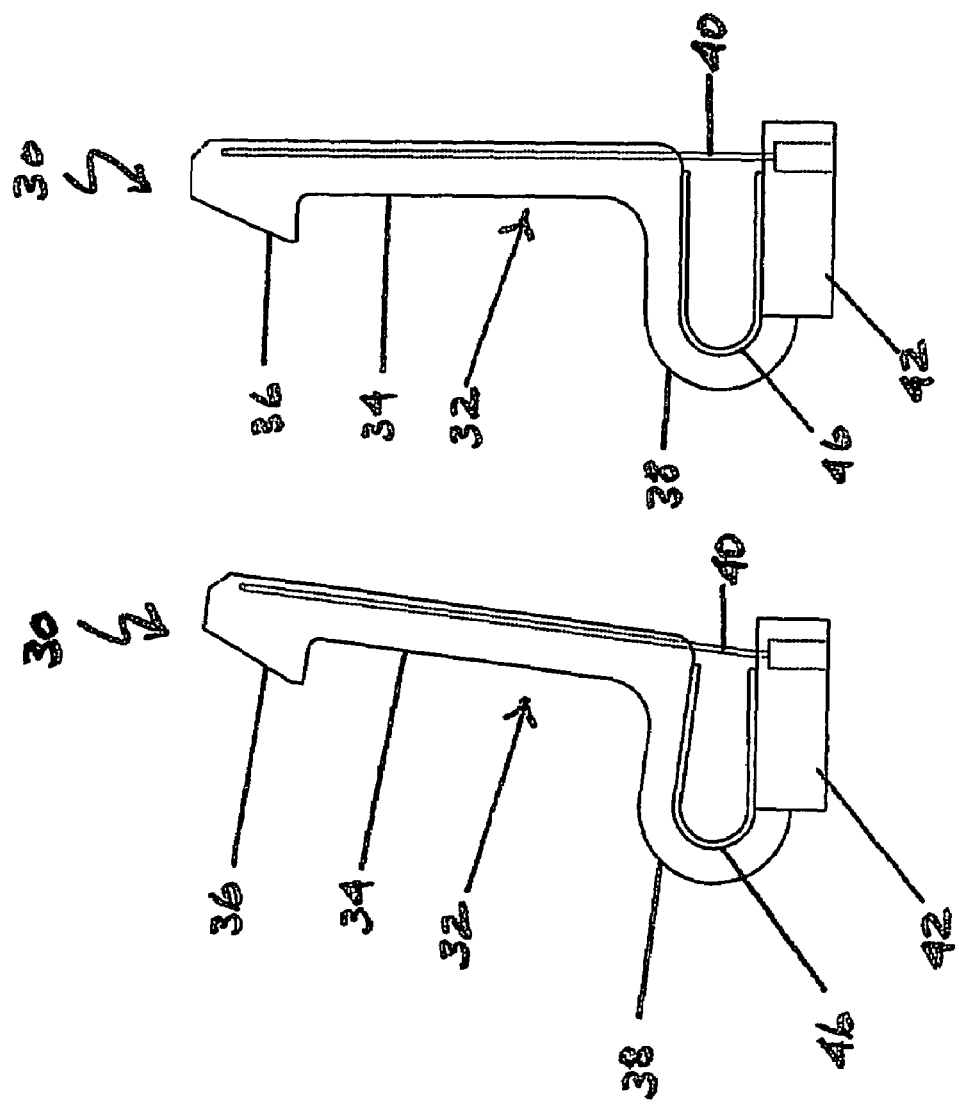
Figure 1
Figure 2

Figure 5
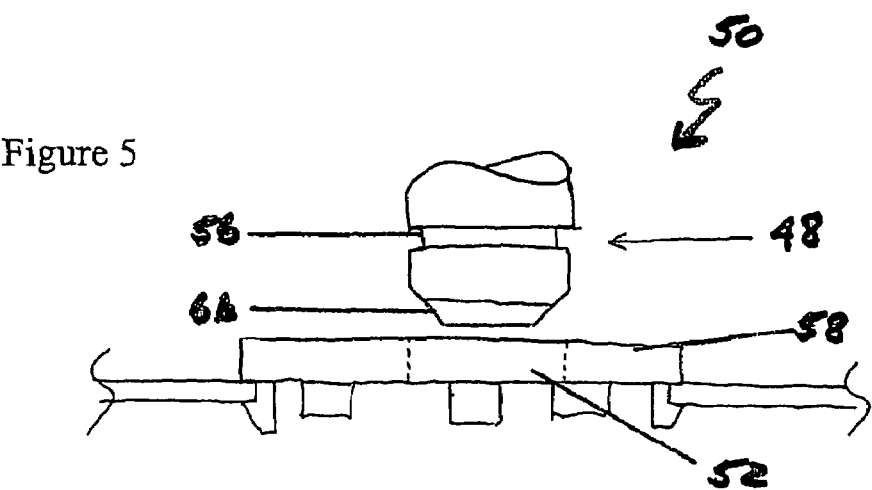
Figure 7
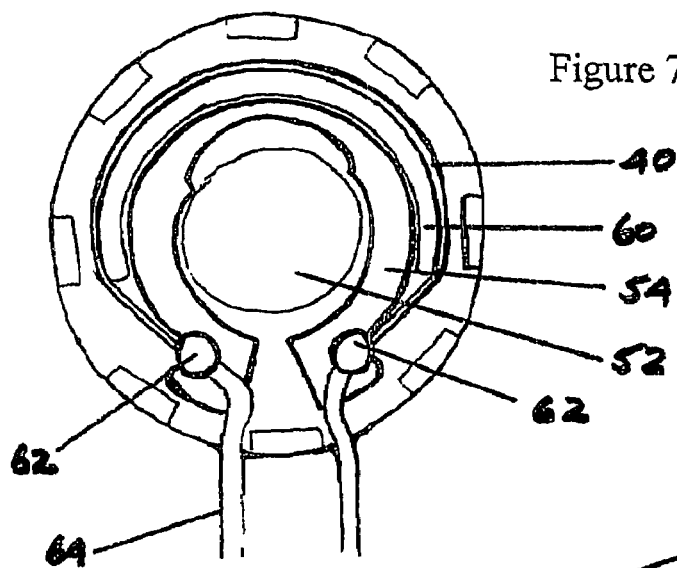
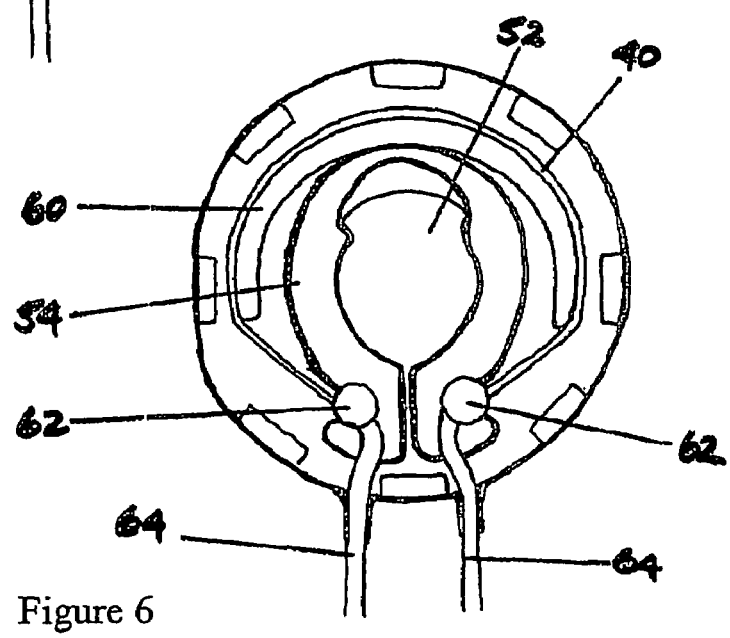
Figure 6

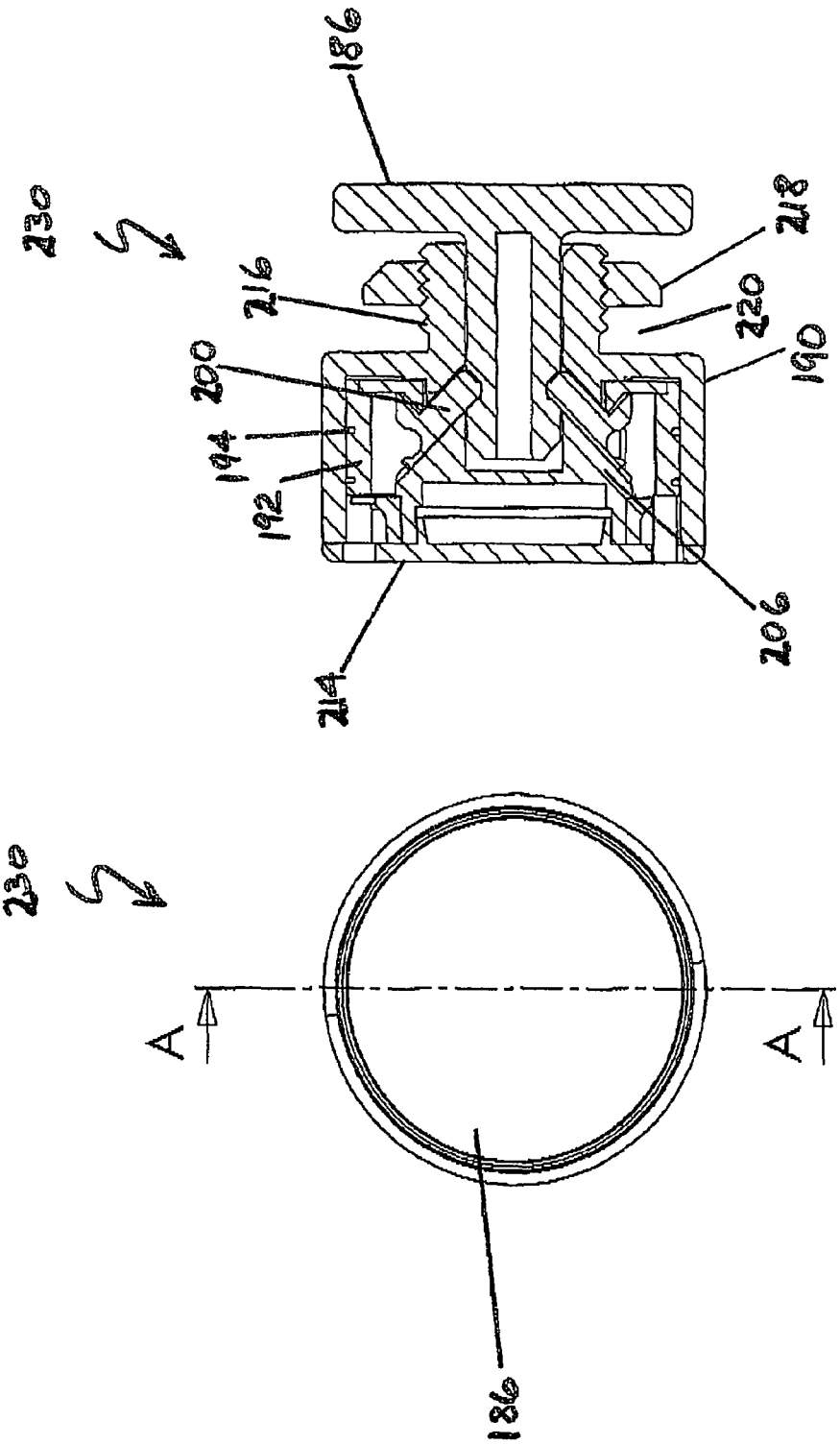

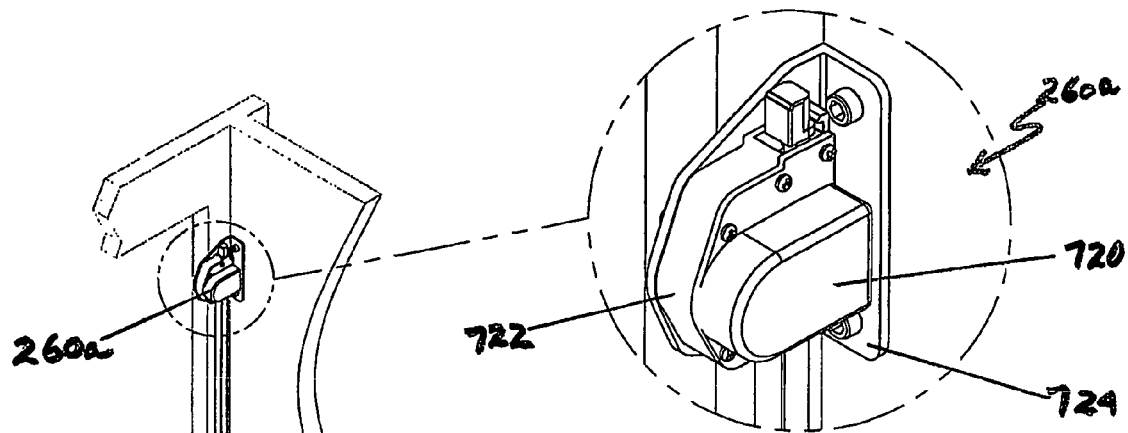
Figure 39
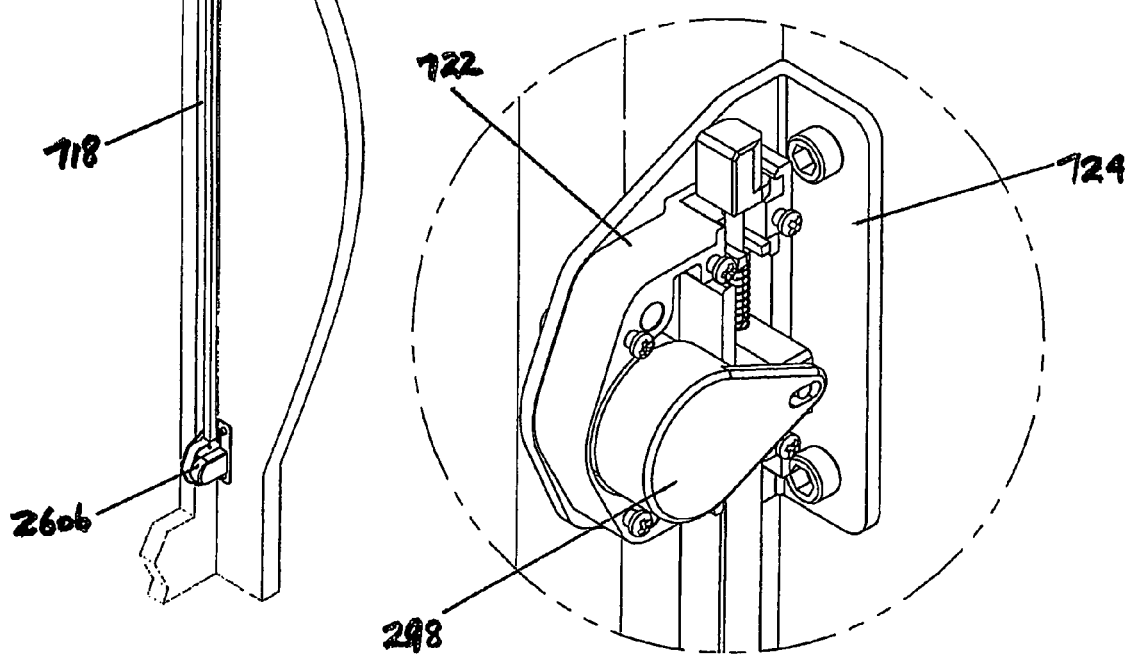
Figure 38
Figure 40

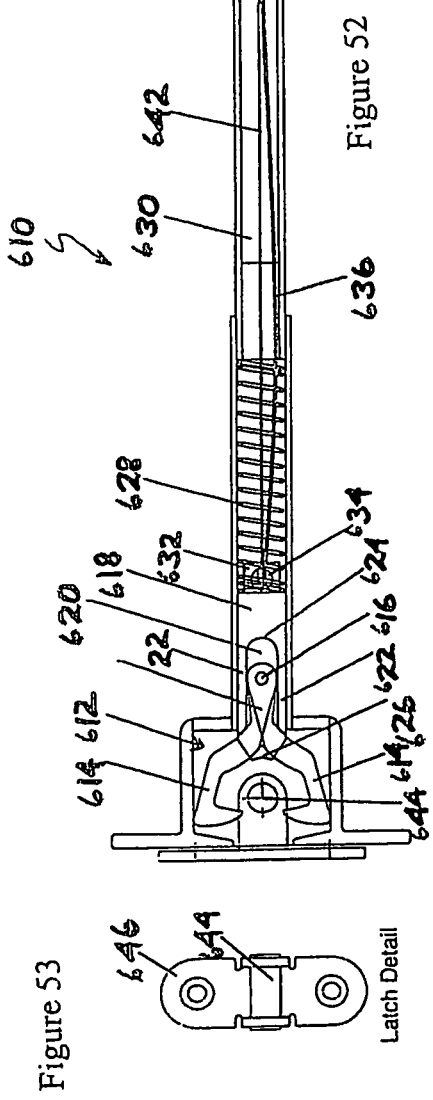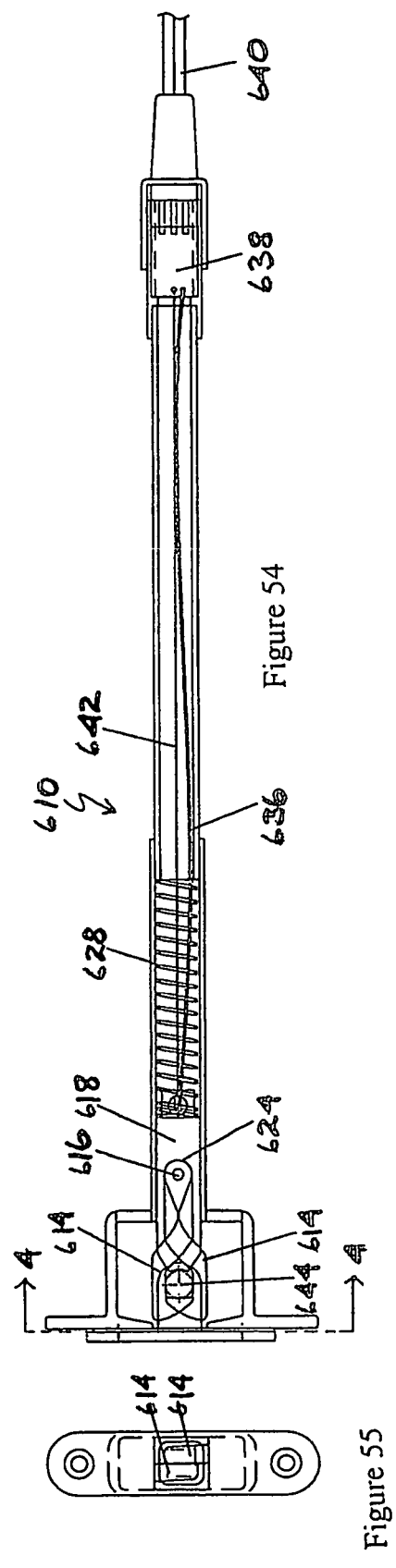

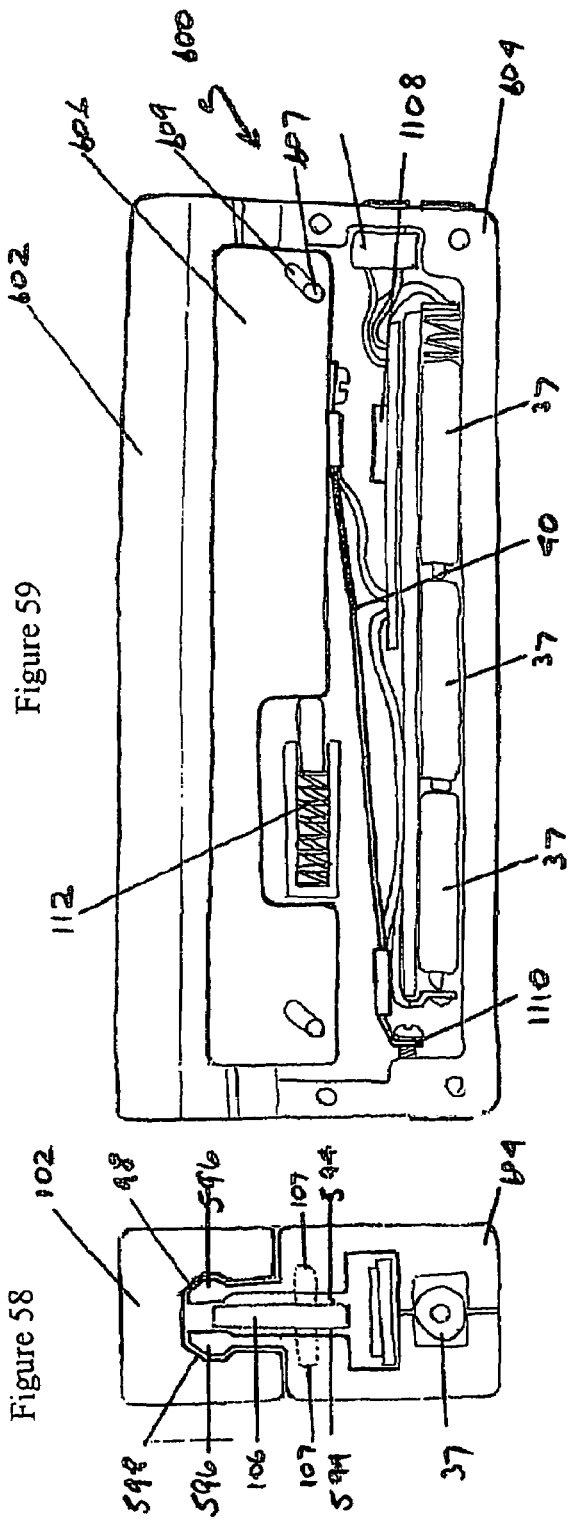
Figure 59
Figure 58
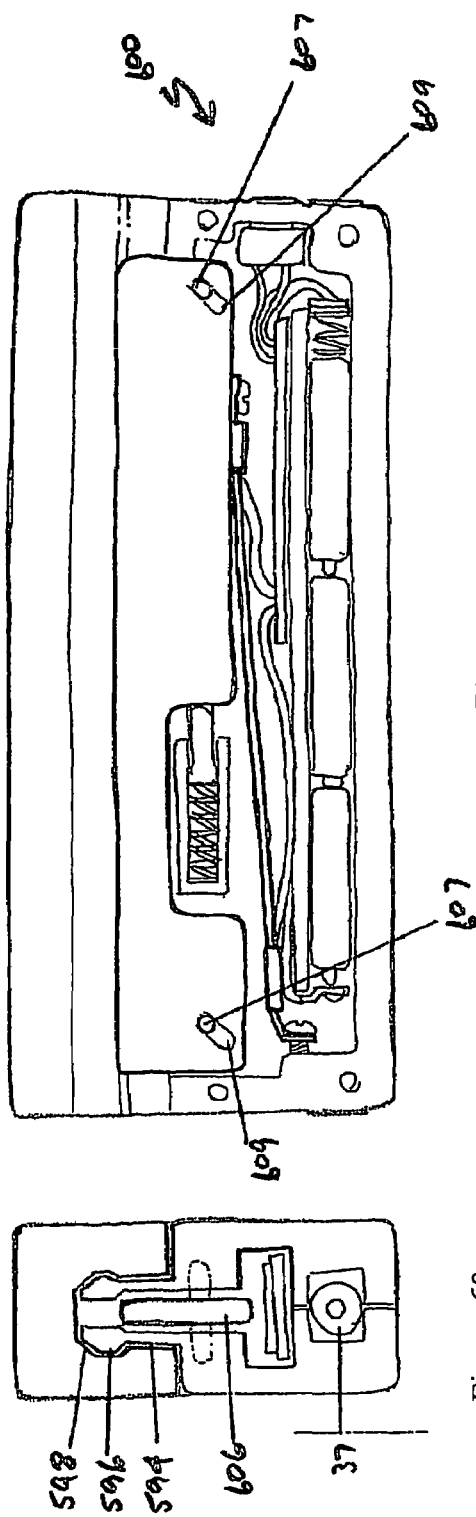
Figure 61
Figure 60

FASTENERS AND OTHER ASSEMBLIES

TECHNICAL FIELD

This invention is concerned with fasteners and other assemblies, including an improved framing system.

The invention in its various aspects has wide application, as will be apparent from the description below.

BACKGROUND AND INTRODUCTION

The invention covers a wide range of fasteners, fastening systems, fastener assemblies and related areas. These represent improvements over prior art fasteners and fastener assemblies, etc.

In aspects of the invention discussed below, reference is made to material adapted to contract when activated.

The material adapted to contract when activated is preferably shape memory alloy wire. Shape memory alloys are known and are usually made predominantly or wholly of titanium and nickel. They may also include other material, such as aluminium, zinc and copper. A shape memory alloy is capable of adopting one shape below a predetermined transition temperature and changing to a second shape once its temperature exceeds the transition temperature. Conversely, when the shape memory alloy cools below the transition temperature, it is capable of adopting the first shape again. In connection with the various aspects of the present invention, the shape memory alloy contracts when heated in situ. Shape memory alloy wire currently available, such as that sold under the trade mark Nitinol, is capable of contracting by about 3% when activated by heating.

Activation of the material adapted to contract when activated is preferably achieved through electrical resistance heating, with a wire feed to the assembly. Activation of the shape memory alloy wire can be initiated from a central location, using the wiring system of, for example, an air craft or automobile. It is also within the scope of this invention that the activation is initiated by remote means, such as a hand held tool operating through the use of any suitable form of energy, including microwave, electric magnetic, sonic, infrared, radio frequency and so on.

The scope of the invention in its various aspects is not necessarily limited to the use of shape memory alloy. Other material may also be useful. Also, while activation may take place through heating, other means of activation may be suitable and are within the scope of this invention.

The fasteners and fastening systems of the invention may be particularly suitable for use in connection with automobiles and to some extent the description below may focus on this application. However, it is to be understood that the scope of the invention is not limited to this application.

There is a marked trend towards increasing electronic control in motor vehicles. Nowadays, many motor vehicles incorporate computer systems which use a Controller Area Network (CAN) in which modules communicate data to the computer via a bus, or a local interconnect network (LIN) which also enables communication of data via a bus.

The present invention in some of its many aspects is intended to take advantage of the trend towards increased electronic control in vehicles. The present invention provides several versions of fasteners which may be suitable for use in vehicles and which may provide significant advantages in relation to assembly of vehicles and service of vehicles. In particular, the fasteners of the present invention may be suitable for connection to a vehicle computer via a CAN or LIN.

Some fasteners and fastening systems of the invention can be designed to be activated only by authorised parties, such as those engaged in vehicle assembly or servicing. Others can be designed to be operated by vehicle owners.

In appropriate forms, any of the fasteners and the fastening systems of the invention can have primary and secondary functions, the primary function being to attach components to the vehicle body and the secondary function being the control of component switching. It is possible that use of fastening systems according to the invention may reduce the number of sub-network wiring components required in a vehicle, through direct connection into the CAN bus, for example. In effect, each fastener may become its own multiplex module/communications gateway or node on the CAN bus.

DISCLOSURE OF THE INVENTION

In a first aspect, this invention provides a fastener which represents a variation of a fastener disclosed in International Patent Application No. PCT/AU03/00759 ("the original beam fastener"). The original beam fastener had a flexible beam which was movable between an engagement position and a disengagement position when actuating means were activated. The actuating means included a material adapted to contract when activated, such as a shape memory alloy. In the fastener of the first aspect of this invention, it is no longer necessary that the beam is flexible. Accordingly, this invention provides, in the first aspect, a fastener which includes:

(a) a fastening element having a beam, an engagement means located on one side of the beam, a base and a flex point separate from the beam; and (b) actuating means attached to the fastening element and including a material adapted to contract when activated;

wherein the beam is movable, upon contraction of the material, between an engagement position and a disengagement position, and wherein the base has a first arm and a second arm joined by the flex point, the beam being located at one end of the first arm and the flex point being located on the same side of the beam as the engagement means.

The fastener of this first aspect of the invention is designed so that, when the material contracts, the fastening element flexes or moves about the flex point and the engagement means is drawn out of the engagement position. The fastener may be otherwise as disclosed in International Patent Application No. PCT/AU03/00759, except that it is not necessary that the beam flexes to enable the engagement means to disengage.

The fastener of this first aspect of the invention may be made of any suitable material, including plastic or metal. The fastener may be made of a combination of materials.

The tensile strength of the beam should be sufficiently high that the fastener can fasten useful loads. Preferably, the material of the beam has sufficient fatigue strength to accommodate the desired number of locked/unlocked cycles.

The engagement means preferably takes the form of a projecting wedge which can key into a corresponding recess in a wall of an element. Other configurations are possible. For example, the engagement means may be a snap means, a rod for latching over a hook, or an aperture which can latch over a projection such as a peg. The engagement means may take the form of a dovetail on the beam fitting into an appropriate recess. The fastener of the invention can engage with an identical fastener, for example.

Preferably, the material, which contracts when activated, is a shape memory material as has been discussed above. Preferably, the shape memory material is a titanium-nickel wire which, when sufficient energy in the form of an electrical current is applied, heats to or above a temperature at which the material shrinks by about 4 to 5%. As will be seen from the discussion in connection with the drawings, below, on application of energy such as electrical energy in order to generate heat above a predetermined level, the beam can be caused to move away from the engagement position in which a first element is fastened to a second element, thereby releasing the elements. Conversely, if the shape memory material is permitted to cool below the transitional temperature, in some embodiments the beam may assume the engagement position and the elements may be fastened again.

The flex point is preferably located forward of the engagement means so as to improve force geometry and to increase the retaining strength of the fastener. An example of this is illustrated in the attached drawings.

It is preferred that the material which contracts when activated is contained in one or more grooves in the beam. This can provide physical protection for the material as well as decreasing heat up/cool down times. It can also reduce ambient temperature effects and increase beam strength. It can enable the beam to maintained in the disengagement position for a desired length of time. This can be regarded as a "hold" state. Such a hold state may be established using less power (such as electrical current) than that required to move the beam from the engagement position to the disengagement position. This may be achieved by insulating the material which contracts when activated by being maintained in grooves in the beam.

It is further preferred that bias means, urging the fastener to the engagement position, is provided. A non-limiting example of such bias means is a leaf spring, preferably of metal. This can urge the material to stretch out once it has cooled and relaxed. It can also greatly reduce any potential for creep deformation in the fastening element when made of plastic.

Because the beam does not need to bend, it may be made thicker and can have more strength. The beam may be machined, cast, moulded or formed in any desirable way.

Means intended for engagement by the engagement means may take any suitable form. Some have already been mentioned above, for example part of a snap means, a hook, a peg, a recess or an identical fastener. If the fastener is used for fastening a fuel filler door to a car body, for example, it is preferred that means for engagement by the engagement means is an aperture on the door.

In this example, the actuating means is preferably actuated either through a suitable switch located on the dash board of the vehicle or through a signal generated from the vehicle key. The latter can be convenient because the driver does not need to remember to actuate the fuel filler door before getting out of the vehicle: the driver needs only to take the vehicle key to the fuel pump and release the fuel filler door while standing next to the vehicle.

The fastener of this first aspect of the invention may be "intelligent" or not. It may be addressable. It may be part of a network. It may have a switching capacity and it may include sensors. All of these and other information is contained in international patent application No. PCT/AU03/00759, the content of which is imported herein by reference. All applicable features in PCT/AU03/00759 apply to the fastener of the first aspect of the present invention.

In an especially preferred embodiment, the fastener includes a microprocessor which can carry out one or more roles. Microprocessor can control the energy delivery to the shape memory alloy wire, preferably by a temperature-dependent algorithm. It can control temperature of the shape memory alloy wire. It can sense the state of the fastener and whether it is engaged or not. It can report this, along with secondary sensed information, to a network of which the fastener forms a part. Preferably, the microprocessor carries out all these roles. More detail is given below in the description of the second aspect of the invention.

In a second aspect, the invention provides a fastening system which can have widespread applications. One embodiment, referred to below as a ring clip fastener, was developed to suit multiple attachment points in retaining panels, such as in automotive use or for furniture. The fastener is not restricted to these applications.

In another embodiment, the fastening system of the second aspect of the invention has been developed especially for rugged high-wear applications. This fastening system, which may be referred to as a stud fastener, is capable of being strong and carrying a high load, such as securing equipment to a vehicle. It is to be understood that the fastening system in this embodiment is not limited to these parameters, however. Stud fasteners can be useful in many other applications. They can be used, for example, to close doors, being attached to a door frame and adapted to receive a pin or stud on the door.

In another embodiment, the fastening system of the invention can be used as an "inline" fastener.

Accordingly, in the second aspect this invention provides a releasable fastening system including:
 a pin having a locking cavity;
 an aperture for receiving the pin;
 a locking means adapted to engage the locking cavity of the pin when the pin is received in the aperture; and
 an unlocking means including material adapted to contract when activated, wherein the locking means comprises or includes engagement means adapted to disengage the locking cavity when the material contracts.

The pin may be chosen from a large range of suitable shapes. As one example, the pin may be generally circular in cross-section, tapering in towards the base. The pin may be a stud, peg, bolt or any other suitable element. The pin may be formed integrally with or attached to an element to be fastened. The attachment may be by adhesion, clipping or other suitable means.

The material adapted to contract when activated is preferably attached to the engagement means to move it out of engagement with the locking cavity when activated and so permit release of the pin.

The material which contracts when activated is preferably the shape memory alloy wire described above.

The locking cavity may take any suitable form but preferably is one or more indentations or a groove. If a groove, the groove may be adapted to receive the locking means in some or all of the groove.

The aperture is preferably formed centrally in a body which may house the locking means and the unlocking means. The aperture is preferably of the same shape as the cross-sectional shape of the pin, for example, circular. The aperture may take any other suitable shape.

If the pin is designed with a taper, it can be pushed into the aperture and be engaged without the need for any activation of the material. The taper on the pin can serve to form a ramp pushing the locking means apart until it snaps into the locking cavity, such as a groove. In this configuration, the fastening system is engaged. To disengage the fastening system, it is necessary to activate the material so that it contracts and pulls the locking means out of engagement with the groove. For example, if the locking means is a clip, one or more loops of shape memory alloy wire may encircle the clip, with one end of a loop being fastened to one arm of the clip and one end of another loop being attached to the other arm of the clip.

The locking means includes or consists of engagement means which is adapted to disengage the locking cavity when the material contracts. In one embodiment, the engagement means is a clip. In a different embodiment, the engagement means is one or a plurality of elements, such as teeth. The invention is not limited to these embodiments.

When the engagement means includes or consists of a clip, the clip may take any suitable form but preferably is a collar, a bias spring or a type of circlip, in each case with arms which can be pulled apart out of engagement with the locking cavity. The clip may generally follow the shape of the groove (eg, circular), but may take another suitable shape, such as "U" shape.

The locking means may consist of the clip, as described above, or it may include other elements, such as a clip chassis. A clip chassis may be convenient to carry the clip and to facilitate operation of the unlocking means. For example, the clip may be mounted in or on the clip chassis and the unlocking means, such as one or more loops of shape memory alloy wire, may be connected to the clip chassis. In this example, when the shape memory alloy contracts, it causes the clip chassis to open, forcing apart the arms of the clip so that the clip moves out of engagement with the grooves. The clip chassis may be hinged to enable it to open during this procedure.

In another embodiment, the clip chassis may be used alone, the clip chassis including bias means such as a spring to urge it to the engaged position.

In all embodiments, the clip is preferably biased towards the engagement configuration. This can enable the pin to be engaged passively—without activation of the material—if the pin is shaped to push the clip open on entry into the aperture as described above. The bias of the clip may also assist the material which contracts when activated, such as the shape memory alloy wire, to return to the relaxed or elongated shape when it cools or is otherwise no longer activated.

When the engagement means includes or consists of one or a plurality of elements such as teeth, each of these is preferably designed to fit into the locking cavity, in this embodiment being a groove in the pin. Preferably, there is a plurality of such elements, being teeth.

In this embodiment, the teeth are preferably surrounded by a rotatable body, such as a shuttle. The shuttle is rotatable to an engagement position, where the teeth engage the groove, and to a disengagement position, where the teeth disengage from the groove.

In a particularly preferred embodiment, the shuttle has one or more apertures or spaces into which the engagement means may be received in the unlocking position. When the engagement means, such as teeth, are not in these apertures or spaces, the shuttle is designed to push the engagement means into the locking cavity and hence to the locking position.

In another embodiment, the shuttle may include or be associated with means adapted to engage the engagement means and draw them out of engagement with the locking cavity, when the shuttle is rotated to the unlocking position.

The shuttle may be rotated by the locking means which includes material adapted to contract when activated. Preferably, this material is shape memory alloy wire, as discussed above in connection with the first aspect of the invention. It is further preferred that the shape memory alloy wire is wound around the shuttle which is rotatable within a body for the fastening system. In this embodiment, the shape memory alloy wire is attached at one end to the shuttle and at the other to a non-rotatable part of the fastener. When the shape memory alloy wire is caused to contract by the application of suitable energy to reach the necessary temperature, the shuttle can rotate from the locking position to the unlocking position. A second shape memory alloy wire may be similarly connected to the shuttle in order to rotate it from the unlocking position to the locking position.

It is particularly preferred that a retractable cap is included in the releaseable fastening system of the second aspect of the invention, to present a smooth appearance when the pin is not inserted in the cavity. An example of this is described in connection with the drawings, below. If the retractable cap is included, it can be pushed further into the cavity by the pin when the pin is inserted in the cavity, the retractable cap being spring biased towards the cavity opening. This embodiment can have a clean flat visual finish when not in use.

It is also preferred that the retractable cap, when used, also has first engagement means, similar to the pin. In this way, the retractable cap can work the same way as the pin in the releaseable fastening system of this second aspect of the invention in so far as the cap is locked or released by the locking means. If this embodiment is utilised, it may be necessary to include means enabling the cap to be withdrawn from the cavity and/or to provide some indication that the cap has been released.

As a variation of the fastening system of the second aspect, the pin and a core in the cavity may contain conductors for power and data connections for the releaseable fastening system or conduits for other material, e.g., liquid, gas. This may accommodate, for example, a GPS system connected to the power source of, for example, a motor cycle.

As set out above, the fastening system of the second aspect of the invention can be constructed so as to be rugged for high load and high usage applications. It can be dust and water resistant if it includes the retractable cap or a sprung cover. It can be designed so that the pin can be inserted in the cavity and engaged without any need for activation of the contractible material. However, it is intended that the contractible material must be activated before disengagement can take place.

It will also be appreciated that the invention in the second aspect may not provide for "insertion anytime" as is the case with at least some of the previous aspects. It is preferred that the fastening system of the second aspect of the invention requires positive disengagement of the locking means before the pin may be inserted in the cavity.

Disclosed above are embodiments of the invention in its second aspect. These embodiments have been referred to as ring clip fasteners and stud fasteners. The invention in its second aspect can also provide a third type of fastener known as an "inline" fastener. This type of fastener can be useful for locks, latches, closures and the like. The fastener can be made of sufficiently slim profile to be able to be concealed within elements having at least one narrow dimension, for example having a thickness of between 15 and 20 mm.

When the fastening system of the second aspect of the invention is used as an inline fastener, it is preferred that the locking cavity is one or more indentations engagable by the engagement means. For use as an inline fastener, it is preferred that the fastening system is contained within a box which may be inserted into a panel. The engagement means is preferably a pair of latch arms. Preferably, the locking means also include a slidable shuttle in which the latch arms are generally received. In a preferred embodiment, the locking means has pair of arms adapted to embrace the latch arms in the locking position and to hold the latch arms in locking contact with a latch, bar, projection or the like. In this embodiment, drawing of the shuttle away from the latch arms is designed to allow the latch arms to release contact with the latch, bar, projection or the like.

The engagement means further preferably includes a pawl to facilitate rapid resetting of the fastening system after activation of the material. In this embodiment, the fastening system of the invention can eliminate unnecessary delay between sequential unlocking and locking actions. It is also an option that this facility can be cancelled if rapid locking followed by unlocking is not desirable.

Preferably, the fastening system of the invention includes means for indicating the locked or unlocked states of the fastening system. By way of a non limiting example, this can be effected by microswitches in contact with the shuttle or an extension thereof. Information as to the locked or unlocked status of the fastening system can be conveyed to an indicator light or similar indicium locating in a convenient position.

The engagement means is preferably biased towards the locking position, preferably by a coiled spring, positioned in the fastening system of the invention so that the spring urges the locking means, such as the shuttle, toward the locking position. When the material is activated, this may cause compression of the spring, which accordingly can return the locking means towards the locking position once the material is no longer activated.

It is preferred that the fastening system of the invention includes additional biasing means, such as a spring attached to the pawl and a spring for ejecting the latch, bar or projection.

Shape memory alloy wire currently available, such as that sold under the trade mark Nitinol, is capable of contracting by about 3 percent when activated by heating. Consequently, in order to provide sufficient "travel" in drawing the engagement means from the locking position to the unlocking position, the drawing means may include Nitinol wire in a single, relatively long or double line and a fastening system having this configuration may be referred to as an "inline" fastening system. This configuration enables the fastening system to have a slim profile, for the purpose of fitting into panels and similar elements, as referred to above.

In other applications, particularly where a slim profile is not a priority, or in those circumstances where a greater amount of "travel" is desirable, the Nitinol wire may be provided over a non-linear path. This may have the effect of permitting the fastening system of the invention to be provided in a more compact configuration compared to the inline fastening system referred to above. In addition, if, for example, the length of Nitinol wire in a non-linear path was around 200 mm, the amount of contraction of Nitinol in its presently available form would be about 6 mm. In a non-linear path, the Nitinol wire preferably loops over one or more spindles or rollers.

Activation of the material adapted to contract when activated is preferably achieved through electrical resistance heating, with a wire feed to the fastening system.

The fastening system of the invention may include many other options. One such option is the sensing of change in temperature, for example to indicate a dangerously high temperature, so that an appropriate alarm can be initiated, the fastening system of the invention being wired into, for example, the aircraft electrical system. Other sensing functions may be incorporated in the fastening system of the invention.

The fastening system of the invention may include multiple material such as shape memory alloy wire. This can provide redundancy, so that if activation of one shape memory alloy wire fails to operate the system, the other or another of the wires can be activated.

The fastening system of the invention may be constructed in modular form. For instance, the engagement means may form one module, with the material being located in a separate module. This allows interchangeability so as to permit different types of engagement means to be exchanged in the fastening system of the invention, or to substitute, for example, a single shape memory alloy wire with a multi-strand wire.

The fastening system of the invention is preferably enclosed in a housing which can be bonded or fitted into the panel, door or the like. This arrangement can assist in electromagnetic protection, can facilitate exchange of one fastening system with another and can enable better adjustment of the fastening system within its surroundings. This can be particularly important if the fastening system of the invention includes facility for manual release as mentioned herein. It can also permit the status (locked or unlocked) indicator to be visible from the same aperture which can be used for manual release.

In present aircraft design, most fasteners are designed to be hidden behind doors, panels, etc. It is common to include a manual release for a hidden fastener, whereby a tool can be inserted through a small aperture visible from the cabin side of the door, panel or the like. It will be appreciated that this invention can provide a fastening system which can be manually released if desired.

Preferably, the fastening system of the invention includes one or more sensors which can detect whether the pin is present in the system, regardless of whether the fastening system is in the locked or unlocked state. It is also preferred that the fastening system of the second aspect of the invention includes lock status sensors, which can report whether the fastening system is in the locked or unlocked state. Such sensors may act as a reed switch, for example, so that when they make contact a report is generated that the fastening system is in the locked or unlocked state, depending on the construction of the fastening system. The lock status sensors may also work by enabling completion of an electrical circuit. Other configurations and means of sensing may also be applicable.

The fastening system of the invention may also include a temperature sensor for sensing the temperature of the shape memory alloy wire in the preferred embodiments. This can adjust the amount of energy applied to the shape memory alloy wire, depending on sensed temperature, to take into account varying conditions. For example, if the temperature is relatively low, a larger amount of power may need to be delivered to the shape memory alloy wire to heat it to the desired temperature. Conversely, if the temperature is high, the amount of power to be delivered to the shape memory alloy wire in order to cause it to contract may be far less. A temperature sensor can enable feedback and cause adjustment of power delivery in this regard.

In an especially preferred embodiment, the fastening system includes a microprocessor which can carry out one or several roles. The microprocessor can control the energy delivery to the shape memory alloy wire, preferably by a temperature-dependent algorithm. The microprocessor can control temperature of the shape memory alloy wire. It can sense the state of the fastening system and whether it is engaged or not. The microprocessor can detect whether the pin is present in the fastening system. The microprocessor may report this, along with secondary sensed information, to a network of which the fastening system forms a part. Preferably, the microprocessor carries out all these roles.

The fastening system of the second aspect of the invention also preferably includes bias means, such as a spring, biasing the fastening system towards the locked state. The fastening system of the invention also preferably includes an ejector spring, to assist ejection of the pin or stud when the engagement means is no longer engaged with the locking cavity.

This fastening system is capable of being produced at a low cost, with minimum parts and in a very small size. It is suited to high volume mass production and may be designed so as to require only low power consumption, if thin shape memory alloy wires are used.

In one version, the fastening system may take the form of a ring grip or clip fastener, and may be particularly suitable for fixing interior panels or door trims, for example, in automobiles.

The fastening function of the fastening system of this second aspect of the invention may be regarded as a primary function. The fastening system may have a secondary function, according to which the fastening system controls simple component switching. One example of this is the control of a window motor in a car door. In this context, the releaseable fastening system can be used to connect one element, such as the interior lining of a car door, to a second element, such as the car door itself. Alternately or additionally, the releaseable fastening system is used to act as a switch in connection with the operation of, for example, a window motor, a door lock assembly, headlights and so on. The releasable fastening system may carry out both functions.

Optionally, the fastening system of the second aspect of the invention has a manual override so that the fastening system can be released in case of a power failure or if it is required to test the fastening system before power has been connected, for example.

The fastening system of the invention in various embodiments may include the manual override. Some examples are shown in the drawings. In the case of the ring grip embodiment, a manual override may involve a slot through which a suitable tool can be passed to prise apart the engagement means, such as a circlip. In the case of the stud fastener embodiment, the manual override may enable the shuttle, if present, to be rotated to the unlocking position. One version of manual override forms the third aspect of this invention.

Accordingly, the invention in the third aspect provides a manual override for a stud fastener of the second aspect of the invention or for any other suitable fastener having a shuttle movable between a locking position and a unlocking position, the override including:
 a manual actuator adapted to cause the shuttle to move from the locking position to the unlocking position; and
 means for drawing the manual actuator so that the shuttle moves to the unlocking position.

Preferably, the means for drawing the manual actuator so that the shuttle moves to the unlocking position comprises or includes a rod connected to the manual actuator. For example, the rod may include a protrusion pivotally connected to the manual actuator. When the rod is pulled in a chosen direction, the manual actuator may be caused to move through its connection via the protrusion on the rod to a position where the shuttle moves to the unlocking position. Preferably, the manual actuator is connected mechanically to the shuttle for this purpose.

For security, it is preferred that the drawing means is biased away from the unlocking position. For example, when the drawing means includes a rod, the rod may need to be pulled against a spring. To further protect against accidental or inadvertent release, the drawing means may include means for engagement with retaining means. The purpose of this is to ensure that the drawing means must deliberately be disengaged from the retaining means before the manual override can be operated. Both of these safety mechanisms can help to ensure that accidental manual release does not occur though vibration, for example.

The drawing means may take any other suitable form, including that of a Bowden cable.

There may be several fasteners which need to be released through manual override. Consequently, the manual override of this third aspect of the invention can be adapted to manually release more than one fastener at the same time. Preferably, this is achieved by linking the manual actuator for the first fastening system with a manual actuator for the second fastening system and, optionally, with third and subsequent fasteners. The linkage preferably takes place using a connecting rod.

In a fourth aspect, this invention provides a first fastening system connected to a second fastening system by a linkage, the first and second fastening systems being adapted to release by the involvement of means adapted to contract when actuated, the linkage adapted to cause the first and second fastening systems to move to an unlocking position by any one of the following:
 (a) activation of the means adapted to contract when activated in the first fastening system;
 (b) activation of the means adapted to contract when activated in the second fastening system;
 (c) activation of the means adapted to contract when activated in both the first and second fastening system; and
 (d) manipulation of a manual override.

It is to be appreciated that more than two fastening systems may be released according to this fourth aspect of the invention. Preferably, a single fastening system in the two or more linked fastening systems is sufficiently strong to enable the linkage to release all the linked fastening systems in the case of failure of any of the linked fastening systems. If there is no power to operate any of the linked fastening systems in the normal manner, then all can be released by using the manual override.

The fastening systems may be chosen from any of the fasteners or fastening systems disclosed herein, or from any other suitable fastener or fastening systems.

In a further aspect, this invention provides a fastener assembly including:
 an engagement means including latch means and locking means, the engagement means being movable between a locking position and an unlocking position;
 biasing means urging the engagement means towards the locking position; and
 means for drawing the engagement means from the locking position to the unlocking position, the drawing means comprising or including material adapted to contract when activated.

The fastener assembly of the invention is preferably capable of construction on a small scale so that, possibly with the exception of the engagement means, it has a cross sectional dimension of about 10 mm. The purpose of this is so that the fastener assembly of the invention can be inserted into a panel, such as a panel for an aircraft which has a thickness of around 15 to 20 mm. It is of course possible to provide the fastener assembly of the invention on a larger scale for other purposes.

The latch means and locking means of the engagement means may take any desirable configuration. An example is illustrated in the accompanying drawings. By way of non-limiting illustration, the latch means may include a pair of arms or jaws which can engage a latch, bar or projection. Other configurations will be apparent to one skilled in the art.

It will be appreciated that there is overlap between this aspect and the second aspect of the invention, above. Many of the features are common.

However, in this further aspect, the engagement means may include a rod or tongue which bears against a closure, preventing movement of the closure towards the engagement means when the engagement means is in a locking position, or a cavity into which the rod or tongue may be received in the locking position. Other configurations will be apparent to one skilled in the art.

The application of the fastener assembly of the invention is to provide a fuel filler catch in a vehicle. The fastener assembly of the invention may be contained within or close to the fuel filler cavity and effectively concealed from the outside of the vehicle. In this embodiment, the engagement means preferably comprises a rod or tongue which, while the engagement means is in the locking position, prevents removal of the fuel filler cap. Alternately, the engagement means may retain the fuel filler cap through engagement with a latch or similar element on the fuel filler cap.

When the material adapted to contract when activated, such as Nitinol wire, is heated electrically to the desired temperature, the drawing means draws the engagement means out of engagement with the fuel filler cap, allowing removal of the fuel filler cap. Because the engagement means is biased towards the locking position, once the material adapted to contract when activated is no longer activated—for example, when it is allowed to cool, the fuel filler cap may be pushed back into engagement with the engagement means.

The fastener assembly of the invention may have inbuilt redundancy, by including one or more additional materials which contract when activated, such as Nitinol wire. Any of the Nitinol wires would be able to contract when activated; if one wire fails, another can perform the necessary function in the drawing means.

In some embodiments of the fastener assembly of the invention, the drawing means is attached to an electrical system. Use may be made of this so that the fastening system has a switching capacity as a second function. For example, the fastening system of the invention may also operate to turn lights on or off. This may occur in concert with the locking/unlocking function of the fastening system or independently.

One use of the fastening assembly of the invention is to fasten a closure such as a door in an aircraft, typically for a dogbox or cupboard. The fastening system of the invention may be configured so that, when the engagement means is drawn to the unlocking position, allowing the door to open, the fastening system also causes a light in the dogbox or cupboard to be turned on. Similarly, when the engagement means moves to the locking position, the fastening system may cause the light to be turned off.

In another embodiment, the fastening system includes or is associated with a sensing means, which senses light or temperature (internally or externally of the location of the fastening system), or stress applied to the fastener or its environment. In the case of light sensing, the fastening system may be programmed to turn lights (eg, in the cupboard or dogbox) on or off, depending on the amount of external light sensed. In the case of stress sensing, the sensor may detect stress applied to the fastening system, and report on impending failure of the fastening system, for example. Other embodiments will be apparent to one skilled in the art.

The fastening system of the invention may be networked with other fastening systems, for any desirable purpose, but especially so that failure or overstressing of one fastening system may be compensated for by another fastening system in the network.

The next aspect of this invention deals with protection of the material adapted to contract when activated from damage and applies not only to the fastening system of the present invention but to other applications in which a material adapted to contract when activated is required to pull on an element.

Material such as Nitinol is rated according to its composition. For example, a 330g Nitinol wire may have a pull force of 3.3 Newtons. If this wire is configured so as to pull on an element and the element is blocked from movement to a sufficient extent, the Nitinol wire may be capable of exerting a further pull force of, say, 9 Newtons. By this stage, however, the Nitinol wire may be in danger of being damaged. The invention in the next aspect has as an object the prevention or amelioration of such damage.

Accordingly, in a further aspect, this invention provides a strain reduction assembly including:
    a material adapted to contract when activated, the material having:
        a first pull force at which the material is adapted to move an element to which the material is directly or indirectly connected;
        a second pull force greater than the first pull force; and
        a third pull force intermediate the first pull force and the second pull force; and
    means adapted to be activated when the pull force on the material has reached substantially the third pull force.

The means adapted to be activated when the pull force is substantially the third pull force may be a compression spring attached to the material.

The material adapted to contract when activated is preferably the Nitinol wire referred to above. The first, second and third pull forces will depend on the rating of the Nitinol wire. By way of example, if the rating is around 3.3 Newtons, this will represent the first pull force. The second pull force in this example will be around 9 Newtons while the third pull force will be around 4.5 Newtons. Ideally, the third pull force is approximately one and a half times greater than the first pull force and calculated to be less than the second pull force, which may be calculated as that capable of causing damage to the material.

The element to be moved by the material adapted to contract such as the Nitinol wire may be any appropriate element. In the context of the present invention in the second aspect, the element is the engagement means. As stated above, this latest aspect of the invention is not limited to the first or second aspects of the invention and consequently the invention in its latest aspect has wide application.

The compression spring is preferably of any suitable construction.

The means adapted to be activated at the third pull force may take other forms. By way of non limiting example, the means may include monitoring resistance in the Nitinol wire and cutting of electrical power once the resistance has changed by, say, twenty percent. In the case of either embodiment, the Nitinol wire can be protected from damage.

In a further aspect, this invention provides a fastening system including;
    first engagement means;
    second engagement means; and a locking element moveable between a locked position in which the first engagement means is maintained in engagement with the second engagement means and an unlocked position in which the first engagement means is free to disengage from the second engagement means;

wherein the locking element is adapted to be moved to the unlocked position by means adapted to contract when activated, being different from the locking element.

The first engagement means preferably includes projections mounted on a pair of arms, the projections being designed to be received within a complementary cavity comprising the second engagement means. In this embodiment, the locking element is preferably located between the arms of the first engagement means. In the locked position, the locking element holds the projections of the first engagement means in the cavity of the second engagement means. The locking element is preferably designed to be pulled away from its position between the projections to enable the projections to move inwardly towards one another and be withdrawn from the cavity of the second engagement means. Is some respects, this can be regarded as similar to the construction of the locking element exemplified in International Patent Application No. PCT/AU99/00185.

It is further preferred that the locking element is in the form of a strip and that likewise the first engagement means and the second engagement means are provided in strip form. Examples of these were also given in International Patent Application No. PCT/AU99/00185.

The means adapted to contract when activated preferably comprise or include shape memory alloy wire, such as that discussed above. Other materials may also be suitable.

The fastening system is preferably designed so as to be maintained in the locked state in the absence of any power. For release, when the means adapted to contract when activated are shape memory alloy wire, switching on the power enables the SMA wire to heat and contract, pulling the locking element out of the locked position. If the SMA alloy wire is permitted to cool, the fastening system can be biased so that it will return to the locked position.

Preferably, the fastening system in this embodiment includes a printed circuit board or other means for controlling the amount of power to the SMA wire. The same means can enable reporting in relation to the fastening system, such as status, the number of times the fastening system has been released and if there has been any damage.

A further aspect of this invention is concerned with an improved framing system.

The invention has wide application, as will be apparent from the description below.

For convenience, the word "frame" and its derivatives are used below. It is to be understood that, unless the context otherwise requires, the term "frame" and its derivatives are to be interpreted in the sense of "platform" or "base" and not restricted to an open structure.

In a first broad aspect, the invention provides an improved framing system wherein the frame includes one or more attachment nodes and the framing system is adapted to enable delivery of one or more of energy, data and material.

The frame itself may be provided in components. Parts or accessories (e.g., a fairing) may be added to the frame and, being provided with one or more attachment nodes, may form an extension of the frame.

The frame can be chosen from a wide range of materials and configurations, suitable for use in many industries. By way of non-limiting example, the frame may take the form of a skeleton, carcase or chassis for a motor vehicle, a skeleton for furniture, a support for use in the building industry or a plumbing system. Many other applications may be apparent to one skilled in the art after consideration of some of the detailed description below.

The frame or some of it may act as a conduit for energy, data and/or material in any suitable way. Some non-limiting examples follow.

The frame may be used to deliver energy in the form of electrical energy by use of conventional wiring or buses. The frame may enable delivery of other types of energy, such as pneumatic or hydraulic energy, by suitable means.

In relation to the delivery of data, this may involve various data transfer means, for example, transfer of data in a networking environment in known manner. A single medium, such as a cable, for example, on or within the frame, may be adapted to deliver both energy and data.

The material for which the frame may provide a conduit may be any suitable material, including gas, liquid and mixtures of these.

Preferably, the improved framing system of the invention includes a plurality of attachment nodes. It is further preferred that each of the attachment nodes enables attachment and/or detachment of modules or accessories to the frame. Any suitable fastener may be used in conjunction with such an attachment node. Some suitable fasteners are described below, but the invention is not limited to these.

The improved framing system for the invention preferably delivers energy, data and/or material to an attachment node to assist in attachment and/or detachment of modules or accessories. An example will now be given in connection with a motor cycle. Once again, this is not limiting on the scope of the invention.

In this embodiment, the frame resembles a conventional motor cycle frame which may have energy and data conveyed by cables within some or all of the frame. The frame has a number of attachment nodes connected to the energy/data cable system. The frame acts as an attachment point for all desired components, such as the motor, instruments, windshield, seats, fuel tank, storage systems, vehicle lights, instrument lights, fairings and cowlings. The attachment nodes for these components may include fasteners which are concealed when the components are in place and which are actuated in one of several ways. As one method of actuation, signals may be transmitted via cabling from a central control on the motor cycle or external to it, perhaps using a computer or custom built device. As another example, signals may be transmitted remotely by any suitable means, including infra-red or radio wave communication, perhaps through a button on a key chain fob, or from a conventional ignition switch.

This embodiment may enable a motor cycle to be assembled in a completely different way than at present. Fasteners may be concealed. Assembly of the motor cycle may not require conventional tools or robots. This can greatly simplify design and enhance aesthetics.

During assembly, fasteners at the attachment nodes may be programmed to allow parts or components to be attached automatically as a production line is moving. This can redefine assembly sequencing processes during manufacture. Instead of traditional physical or mechanical contact, fasteners can lock, unlock and connect mechanically, in response to commands transmitted electronically, remotely or by hard wiring or any other suitable means. It is envisaged that many or even all components may be assembled to the frame of a motor cycle in this way, including, for example, suspension or shock absorbers. There are many other advantages, such as the ready ability to change options during manufacture by interchanging one component for another without having to disrupt the production line.

The motor cycle of this embodiment can enhance servicing. For example, fasteners and attachment nodes may include microchips which have secure addresses that respond to only to encrypted signals. This makes the fasteners accessible only to designated dealers and technicians. In addition, fasteners may be programmed to detect, analyse and report problems that require service. Service procedures may be stored in fastener control software. This can assure installation of authorised replacement parts while providing precise service histories and documentation for warranty claims. For example, microprocessors may capture information about fastener status (locked, unlocked, damaged, stressed, present or not) and maintenance history, including dates, times, places and identity of the technician performing each process.

Insofar as the "after market" is concerned, the motor cycle of this embodiment can be quickly and simply customised to any situation or aesthetic taste. Parts and accessories can be interchanged to suit the need or occasion. Using a single, standard frame, a motor cycle may be restyled with selected fairings, fuel tanks, gauges, lights and many other components.

It is possible to retrofit such a motor cycle with optional accessories, such as saddlebags, windshields, GPS systems and entertainment systems.

Security in such a motor cycle is enhanced. Thieves may have no access to hidden fasteners without destroying the component they intend to steal.

From the point of view of the authorised user of the motor cycle, there can be provided single point locking for removable components, such as fuel tank, steering, panniers, fairings and helmet, overcoming the need for a multiple array of keys, one for locking each component.

The same motor cycle frame can be used for a sports model or a touring bike, or any other customisation. For example, a single seat and body fairings may be removed and replaced with a touring tank, twin seats and touring panniers. By way of another example, a street-legal motor cycle can be transformed to an off-road dirt bike by releasing lights, indicators, plates and other accessories.

The fasteners suitable for use with the improved framing system of the invention are preferably a type of "intelligent fastener" which has a fastening mechanism, an actuator and a micro processor. Many types of fasteners may be suitable. Some specific fasteners are disclosed below and form different aspects of this invention. The type of fastener to be used with the improved framing system of the invention is not limited to the fasteners disclosed below. Other fasteners may well be useful, including those disclosed above and in the following patent specifications, the contents of which are incorporated herein by reference: International Patent Application No. PCT/AU99/00185, International Patent Application No. PCT/AU03/00759 and Australian Patent Application No. 2002953616.

Generally, the fastener suitable for use in the system of the invention will perform to the same specifications as mechanical fasteners, having transfer forces which meet traditional requirements for tension, shear and clamp. Preferably, the fasteners will also have the capability to report their own status, report on what parts are in place and report on whether the fasteners are attached or unattached, attached properly or overstressed.

In a further aspect, this invention provides a fastener which includes:
 (a) a fastening element;
 (b) actuating means attached to the fastening element and including a material adapted to contract when activated; and
 (c) restoring means adapted to restore the material to a relaxed state when no longer contracted;

wherein the restoring means contains or comprises elastomeric material adapted to be deformed by contraction of the material adapted to contract when activated.

The sixth aspect of the invention may be used in conjunction, with, for example, the fastener in the second aspect of this invention, or the fastener disclosed in International Patent Application No. PCT/AU03/00759, or in conjunction with other fasteners, disclosed in this specification or otherwise.

The fastening element may be any suitable fastening element.

The material adapted to contract when activated is preferably shape memory alloy wire, as has been disclosed or discussed before.

The restoring means is preferably an elastomeric material which is adapted to be deformed by contraction of the material such as the shape memory alloy wire and which is also adapted to return to its original shape after the material (such as the SMA wire) relaxes. Preferably, the restoring means contains, surrounds or encases the SMA wire. Suitable material for the restoring means will be apparent to one skilled in the art. One suitable material may be polybutyl sulphide. For example the SMA wire may be contained within a hollow body of the restoring means. As another example, the SMA wire may be embedded within a solid body of the restoring means. As yet a further example, the SMA wire may be attached to a strip of the restoring means.

The restoring means may impart a linear force on the SMA wire (or other material) in order to restore it to the original configuration when relaxed. However, the invention is not limited to this. The forces may be in any suitable direction or combination of directions. Some of these are illustrated in the drawings, below. The aim of the restoring means is to restore the shape memory alloy wire or other suitable material to the position it had before contraction.

By using an elastomeric material, it is possible to dispense with return springs. The restoring means can also act as a heat sink for SMA wire. The restoring means can also enhance the ruggedness of the fastener, protecting the shape memory alloy wire from damage during handling, transport, etc.

BRIEF DESCRIPTION OF THE DRAWINGS

The invention will now be described in connection with certain non-limiting examples thereof in the accompanying drawings, in which:

FIG. 1 is a side elevation of the fastener of the first aspect of the invention in the engaged position;

FIG. 2 is the fastener of FIG. 1 in the disengaged position;

FIG. 3 is the fastener of FIGS. 1 and 2 in rear elevation;

FIG. 5 is a side elevation of a first embodiment of the fastening system of the second aspect of the invention;

FIG. 6 is the fastening system of FIG. 5 in plan view, in the engaged state;

FIG. 7 is the fastening system of FIGS. 5 and 6 in the disengaged state;

FIG. 20 is a top view of a third embodiment of stud fastener;

FIG. 21 is a cross-sectional view of the embodiment of FIG. 20 taken along the lines A-A of FIG. 20;

FIG. 38 is a perspective view of linked fastening systems according to the invention;

FIG. 39 is an enlargement of one of the fastening systems of FIG. 38;

FIG. 40 is yet a further enlargement of the fastening system of FIG. 39 with cover removed;

FIG. 52 is a cross-sectional view of a first embodiment of fastening system according to the third aspect of the invention, in the unlocking position;

FIG. 53 is an end view of the latch which is included in FIG. 52;

FIG. 54 is a cross-sectional view of the embodiment of FIG. 52 in the locking position;

FIG. 55 is an end view of the embodiment in FIG. 54, taken along the lines 4-4 in FIG. 54;

FIG. 58 shows in cross-sectional view an embodiment of a fastening system of the fourth aspect of the invention, in the locked position;

FIG. 59 is a side elevation, in cross-section, of the embodiment of FIG. 58, still in the locked state;

FIG. 60 is a cross-sectional view corresponding to that in FIG. 58 but showing the fastening system in the unlocked state;

FIG. 61 corresponds to FIG. 59, but shows the fastening system in the unlocked state;

BEST MODES OF CARRYING OUT THE INVENTION IN ITS VARIOUS ASPECTS

Figure 4:
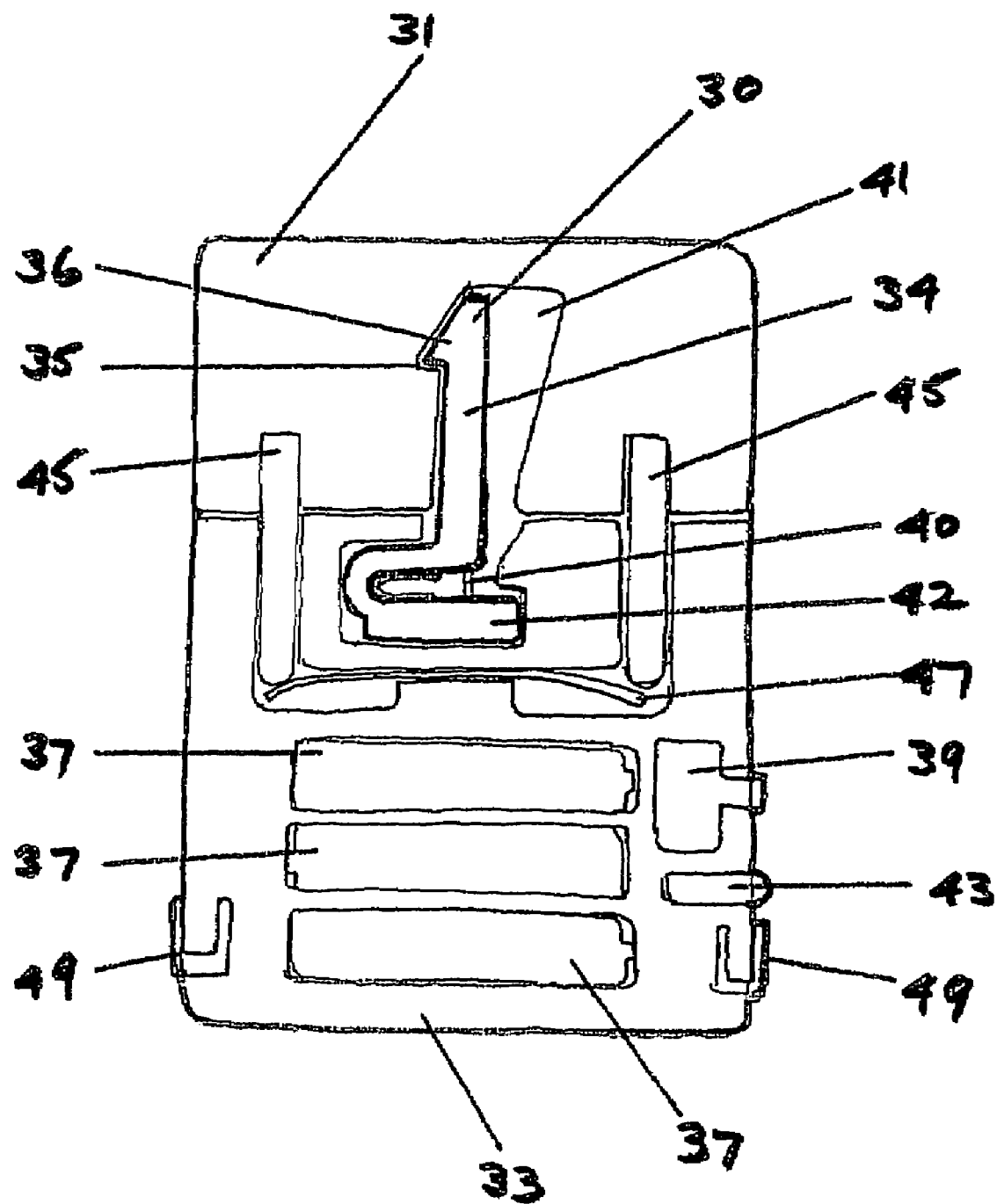
FIG. 4 shows an embodiment of the fastener of FIGS. 1, 2 and 3 in a practical application.

Turning first to the fastener being an embodiment of the first aspect of the invention and illustrated in FIGS. 1 to 3, fastener 30 includes fastening element 32 having a beam 34, an engagement means 36 and a flex point 38. As can be seen, flex point 38 is separate from beam 34.

As shown in the rear elevation in FIG. 4, shape memory alloy wire 40 forms a loop in a groove 44 in the back of beam 34 and is attached at each end to electronic module 42. Wire 40 is shown partly in dotted outline in FIGS. 1 and 2.

When wire 40 is heated by a current generated through electronic module 42 and wire 40 reaches a pre-determined temperature, it shrinks as shown in FIG. 2. Fastening element 32 bends or flexes at flex point 38 and engagement means 36 is drawn out of engagement with an engaging surface (not shown). As shown in FIG. 2, leaf spring 46 is compressed. If wire 40 is allowed to cool, it relaxes and leaf spring 46 decompresses, urging engagement means 36 back into engagement with the engaging surface (not shown).

This embodiment can provide an enhanced positive engagement through engagement means 36 and greater strength to fastener 30, since beam 34 is not required to bend.

FIG. 4 shows a practical application for fastener 30 illustrated in FIGS. 1-3. In FIG. 4, fastener 30 is shown in situ fastening cap 31 to base 33. As can be seen in FIG. 4, engagement means 36 of fastener 30 engages ledge 35 of cap 31. Three batteries 37 provide a power source for electronic module 42, being activated by switch 39.

When switch 39 is pressed, batteries 37 provide power to electronic module 42, which heats shape memory alloy wire 40 sufficiently to cause shape memory alloy wire 40 to contract. Engagement means 36 is drawn out of contact with ledge 35. Cavity 41 is provided in cap 31 to allow for this movement of beam 34. When switch 39 is pressed, LED 43 lights up to show that switch 39 has been activated.

Dowels 45 are provided in channels in cap 31 and base 33. These assist in location when cap 31 is being placed on base 33. During release, dowels 45 in conjunction with leaf spring 47 urge cap 31 to separate from base 33.

Charging contacts 49 can be used to recharge batteries 37 if of the rechargeable type.

Reference is now made to the embodiment of the invention in the second aspect in FIGS. 5 to 7. In this embodiment, fastening system 50 includes pin 48 adapted to be received in aperture 52. Locking means 54 in the form of a circlip 54 are adapted to lock into groove 56 in pin 48.

Aperture 52 is formed in plastic fastener body 58 which includes ridge 60. Travelling around ridge 60 is shape memory alloy wire 40. Insulated plastic caps 62 connect crimped ends (not shown) of wire 40 to circlip 54 and power leads 64.

FIG. 6 shows fastening system 50 in the locked state. In this state, pin 48 may be pushed into aperture 52. Taper 66 on pin 48 serves to push circlip 54 apart, until it rides into groove 56, where it remains locked. Thus, there is no need to activate wire 40 in order to insert pin 48 in aperture 52.

FIG. 7 shows fastening system 50 in the unlocked position. In this Figure, wire 40 has been heated through power fed from leads 64 to wire 40, to the extent that wire 40 contracts. Through its connection at caps 62 with circlip 54, wire 40 in the contracted state, and restrained by ridge 60, draws circlip 54 apart, freeing circlip 54 from groove 56 and permitting the unfastening of pin 48.

Figure 8A:
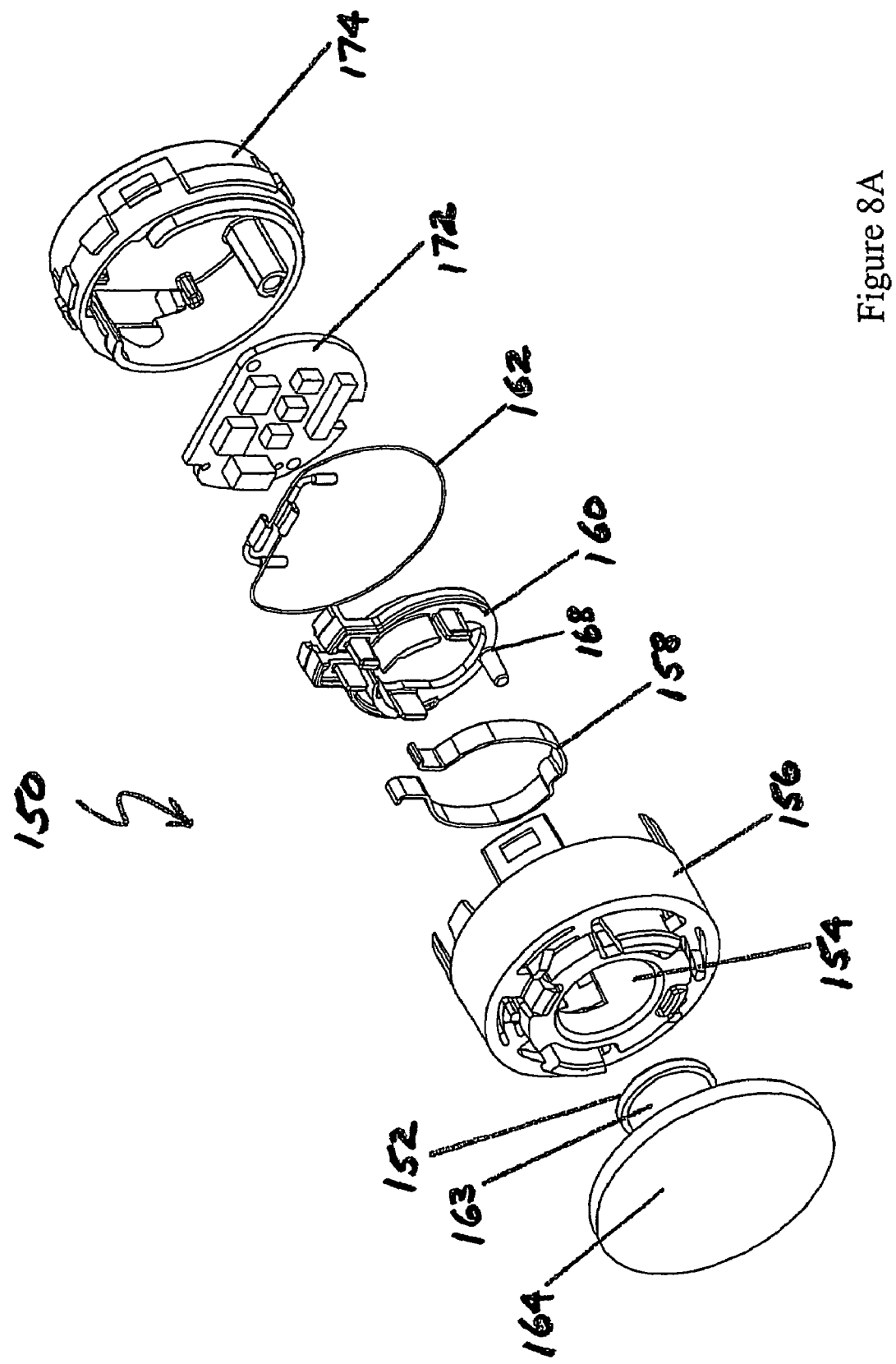
FIG. 8A is an exploded view of a second embodiment of the second aspect of the invention.

Referring now to FIG. 8A, releasable fastening system 150 includes a pin 152 adapted to be received in an aperture 154 of main body 156. Clip spring 158, together with clip chassis 160 and shape memory alloy wire 162, comprise the locking means for pin 152.

Pin 152 has a wide groove 163 around its circumference. Groove 163 is adapted to receive clip chassis 160 which can embrace groove 163. Clip chassis 160 carries clip 158 and acts as a type of circlip.

Figure 9:
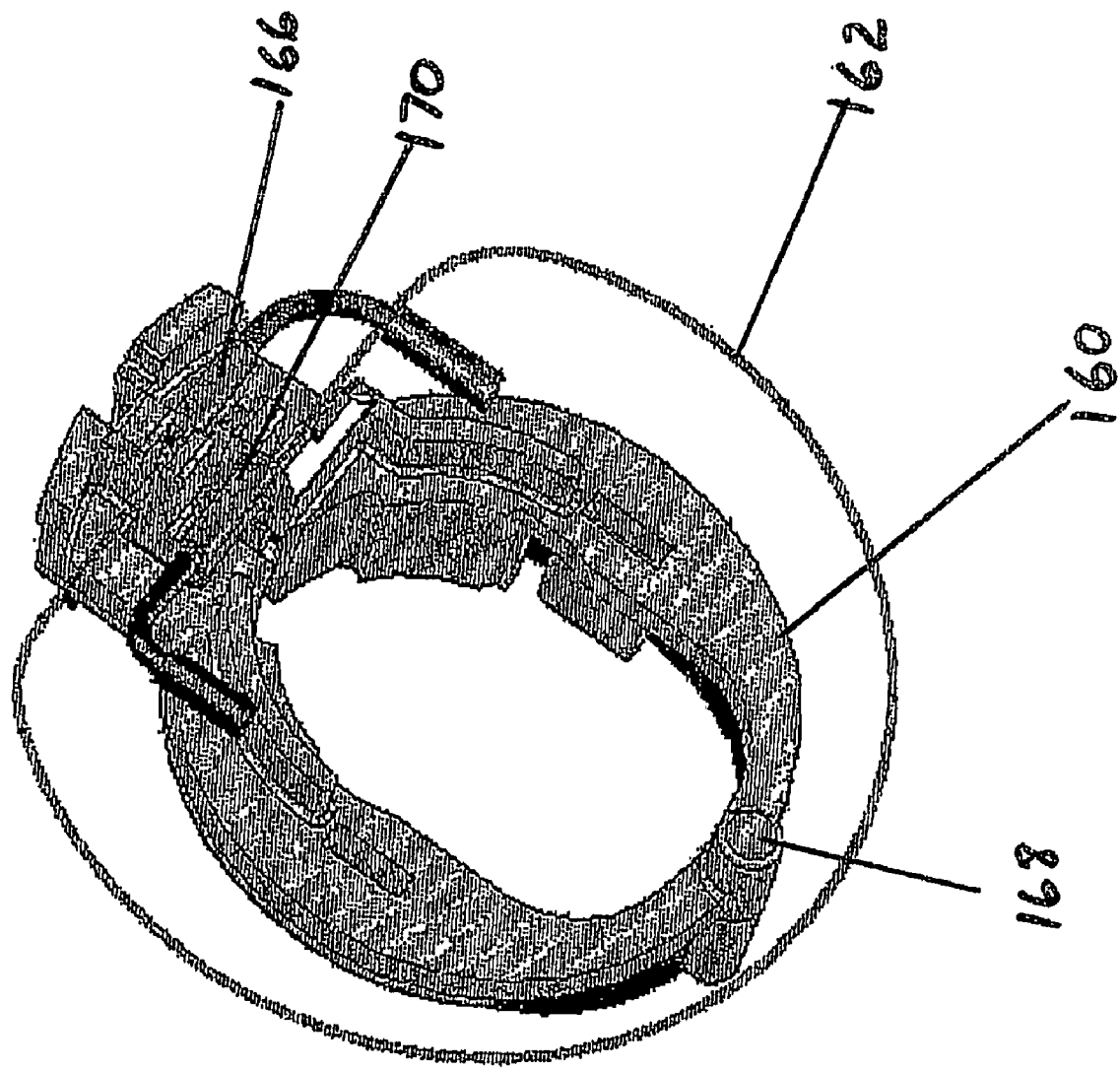
FIG. 9 is an enlarged detail of the embodiment of FIG. 8A.
Figure 11:
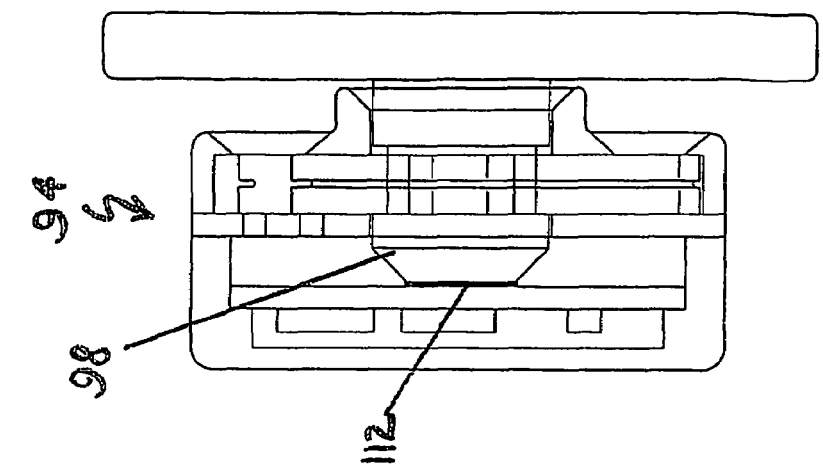
FIG. 11 is a side sectional view of the fastening assembly of FIG. 10, in the locked state.

Shape memory wire 162 is engaged with clip chassis 160 in the manner shown in FIG. 9. When shape memory alloy wire 162 is activated, it shrinks and pulls apart clip chassis 160.

To lock pin 152 into main body 156, pin 152 may be pushed by hand, by pressure on cap 164, into aperture 154. Clip chassis 160 and clip spring 158 open sufficiently to allow pin 152 to be received, so that clip chassis 160 engages groove 163 on pin 152.

To unlock pin 152 from main body 156, as already described, wire 162 is heated sufficiently for it to contract. Because of the manner of attachment of wire 162 to clip chassis 160 (refer FIG. 9) through engagement in channels 166 and 170, contraction of wire 162 pulls apart clip chassis 160 sufficiently for pin 152 to be withdrawn from clip chassis 160. Clip chassis 160 is hinged at 168.

Fastening system 150 includes controller panel 172 which receives instructions for unlocking and which generates the heat necessary for contraction of wire 162. Rear cover 174 completes the housing of fastening system 150.

Clip spring 158 biases clip chassis 160 towards the locked position and in this embodiment assists wire 162 to return to the locked position when it relaxes.

In a variation of fastening system 150, clip chassis 160 may be eliminated. In this case, clip spring 158 is adapted to be engaged by shape memory alloy wire 162 and to be pulled apart by contraction of the wire when it is desired to unlock the fastening system.

Reference is now made to the embodiment shown in FIGS. 8B to 8G. Where parts are similar to those in FIGS. 8A and 9, the same numbers will be used, with the addition of the letter "a".

Figure 8B:
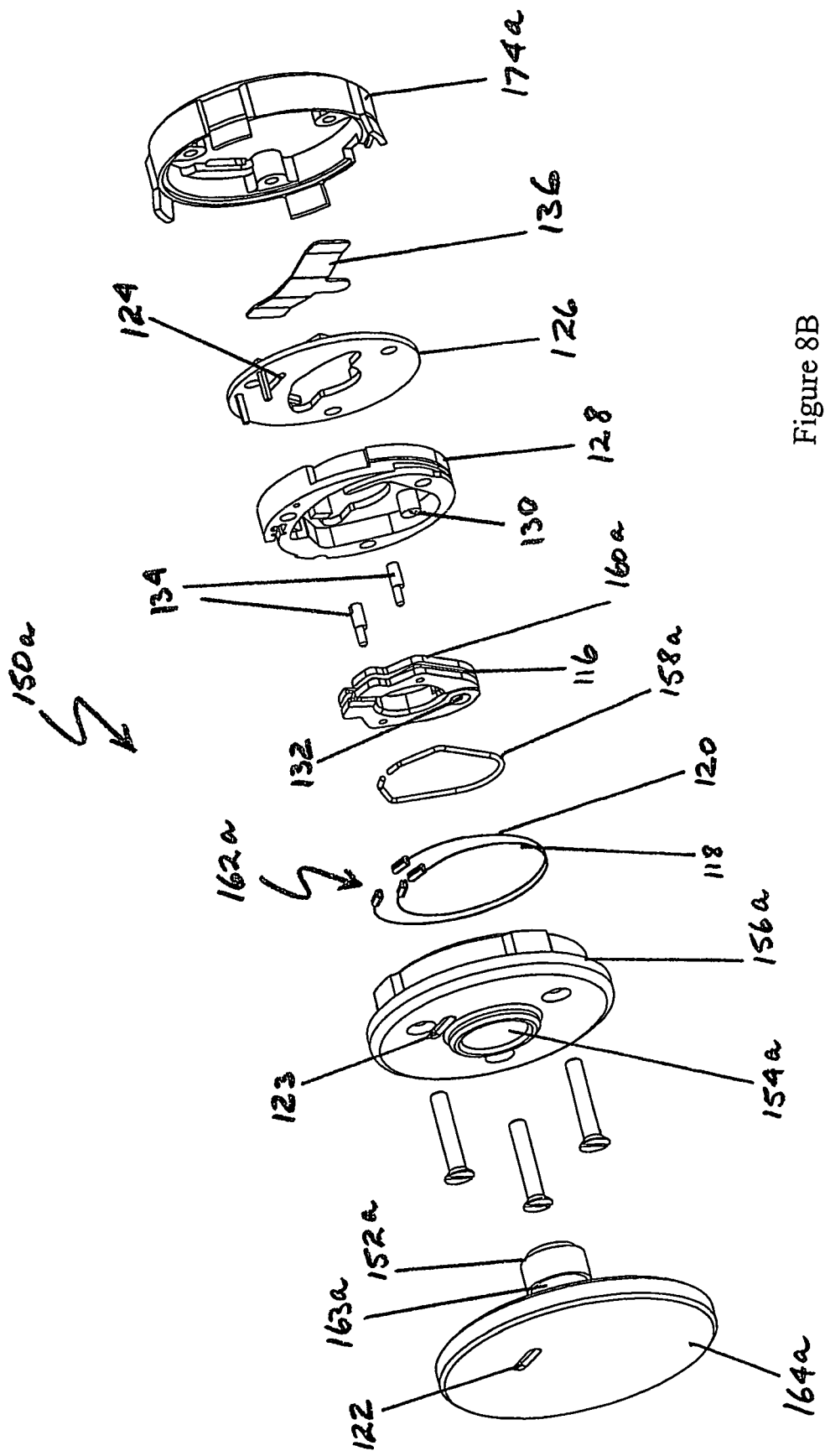
FIG. 8B is an exploded view of a variation of the second embodiment shown in FIG. 8A.

As shown in FIG. 8B, releasable fastening system 150a includes a pin 152a adapted to be received in an aperture 154a of main body 156a. Spring 158a, together with clip chassis 160a and shape memory alloy wires 162a comprise the locking means for pin 152a.

Pin 152a has a wide grove 163a around its circumference. Grove 163a is adapted to receive clip chassis 160a which can embrace grove 163a. Spring 158a snaps into grove 116 of clip chassis 160a and biases it towards the engagement position.

Shape memory wire 162a has two separate loops, 118 and 120. These are engaged with clip chassis 160a in the manner shown in FIG. 8C. It will be appreciated in comparing FIG.

8C with FIG. 9, that shape memory alloy wires 118 and 120 will be under less strain than wire 162 in FIG. 9, when activated to contract.

To lock pin 152*a* into main body 156*a*, pin 152*a* may be pushed by hand, by pressure on cap 164*a*, into aperture 154*a*. Clip chassis 160*a*, although bias to the closed position by spring 158*a*, will open sufficiently to allow pin 152*a* to be received, so that clip chassis 160*a* engages grove 163*a* on pin 152*a*.

Figure 8C:
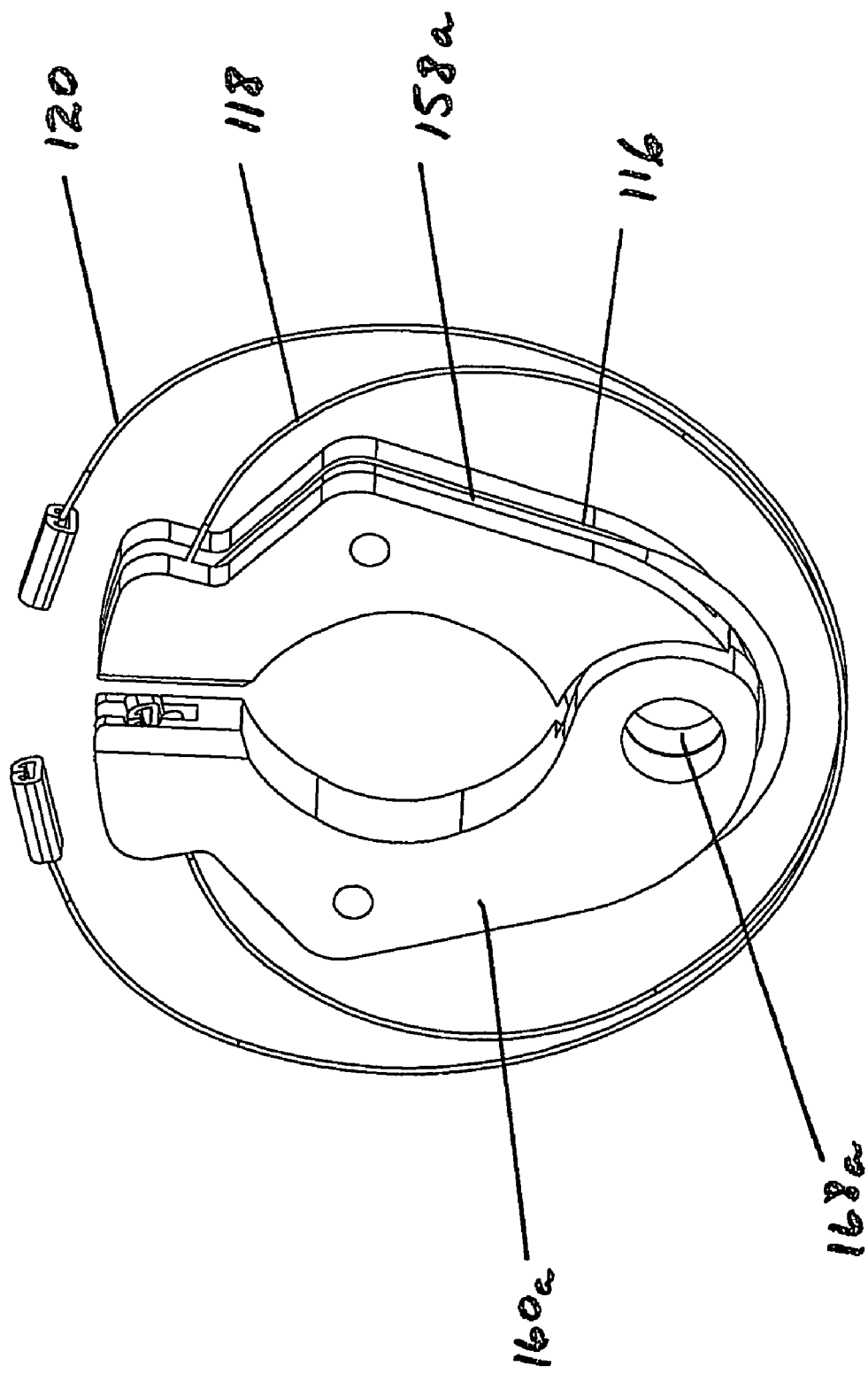
FIG. 8C shows a sub-assembly of FIG. 8B.

To unlock pin 152*a* from main body 156*a*, as already described, both wires 118 and 120 of wires 162*a* are heated sufficiently for them to contract. Each of wires 118 and 120 is attached to clip chassis 160*a* as shown in FIG. 8C. Consequently, contraction of wires 118 and 120 pulls apart clip chassis 160*a* sufficiently for pin 152*a* to be withdrawn from clip chassis 160*a*. Clip chassis 160*a* is hinged at 168*a*.

Figure 8E:
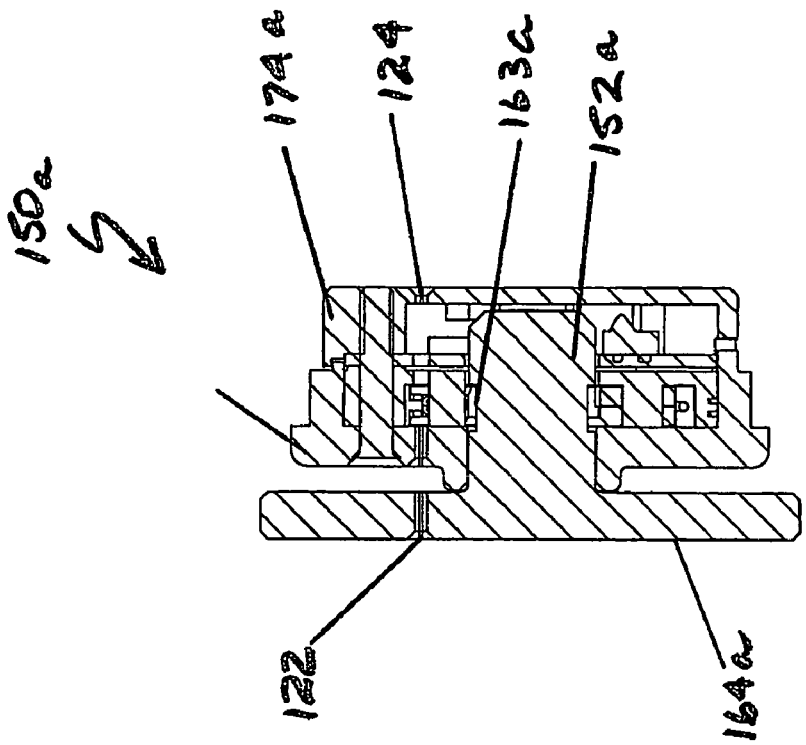
FIG. 8E is a sectional view taken along the lines A-A of FIG. 8D.
Figure 8D:
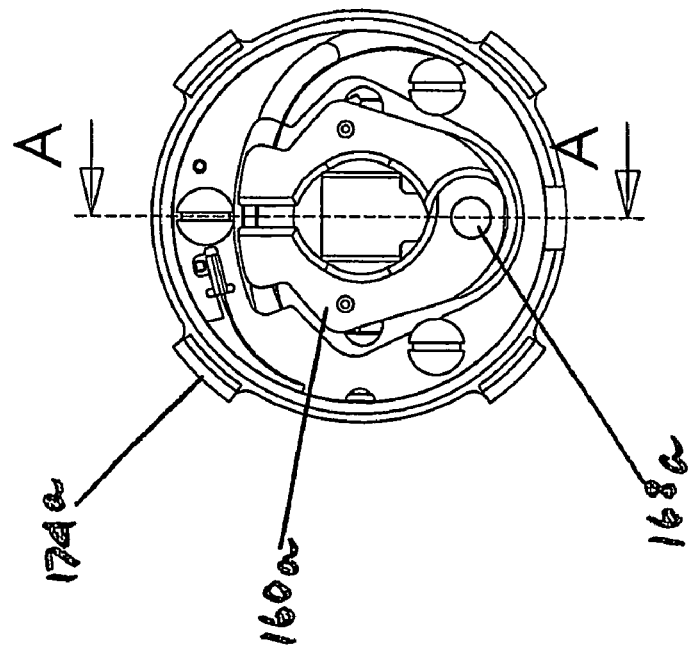
FIG. 8D shows part of the assembly of FIG. 8B in the engaged position.
Figure 8G:
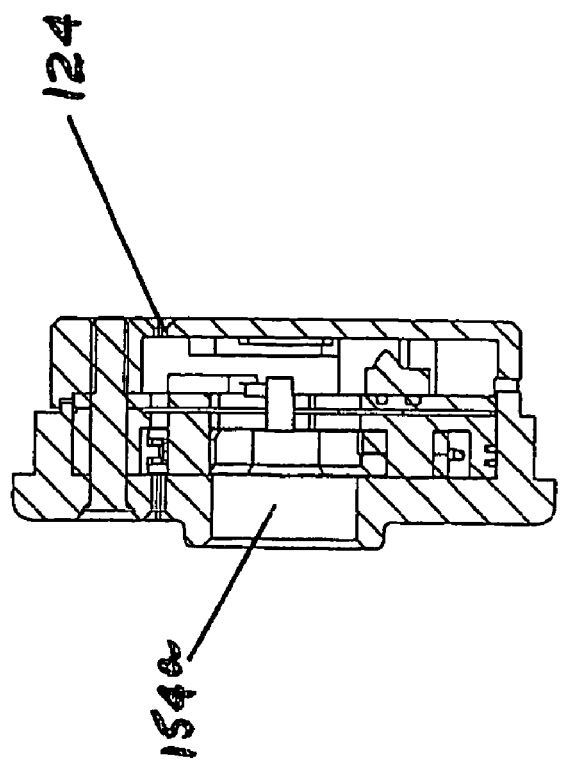
FIG. 8G is a sectional view taken along the lines A-A of FIG. 8F.
Figure 8F:
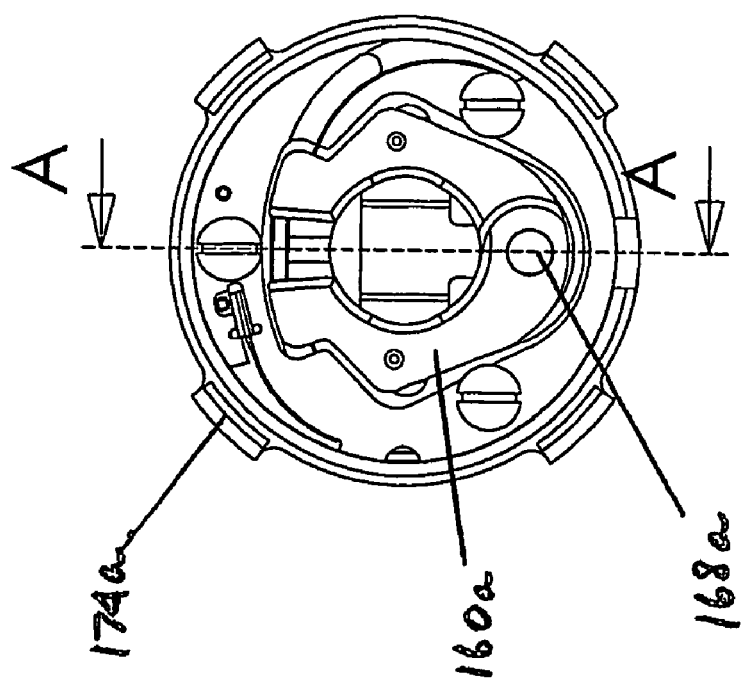
FIG. 8F is a similar view to FIG. 8D but showing the disengaged position.

Means for a manual override of fastening system 150*a* are shown in FIGS. 8B and 8E. Cap 164*a* includes slot 122. A suitable tool may be inserted in slot 122 in cap 164*a* and through corresponding slot 123 in main body 156*a*. The tool can then penetrate between the arms of clip chassis 160*a* to force them apart sufficiently to release pin 152*a*.

In this embodiment, the manual override can be operated not only from the cap side of fastening system 150*a*, but also from rear cover 174*a*. As shown in FIG. 8E, slot 124, corresponding to slot 122 on cap 164*a* in plate 126 is accessible from rear cover 174 and the same tool may be used to manually release pin 152*a*, in a similar way to that described for slot 122.

In FIGS. 10 to 13, ring clip fastener 94 is particularly suitable for securing components to a panel, such as an instrumentation panel. Fastener 94 is shown in the locked state in FIGS. 10 and 11 as engaging fastener peg 98 and in FIGS. 12 and 13 after release of fastener peg 98.

Fastener peg 98 includes groove 104. When peg 98 is pushed into fastener 94, arms 106 of bias spring 108 are pushed apart by ramp 110 on peg 98. Arms 106 snap fit into groove 104 to lock peg 98 in fastener 94. Thus an instrumentation panel can be mounted in a panel housing by simple manual pressure, for example.

Included in fastener 94 is engagement sensor 112 which senses contact with base 114 of peg 98. Engagement sensor 112 confirms engagement of peg 98 in fastener 94 and can communicate that information to a computer (not shown).

Figure 10:
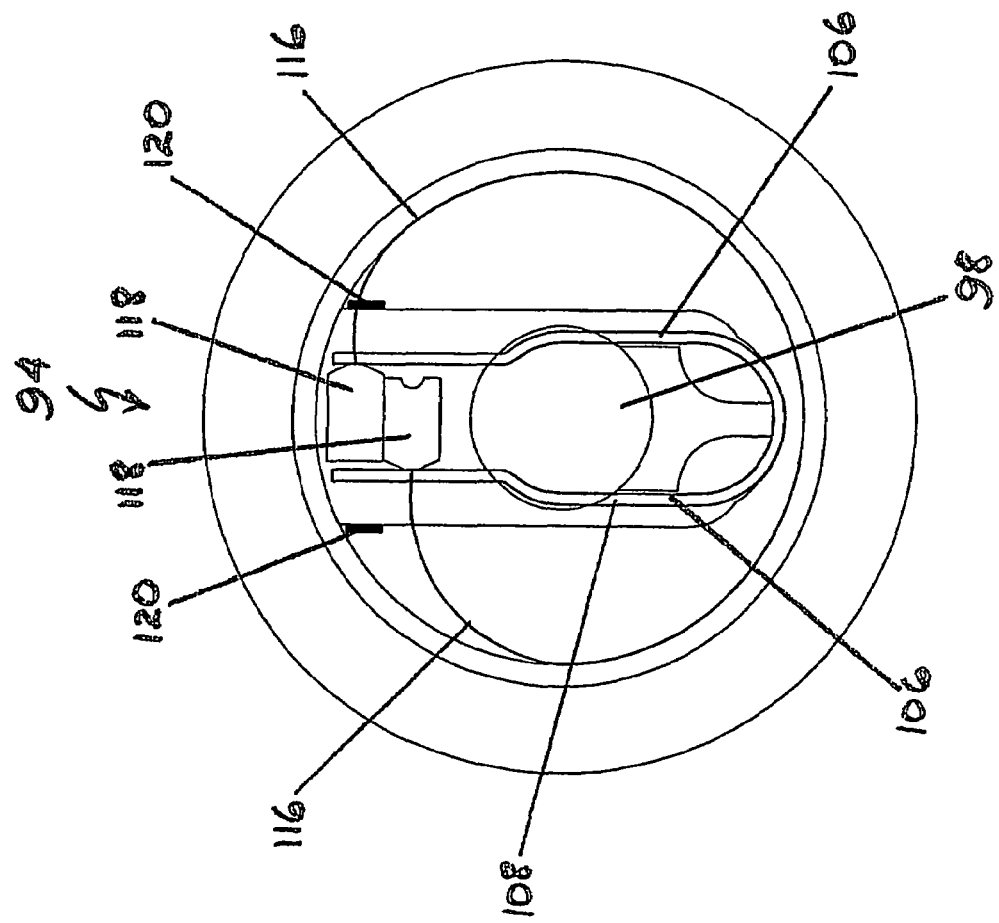
FIG. 10 is a top plan view of a third embodiment of the fastening system of the second aspect of the invention.
Figure 13:
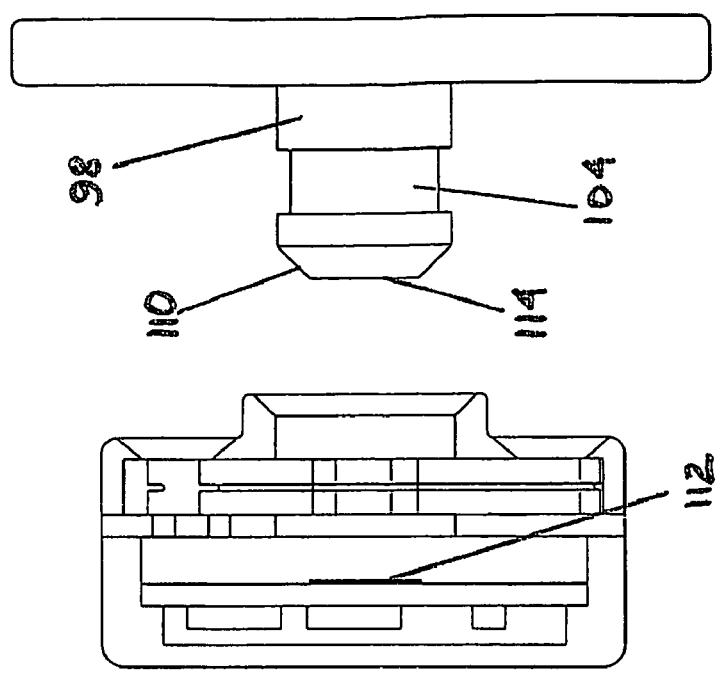
FIG. 13 is a cross-sectional view of the ring clip fastener of FIG. 12 in the unlocked state and is useful for comparison with FIG. 11.

As can be seen from FIG. 10, fastener 94 includes a shape memory alloy (SMA) wire 416 which is connected to terminals 418 which bear on arms 106 of bias spring 108.

Figure 12:
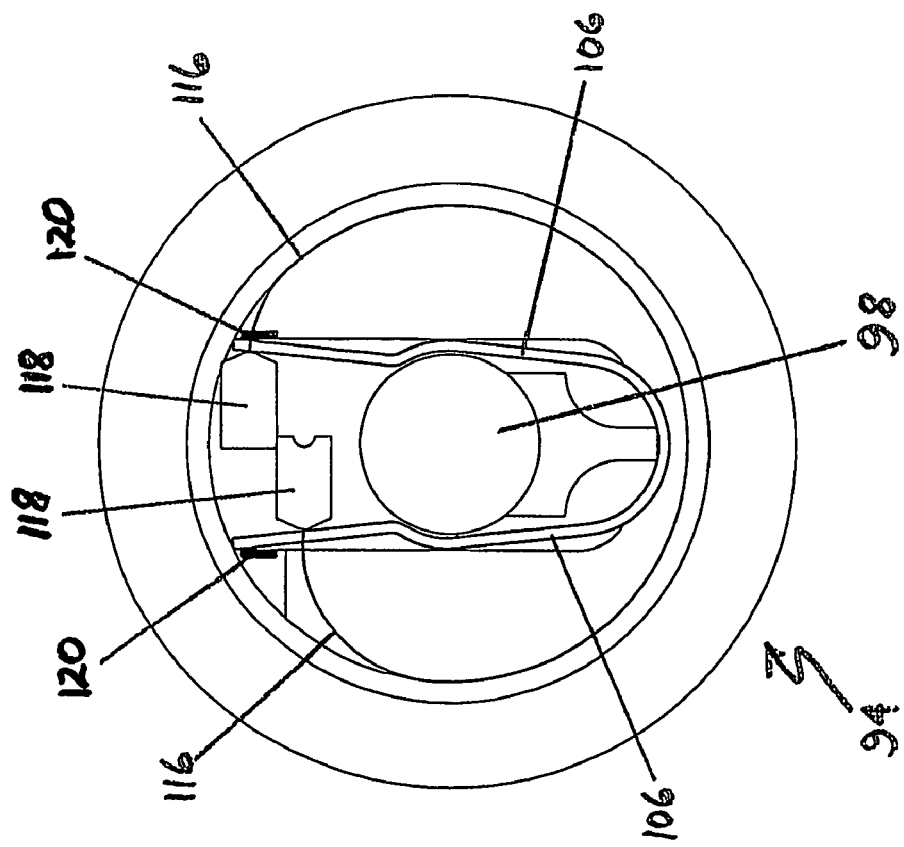
FIG. 12 is a top plan view of the fastening system of FIGS. 10 and 11, but in the unlocked state.

When appropriate energy is applied to SMA wire 416—for example, electrical energy—and SMA wire 416 is heated to the necessary temperature, SMA wire 416 contracts as shown in FIG. 12. Contraction of SMA wire 416 causes terminals 418 to move apart. Because terminals 418 bear on arms 106, those arms 106 are forced apart. Arms 106 move out of groove 104, permitting release of peg 98. Engagement sensor 112 can report on the release of peg 98.

Included in fastener 94 are sensors 420 which sense the locked status of fastener 94. When fastener 94 is in the unlocked state as shown in FIG. 14, it will be seen that arms 106 contact sensors 120 and thus can complete a circuit or act as a reed switch so that sensors 120 can report on the locked or unlocked status of fastener 94.

Figure 14:
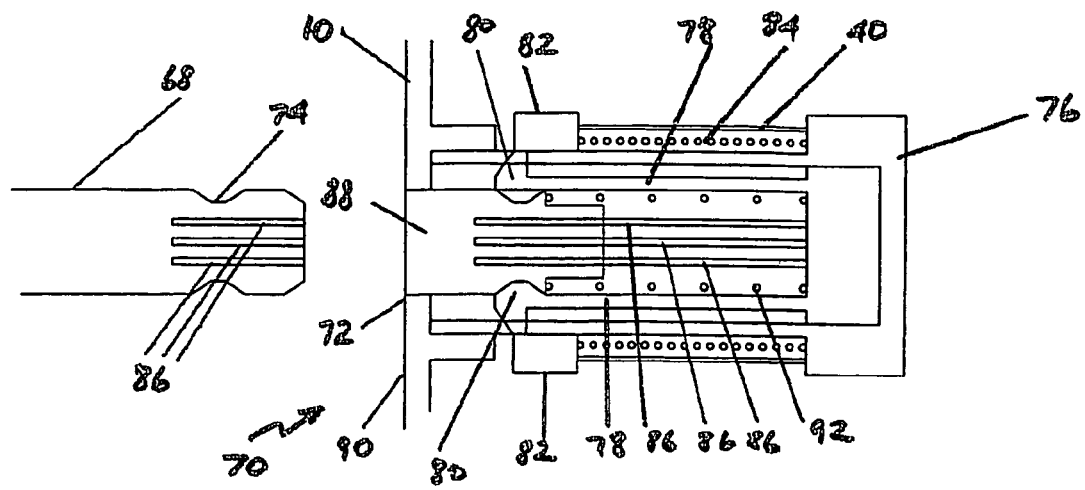
FIG. 14 is a further embodiment of the fastening system of the second aspect of the invention, being a stud fastener, before entry of the pin into the aperture.
Figure 15:
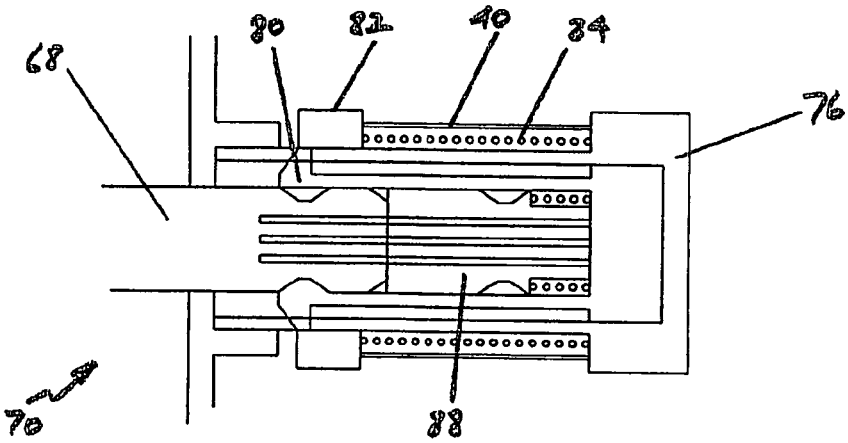
FIG. 15 shows the fastening system of FIG. 14 in the locked position.
Figure 16:
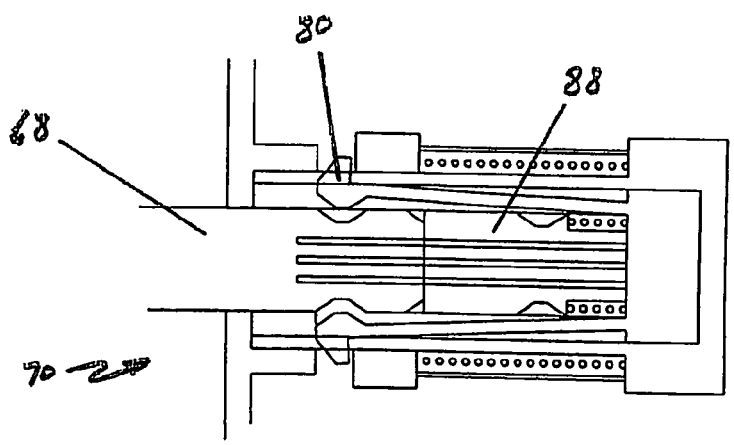
FIG. 16 shows the fastening system of FIGS. 14 and 15 in the unlocked position.

Referring now to FIGS. 14 to 16, these show an embodiment of a stud fastening system in the second aspect of the invention. In this embodiment, releaseable fastening system 70 includes pin 68 adapted to be received in aperture 72. Pin 68 has a locking cavity in the form of indentation 74 around the circumference of pin 68. Associated with aperture 72 in fastener body 76 are locking means in the form of arms 78 having protrusions 80 designed to fit within indentation 74 in pin 68.

Once pin 68 is pushed into aperture 72, protrusions 80 on arms 78 snap into indentation 74. Stop 82 prevents disengagement by blocking outward movement of protrusions 80 on arms 78. Activation of shape memory alloy wire 40 contracts wire 40 and draws stop 82 from its blocking position against arms 78. Arms 78 may be biased to spring outwardly as shown in FIG. 16, facilitating withdrawal of pin 68 from aperture 72. Spring 84 is biased to urge stop 82 to the locked position shown in FIGS. 14 and 15.

In the illustrations in FIGS. 14 to 16, both pin 68 and fastener body 76 include conductor pins 86. These are optional. They may be used to provide power and data connections for the fastening system 70.

Another optional feature is shown in FIGS. 14 to 16, in the form of retractable cap 88. This is used to provide a flat visual appearance on outer surface 90 of frame 10. In the embodiment shown, it is necessary to activate wire 40 in order to draw stop 82 from its blocking position against arms 78. Once that has occurred, pin 68 can push cap 88 against the bias provided by spring 92, from the position shown in FIG. 14 to that in FIG. 15. In this position, shape memory alloy wire has relaxed to lock pin 68 into position. FIG. 16 shows the unlocked position before withdrawal of pin 68 from aperture 72.

Figure 17:
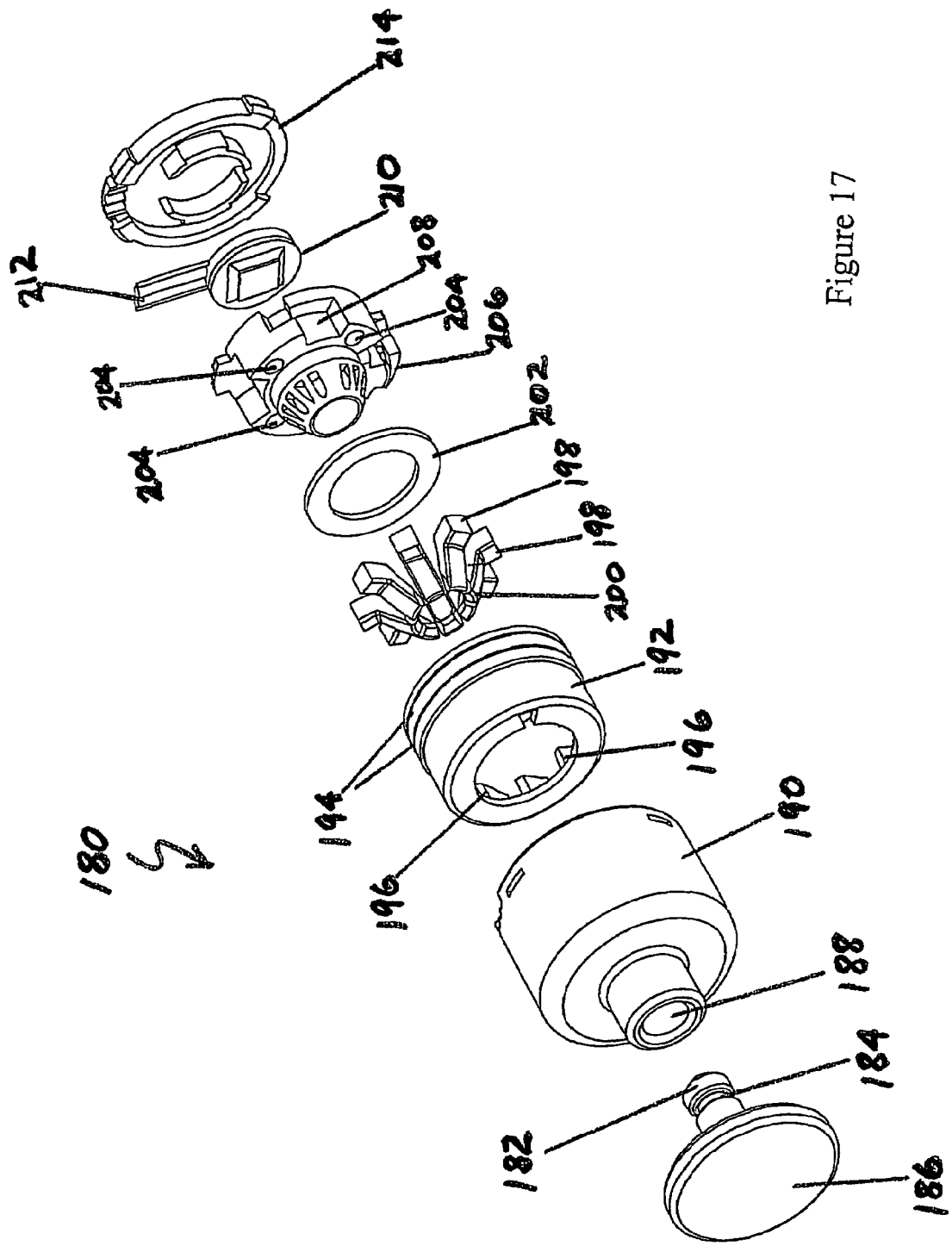
FIG. 17 is an exploded view of a further embodiment of the second aspect of the invention, showing a second embodiment of stud fastener.
Figure 19:
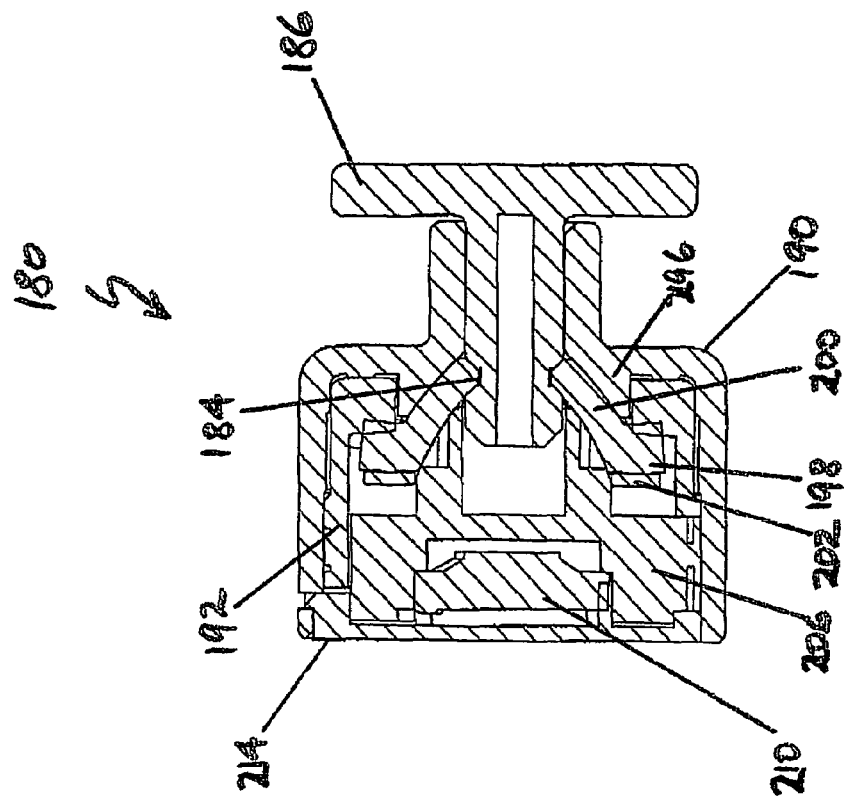
FIG. 19 is a cross-sectional view of the embodiment of FIG. 18, taken along the lines A-A of FIG. 18.
Figure 18:
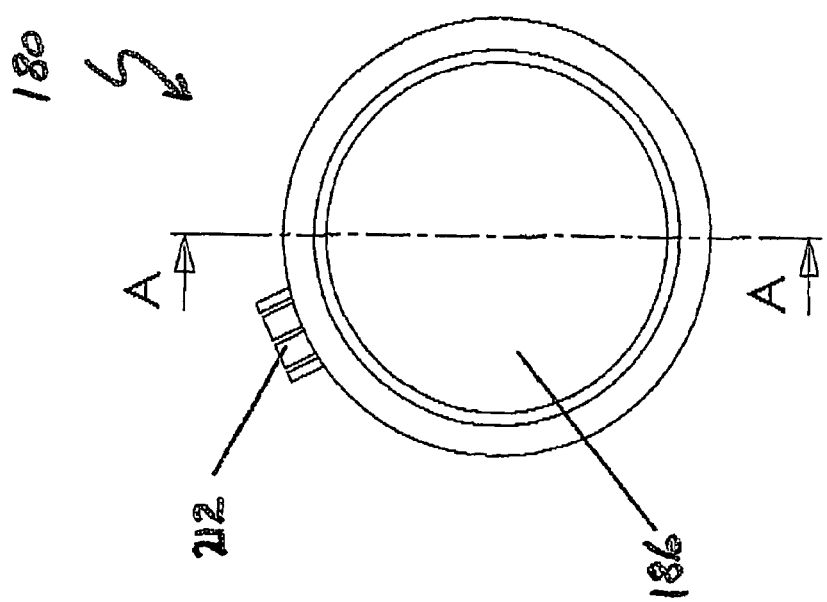
FIG. 18 is a top view of a variation of the embodiment in FIG. 17.
Figure 22:
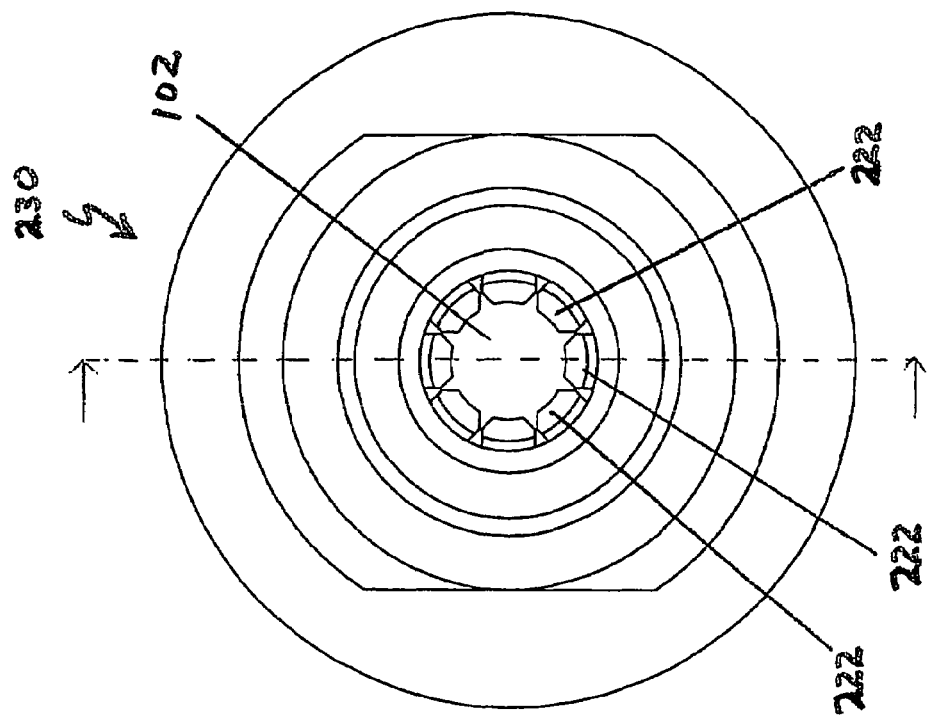
FIG. 22 is a top plan view of a further embodiment of the fastening system of the invention being a type of stud fastener.

Referring now to FIGS. 17, 18 and 19, the stud fastening system 180 in this embodiment is particularly suitable for heavy duty use. In this embodiment, pin 182 having groove 184 and cap 186 is adapted to be received in aperture 188 of main body 190. Received in main body 190 is shuttle 192. Shuttle 192 is adapted to rotate within main body 190 when a shape memory alloy wire (not shown) wound in grooves 194 contracts. Activation of the shape memory alloy wire causes shuttle 192 to rotate in a direction which allows unlocking of fastening system 180.

Shuttle 192 includes projections 196 which are designed to engage feet 198 of teeth 200. Projections 196 may be inclined as shown in FIG. 17 or may be set an angle of approximately 45 degrees as shown in FIG. 19.

Washer 202 rests at the base of feet 198 when fastening system 180 is assembled. Small coil springs (not shown) are mounted in apertures 204 and bear against washer 202 to apply pressure against teeth 200. Apertures 204 are formed in centre plug 206. Aperture 208 is designed to receive a further bias spring (not shown), which assists in returning that the shape memory alloy wire (not shown) to its relaxed configuration, when no longer activated.

Electronics module 210 is shown in this embodiment as being hard wired through cable 212 and controls unlocking of fastening system 180. End cap 214 completes the assembly.

In the variation shown in FIGS. 20 and 21, main body 190 is shown with a screw thread 216 on which is received a nut 218. The purpose of nut 218 is to allow an element, such as a panel (not shown), to be received in gap 220.

End cap 214 has a central aperture (not shown) through which it is possible to insert an appropriate tool to rotate shuttle 192 manually in the event that there is some malfunction of the fastening system.

It will be noted from FIG. 21 that washer 202 has been omitted and that teeth 200 are of a slightly different configuration to those in FIG. 19.

Reference is now made to FIGS. 22 to 25. These illustrate a stud fastener which can be substituted for the ring clip fastener of FIGS. 10 to 13. The stud fastener of FIGS. 22 to 25 can be regarded as more robust and can carry a higher load compared to the ring fastener of the previous FIGS. 10 to 13.

Figure 24:
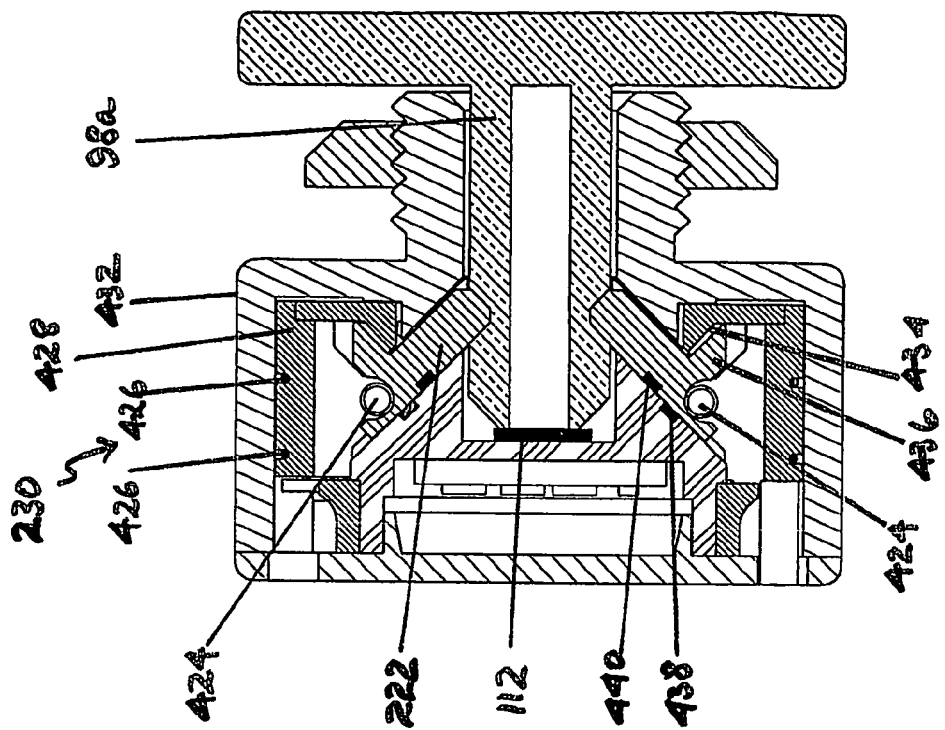
FIG. 24 is the same cross-sectional view as that of FIG. 23, but showing engagement of a pin.
Figure 25:
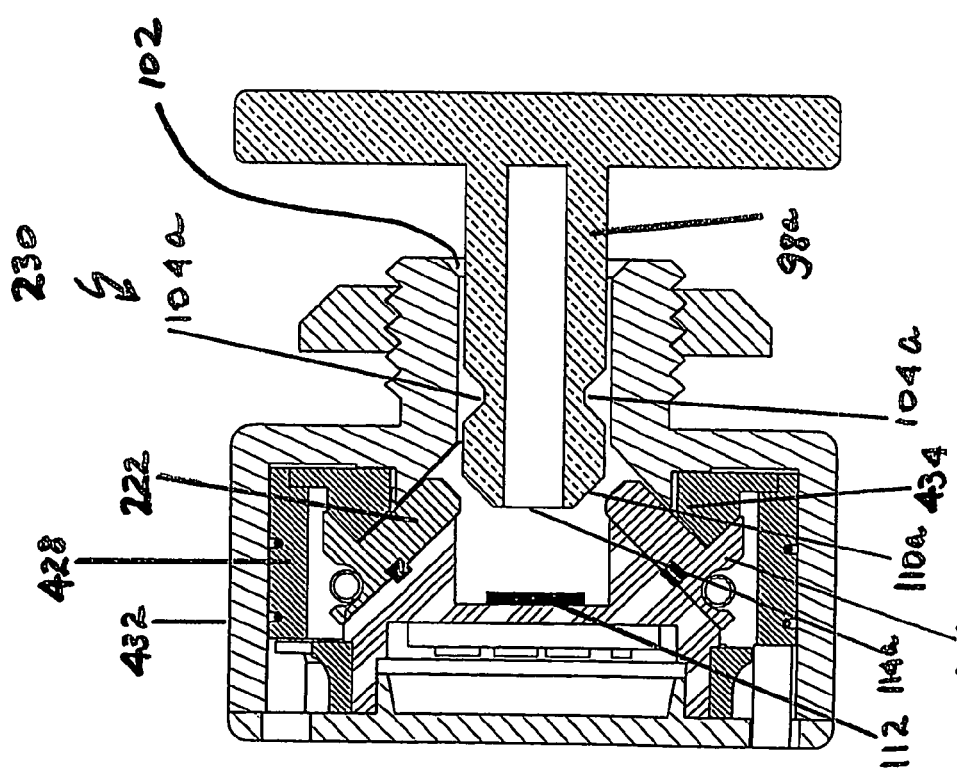
FIG. 25 is a cross-sectional view of the fastening system of FIG. 22 in the unlocked state and is useful for comparison with FIG. 24.

Peg 98 of FIG. 10 is substituted by peg 98a shown in FIGS. 24 and 25.

Fastening system 230 of FIGS. 22 to 25 has a plurality of teeth 222 adapted to engage groove 104a in peg 98a. Teeth 222 are biased towards the locked position by tension spring 424. Tension spring 424 also serves to keep teeth 222 in position. Peg 98a can be pushed into aperture 102. Ramp 110a on peg 98a will push against teeth 222 and against the tension of spring 424. As peg 98a is pushed into aperture 102, teeth 222 will spring back into groove 104a to lock peg 98a into fastening system 230.

Fastening system 230 includes engagement sensor 112. When contacted by base 114a of peg 98a, engagement sensor 112 can report connection of peg 98a in fastening system 230 and hence connection of elements to be fastened, such as an instrumentation panel in a panel housing.

Fastening system 230 includes shape memory alloy wires 426. These are wound around shuttle 428 which is rotatable within body 432 of fastening system 230. Shape memory alloy wires 426 are fastened at each end to a non-rotatable part of fastening system 230 (not illustrated). When shape memory alloy wires 426 are caused to contract by the application of suitable energy to reach the necessary temperature, shuttle 428 rotates to the position shown in FIG. 25. Shuttle 428 includes camming surface 434. As can be seen by FIG. 25, camming surface 434 ramps down on tail 436 of tooth 222, pushing tail 436 against the bias provided by tension spring 424 and drawing each tooth 222 out of engagement with groove 104a. Thus peg 98a is freed from fastening system 230. Tension spring 424 may also bias shape memory alloy wires 426 to their relaxed configuration.

Figure 23:
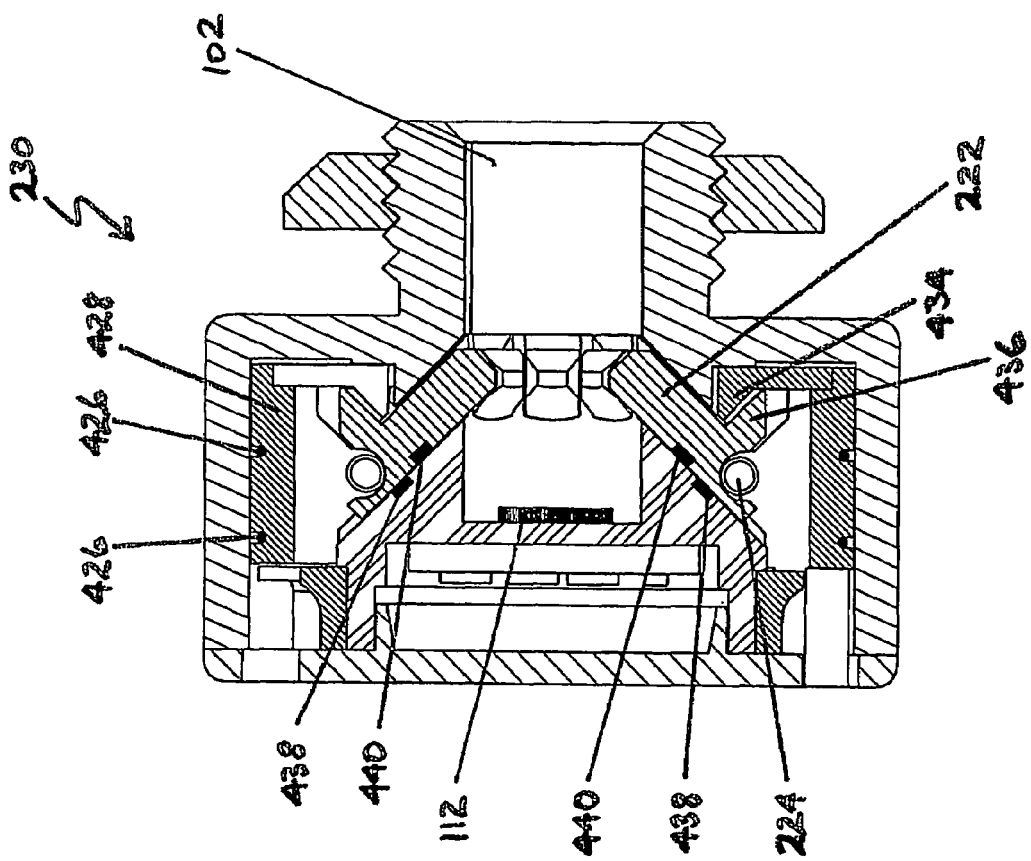
FIG. 23 is a cross-sectional view of the fastener of FIG. 22 in the locked state.

Included in fastening system 230 are lock status sensors 438 and 440. When these are separated as shown in FIGS. 23 and 24, the sensors report that fastening system 230 is in the locked state. When the sensors make contact, as shown in FIG. 25, the sensors report that fastening system 230 is in the unlocked state. Sensors 438 and 440 may act as a reed switch, for example, or their contact may enable completion of an electrical circuit, to signal the unlocked state. Other configurations and means of sensing may of course be applicable.

Reference is now made to the embodiment of the second aspect of the invention in FIGS. 26 to 33. Fastening system 260 includes stud 254 having a locking cavity being circumferential groove 256 (refer FIGS. 31 and 33). Fastening system 260 includes aperture 258 into which stud 254 can be received by a push-fit.

Fastening system 260 includes eight teeth 262, each having a tongue 264 which can engage groove 256.

Shuttle 266 is mounted for rotation within body 268 between two positions. The first position is that shown in FIG. 28 where locking protrusions 270 maintains teeth 262 in the locking position into aperture 258 (and groove 256 of stud 254 when stud 254 is in aperture 258). The second position is that shown in FIG. 29, in which shuttle 266 has rotated sufficiently so that teeth 262 are located in spaces 272 between locking protrusions 270. In this configuration, teeth 262 are no longer maintained in the locked position in aperture 258 (and groove 256 in stud 258 when present).

Shuttle 266 is rotated from one position to the other through shape memory alloy wires 274 and 276, one being used to rotate shuttle 266 to the locking position and the other to rotate it to the unlocking position.

Figure 26:
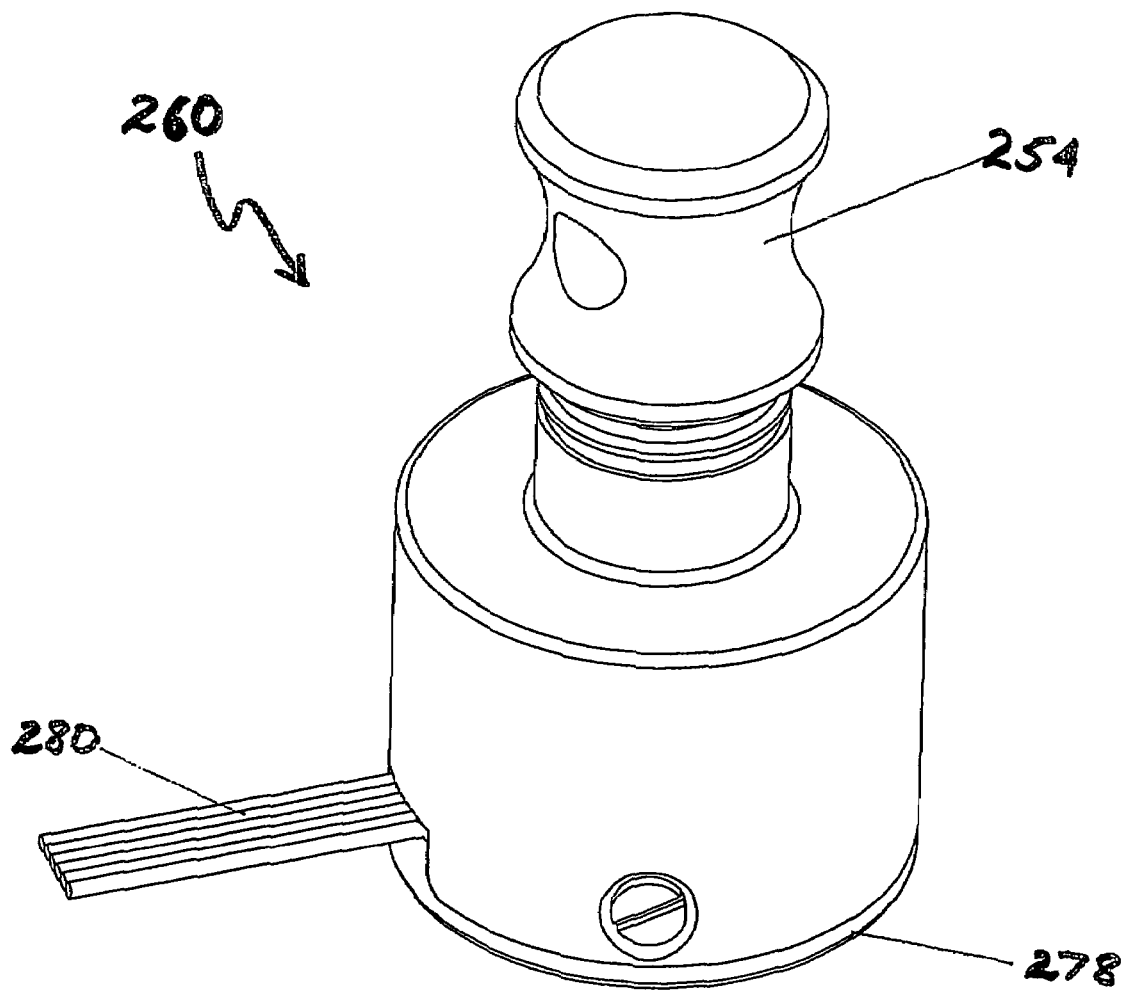
FIG. 26 is a perspective view of a further embodiment of the fastening system of the invention being a stud fastener.

As shown in FIG. 26, fastening system 260 includes rear cap 278. Power is supplied via electrical wires 280.

Figure 27:
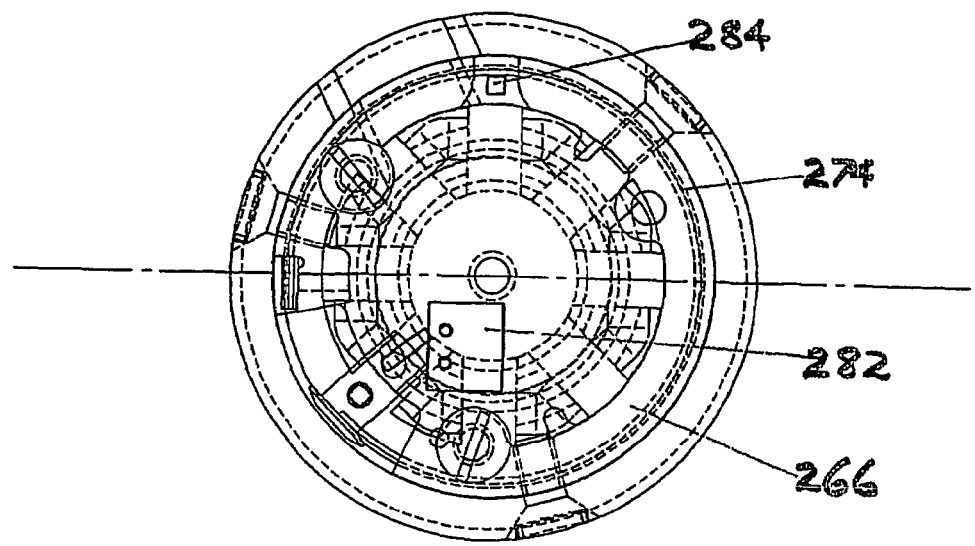
FIG. 27 is a bottom end view of the embodiment of FIG. 26 with the rear cap removed.
Figure 28:
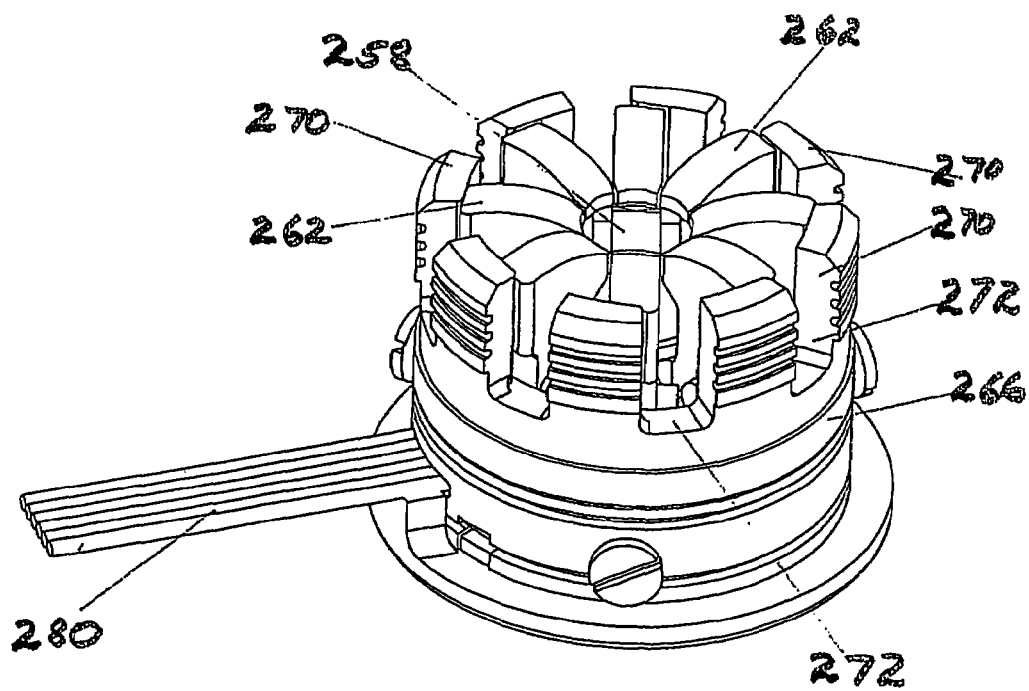
FIG. 28 shows the embodiment of FIG. 26 with the pin removed, in the locked state.
Figure 29:
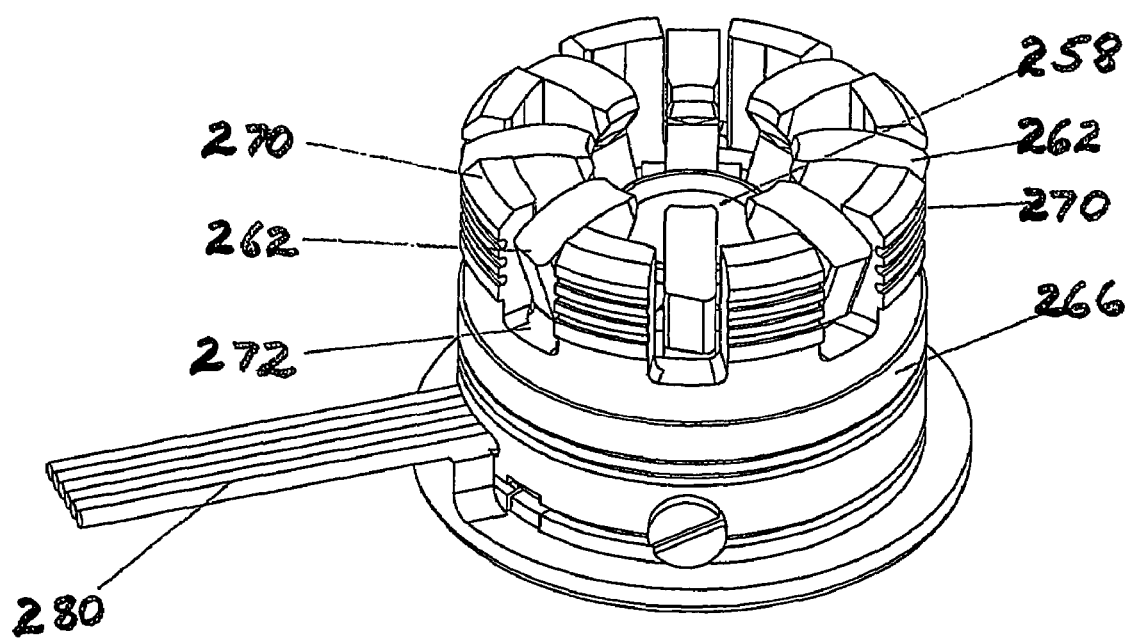
FIG. 29 shows the embodiment of FIG. 26 with the pin removed, in the unlocked state.

In FIG. 27, in which rear cap 278 has been removed, shape memory alloy wire 274 can be seen. Also shown is shuttle position sensor 282. This senses whether shuttle 266 is in the locking or unlocking position and can report to an external source (not shown).

FIG. 27 also shows wire temperature sensor 284. This senses the temperature of shape memory alloy wire 274 and 276 and can enable the calculation of the amount of power to be delivered to raise wire 274 or 276 to the desired temperature at which it contracts. Temperature sensor 84 can prevent overheating of wires 274 and 276 and can also minimise the amount of electrical energy required to be delivered to wires 274 and 276.

Figure 31:
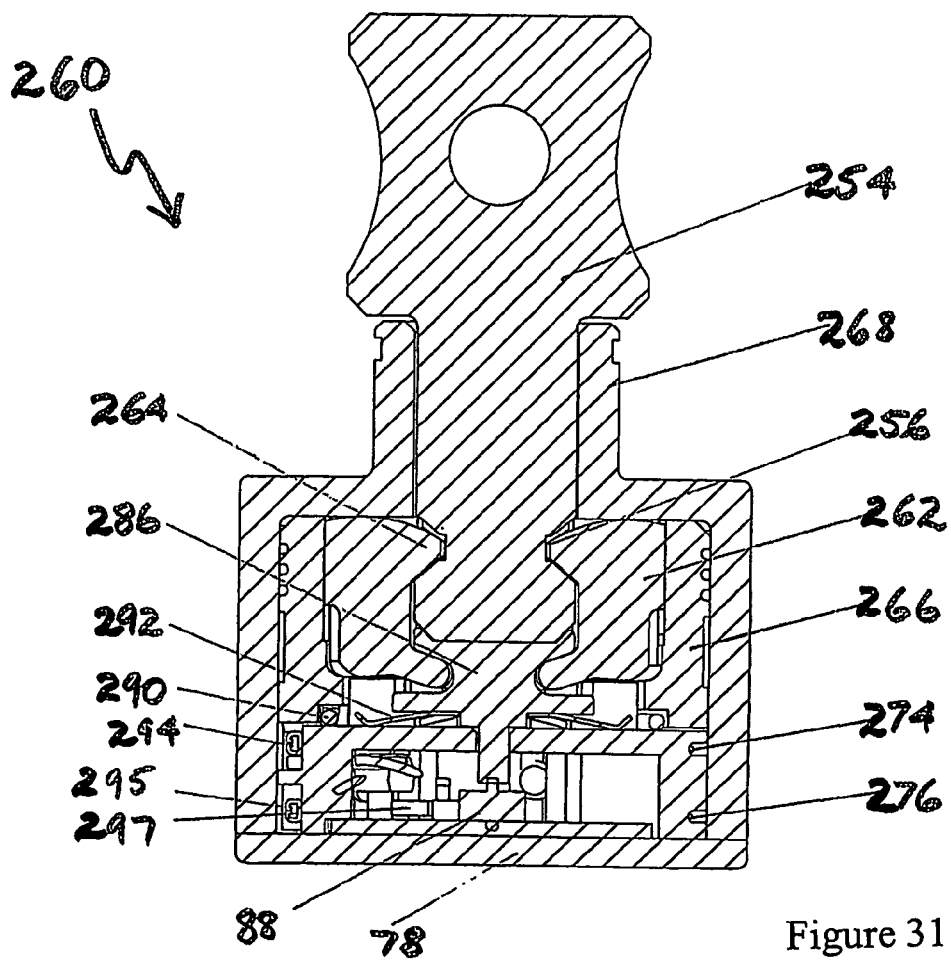
FIG. 31 is a sectional view of the fastening assembly of FIG. 30, taken along the lines 17-17 in FIG. 30.
Figure 33:
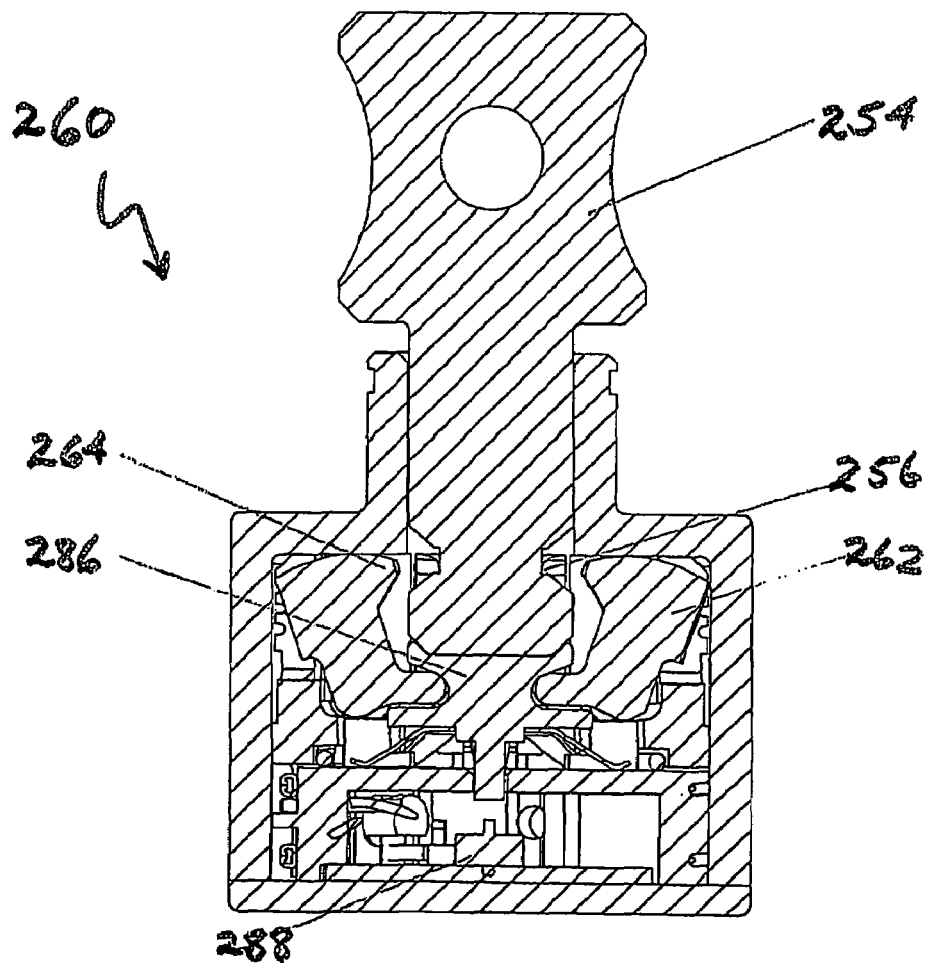
FIG. 33 is a sectional view of the fastener of FIG. 30, taken along the lines 19-19 in FIG. 32, in the unlocked position.
Figure 35:
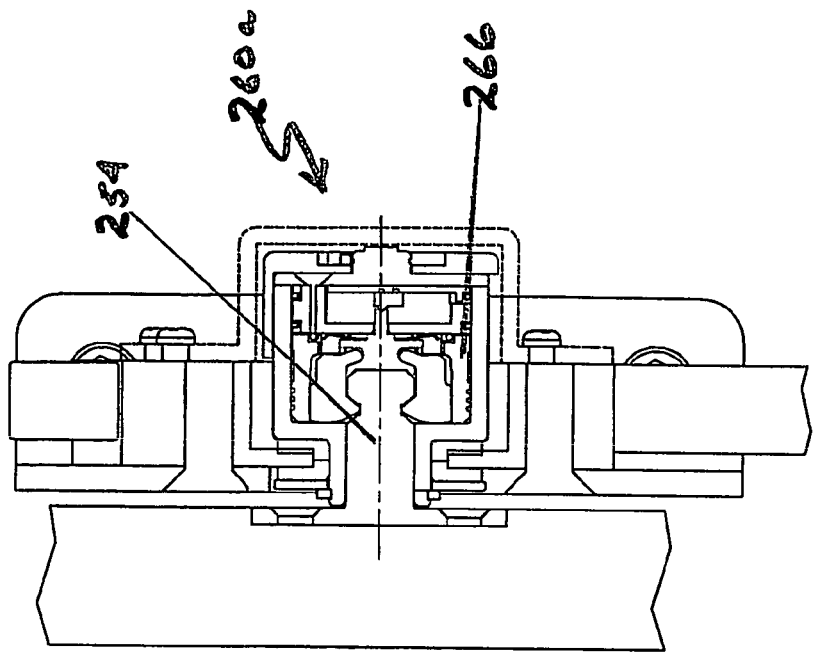
FIG. 35 is sectional side view of the override of FIG. 34, taken along the lines 20-20.

As best shown in FIGS. 31 and 33, fastening system 260 includes in this embodiment sliding plug 286. In the locked position (FIG. 31), sliding plug 286 is in contact with stud detector switch 288, because stud 254 has pushed sliding plug 286 down into contact with stud detector switch 288. This enables fastening system 260 to report on whether stud 254 is engaged.

Also shown in FIGS. 31 and 33 are bias spring 290 and ejector spring 292. Bias spring 290 biases fastening system 260 to the locking position. Ejector spring 292 facilitates ejection of stud 254 when teeth 262 are no longer engaged in groove 256, as shown in FIG. 33.

Shape memory alloy wires 274 and 276 are attached via crimps 294 and 295 as shown in FIGS. 31 and 33. Shuttle detector switch 297 detects whether shuttle 266 is in the locked or unlocked position.

Figure 30:
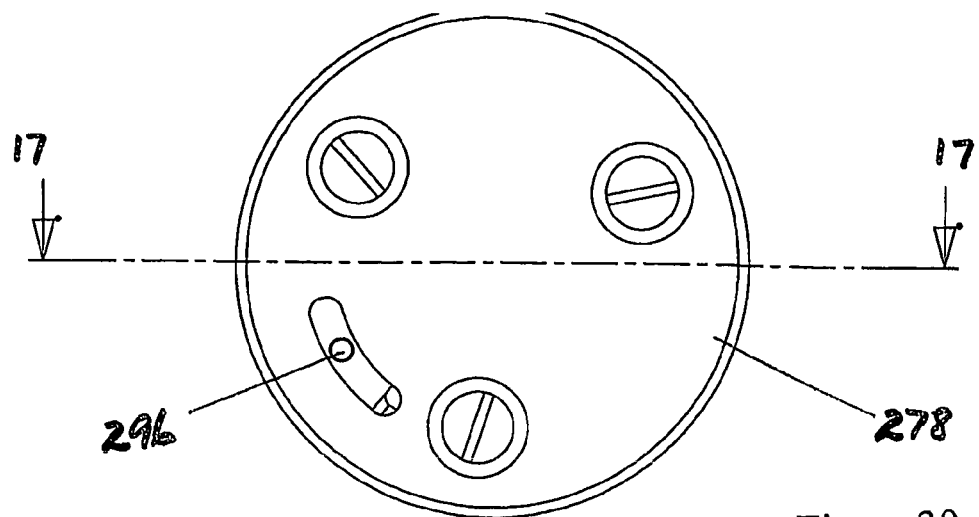
FIG. 30 is a bottom end view of the embodiment of FIG. 26, in the locked position.
Figure 32:
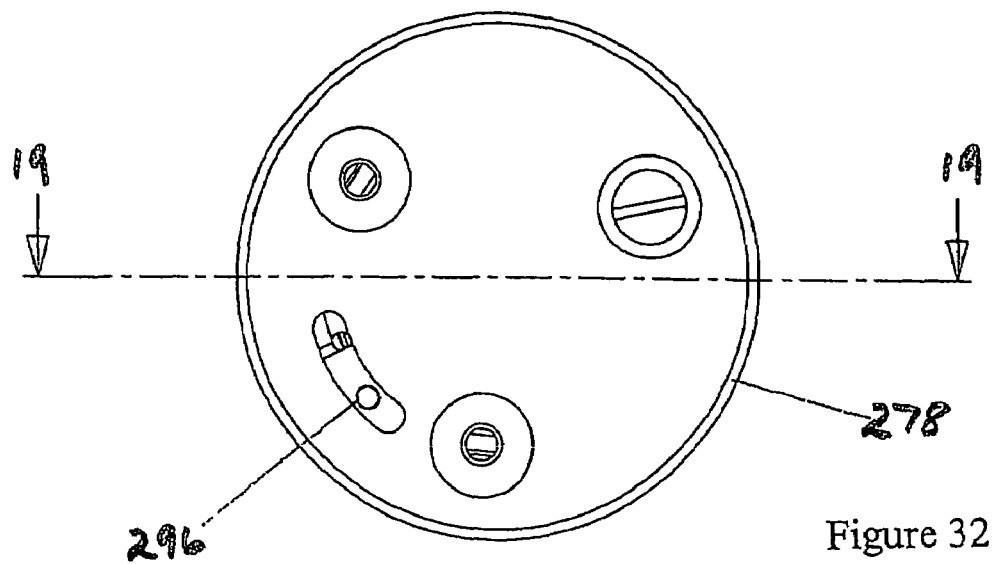
FIG. 32 is a bottom end view of the embodiment of FIG. 26, in the unlocked position.

FIG. 30 shows rear cap 278 with manual release 296. This can be operated, for example by hand, to manually rotate shuttle 266 from the locking to the unlocking position, as shown in FIG. 32.

Referring now to FIGS. 34 to 37, these show a fastening system 260a similar to fastening system 260 in conjunction with a manual override. Another suitable fastening system could be substituted for fastening system 260a. Manual override 400 has manual actuator 298 and drawing means being rod 402. Manual actuator 400 is joined to fastening system 260a and to rod 402 via protrusion 704 which engages manual actuator 298 through slot 706.

Figure 34:
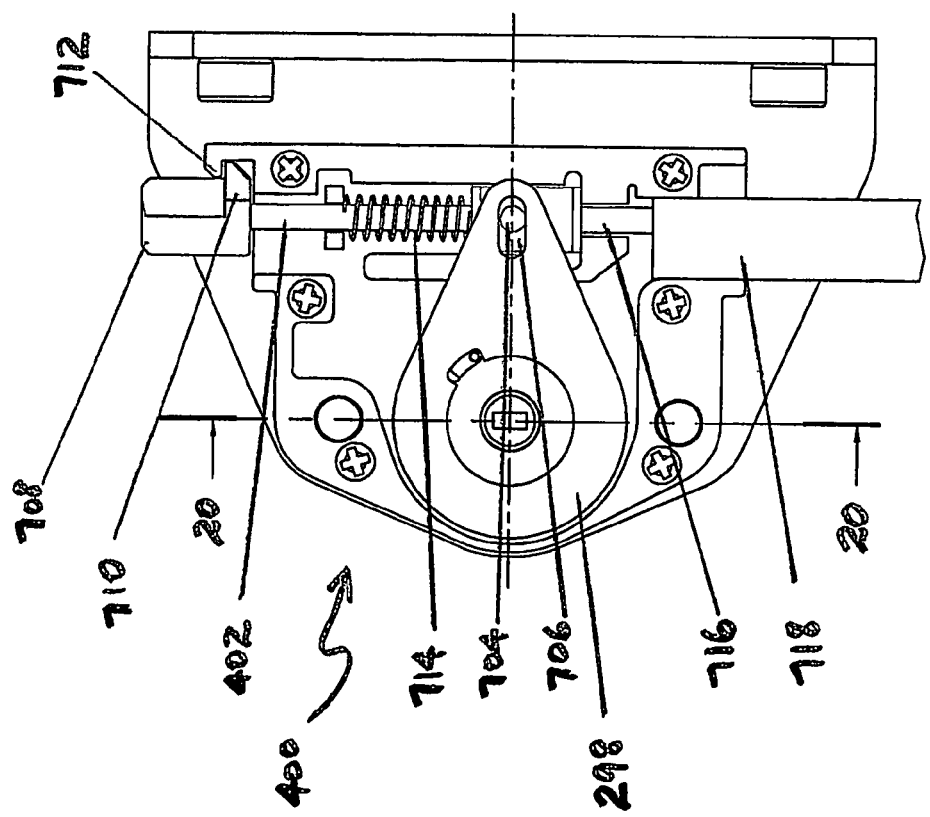
FIG. 34 is a plan view of a manual override for the fastening system of the second aspect of the invention.

Rod 402 is attached to knob 708 which has engagement ledge 710. Engagement ledge 710 is shown in FIG. 34 in engagement with catch 712. Spring 714 biases towards the locking position.

In order to operate manual override 400, knob 708 must be rotated by hand until ledge 710 is no longer in engagement with catch 712. Knob 708 is then drawn upwardly (FIG. 34) against the bias of spring 714, to rotate manual actuator 298 upwardly, through engagement of protrusion 704 in slot 706. Thus shuttle 266 is rotated from the locking position shown in FIG. 35 to the unlocking position shown in FIG. 37, manual actuator 298 being in the position shown in FIG. 36. At this stage, stud 254 is ejected as shown in FIG. 37 because of ejector spring 292.

Figure 37:
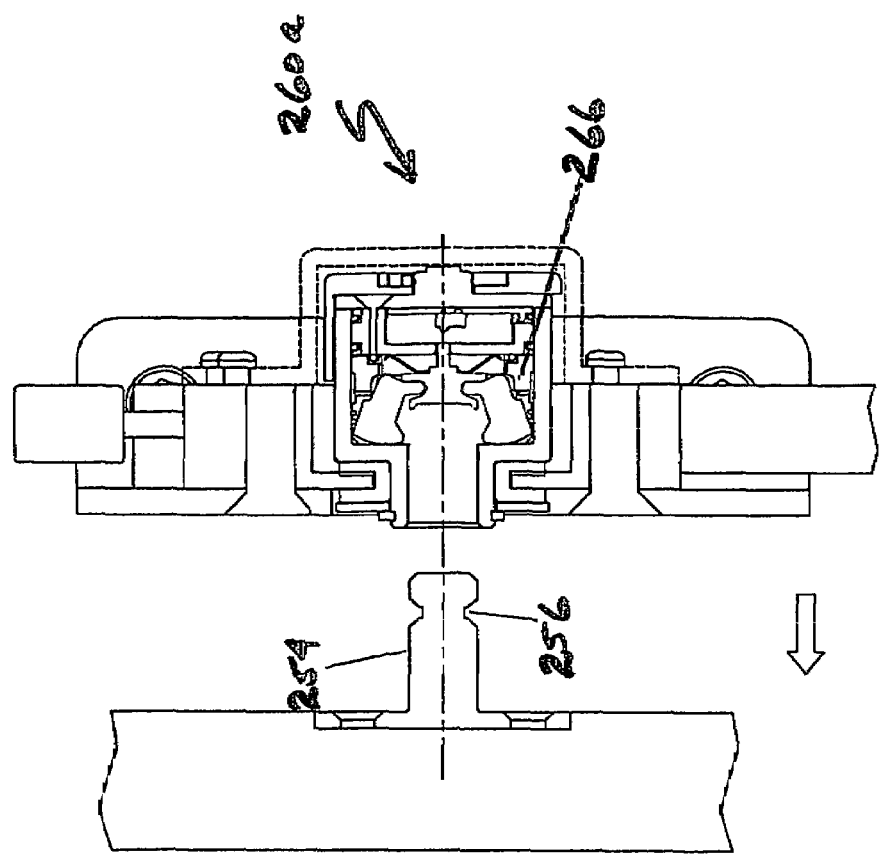
FIG. 37 is a side sectional view taken along the lines 23-23 of FIG. 36.
Figure 36:
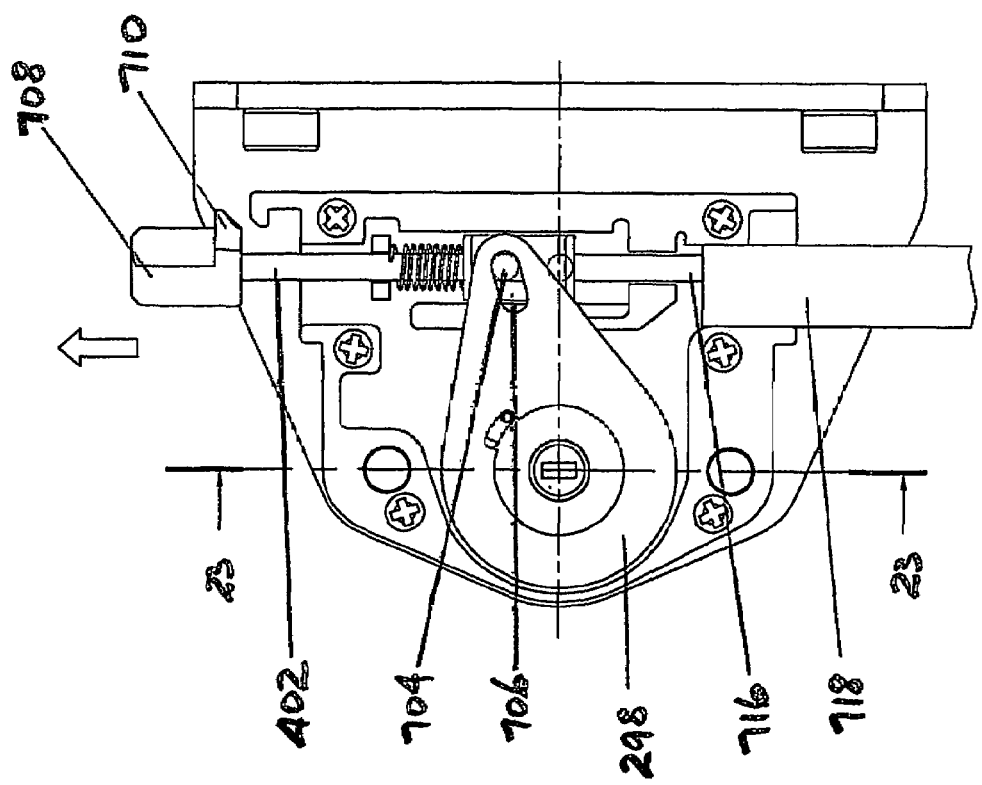
FIG. 36 shows the manual override of FIG. 34 in the unlocked position.

Also shown in FIG. 37 is actuator linkage 716. This links rod 402 with a second fastening system 260b, travelling through conduit 718, as shown in FIG. 38. As shown by the detail in FIGS. 39 and 40, when knob 708 is rotated free of catch 712 and drawn upwardly against the bias of spring 714, actuator linkage 716 ensures that both fastening system 260a and 260b are manually released.

As can be seen in more detail in FIGS. 39 and 40, in this embodiment fastening system 260a is situated under cover 720 and partly within mechanism casing 722, mounted on bracket 724.

FIGS. 41 to 46 show an embodiment of an in-line fastener, according to the second aspect of the invention.

As shown in FIGS. 41 to 46, fastening system 510 is contained within fastener mounting box 512 attached to an external power source through conduit 514. Fastening system 510, contained within box 512, is inserted into a panel (not shown) and secured in position by screws 516 attaching face plate 518 to flange 520 of fastener case 522, contained within box 512. Electrical connection via conduit 514 is continued into fastener case 522 by means of cable connector 526. Spring clip 528 is inserted beneath flange 520.

Figures 41, 42:
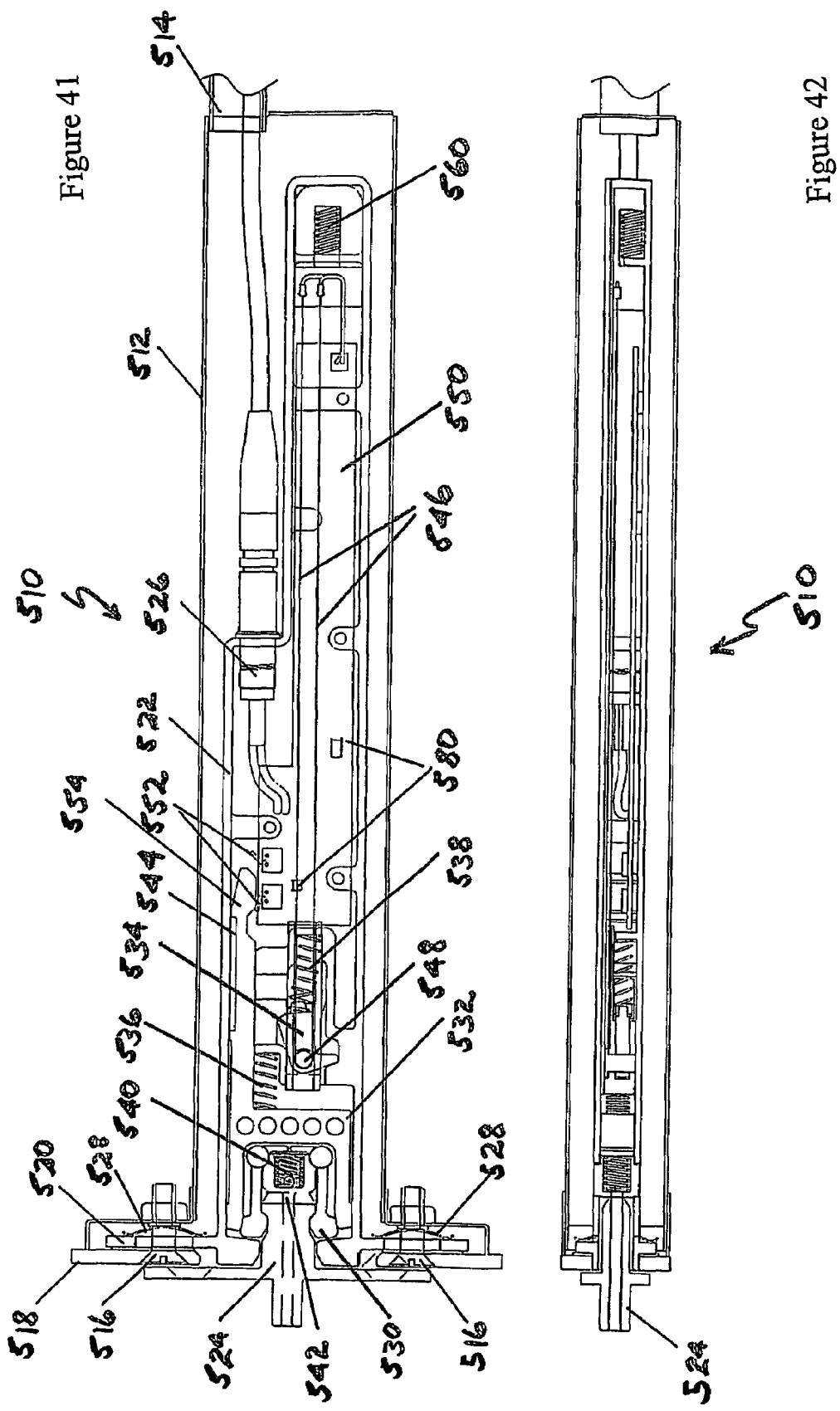
FIG. 41 is a side sectional view of a further embodiment of the fastening system of the invention, being a type of in-line fastener, showing the fastening system in the locked position and also illustrating an embodiment of a strain reduction assembly.
FIG. 42 is a top sectional view of the embodiment of FIG. 41.
Figure 43:
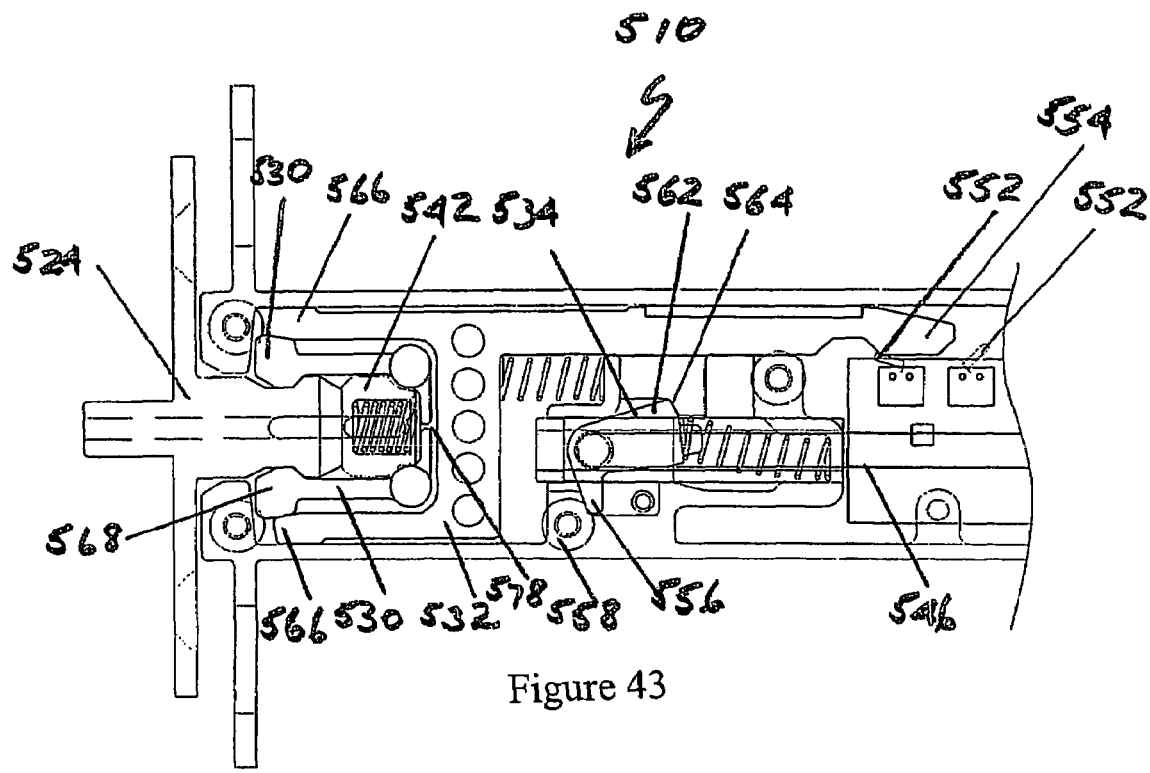
FIG. 43 is an enlarged view of the left hand end of the embodiment in FIG. 41.

Fastening system 510 is intended to engage projection 524 (as shown in FIGS. 41 to 43), projection 524 protruding from a panel or door (not shown). In fastening system 510, the engaging means includes latch arms 530, shuttle 532 and pawl 534. Spring 536 biases shuttle 532 towards the locking position shown in FIG. 41. Spring 540 urges ejector plug 542 towards the unlocked position. Shuttle 532 includes Teflon pad 544 to facilitate sliding of shuttle 532 within fastener case 522.

Fastening system 510 also includes shape memory alloy wire 546 which loops over pin 548 on pawl 534. Activation of wire 546 is controlled though printed circuit board sub-assembly 550. Spring 538 is for urging shape memory alloy wire 546 to the locked position shown in FIG. 41.

Sensor switches 552 contact extension 554 of shuttle 532 in order to provide an indication of the locked or unlocked status of fastening system 510. As shown in FIG. 43, only one sensor switch 552 is in contact with extension 554 and assembly 510 can therefore indicate that the system is in the locked position. When both sensor switches 552 make contact with extension 554 as shown, for example, in FIG. 46, the indication is that assembly 510 is in the unlocked state.

As shown in FIGS. 41 and 42, assembly 510 also includes spring 560 to relieve strain on shape memory alloy wire 546 should it be unable to draw pawl 534 away from the locking position.

Referring now to FIG. 43, this shows fastening system 510 in the locked position. In this position, projection 556 on pawl 534 bears against pin 558 and ramp 562 engages shoulder 564 of shuttle 532.

Figure 44:
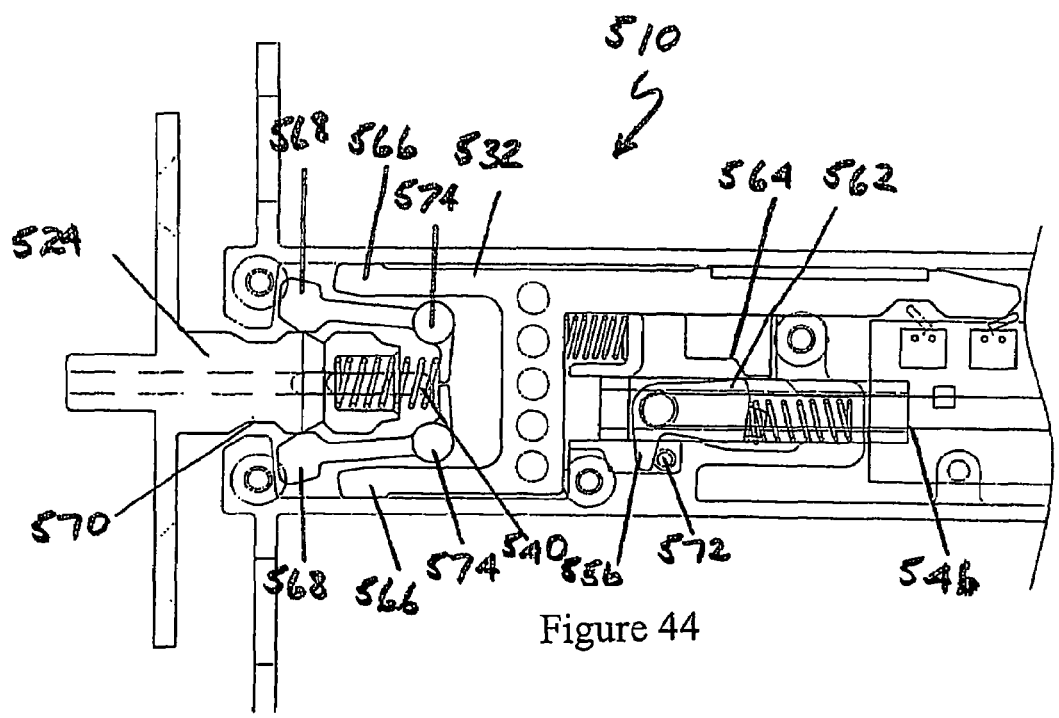
FIG. 44 shows the embodiment of FIG. 43 as soon as the unlocking position has been attained.

Ends 566 of shuttle 532 bear against ends 568 of latch arms 530, ensuring engagement of ends 568 with recess 570 in projection 524 (see FIG. 44).

When sufficient electrical energy is applied through the electrical connection via cable connector 526, wire 546 contracts, drawing pawl 534 away from the locking position, as shown in FIG. 44. In this position, ramp 562 of pawl 534 has pushed against shoulder 564 until projection 556 has encountered travel limit pin 572, which has pivoted ramp 562 away from full contact with shoulder 564, as shown in FIG. 44. At this stage, wire 546 is still contracted. The withdrawal of shuttle 532 has moved ends 566 of shuttle 532 out of contact with ends 568 of latch arms 530. Latch arms 530 pivot around pivot points 574 and move out of engagement with recess 570 of projection 524. Ejector spring 540 pushing against ejector plug 542 has caused partial ejection of projection 524 from fastening system 510.

It will be appreciated that if travel limit pin 572 is removed, pawl 534 will pivot so that there is no contact with shoulder 564 at all. Shuttle 532 will then be free to move towards the locking position under the influence of spring 536. Projection 524 can then be engaged with fastening system 510. However, unlocking will not be possible until wire 546 has cooled sufficiently.

Figure 45:
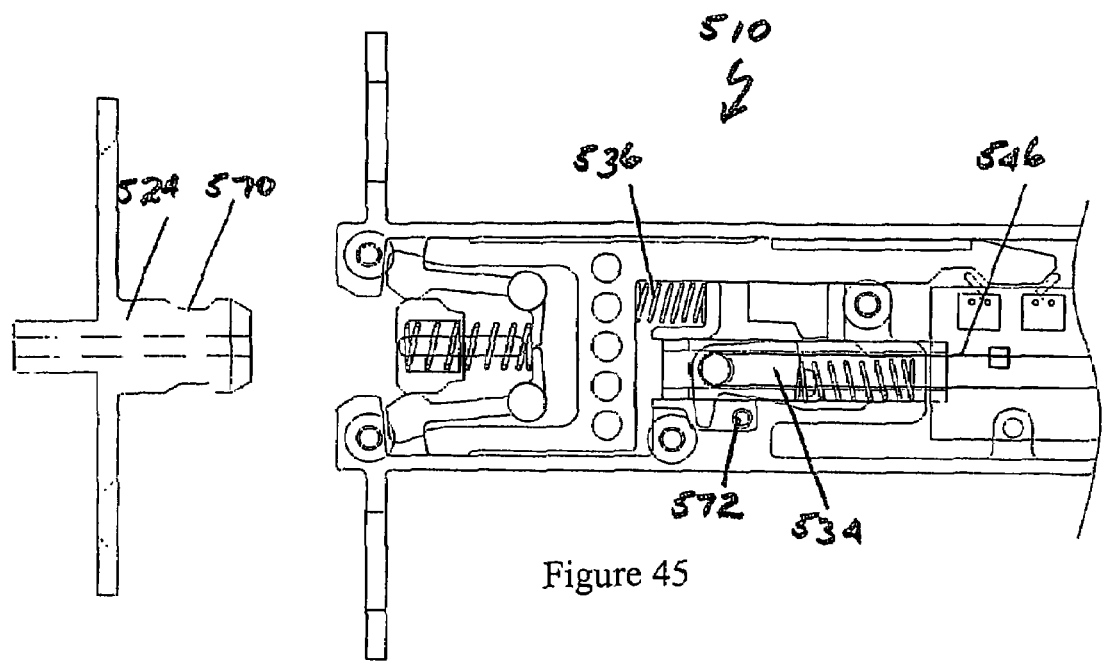
FIG. 45 shows the embodiment of FIG. 44 during cooling of the drawing means.

In the next stage shown in FIG. 45, projection 524 has been ejected completely from fastening system 510. Wire 546 has elongated to some extent while cooling and so pawl 534 has been able to move out of contact with pin 572.

Figure 46:
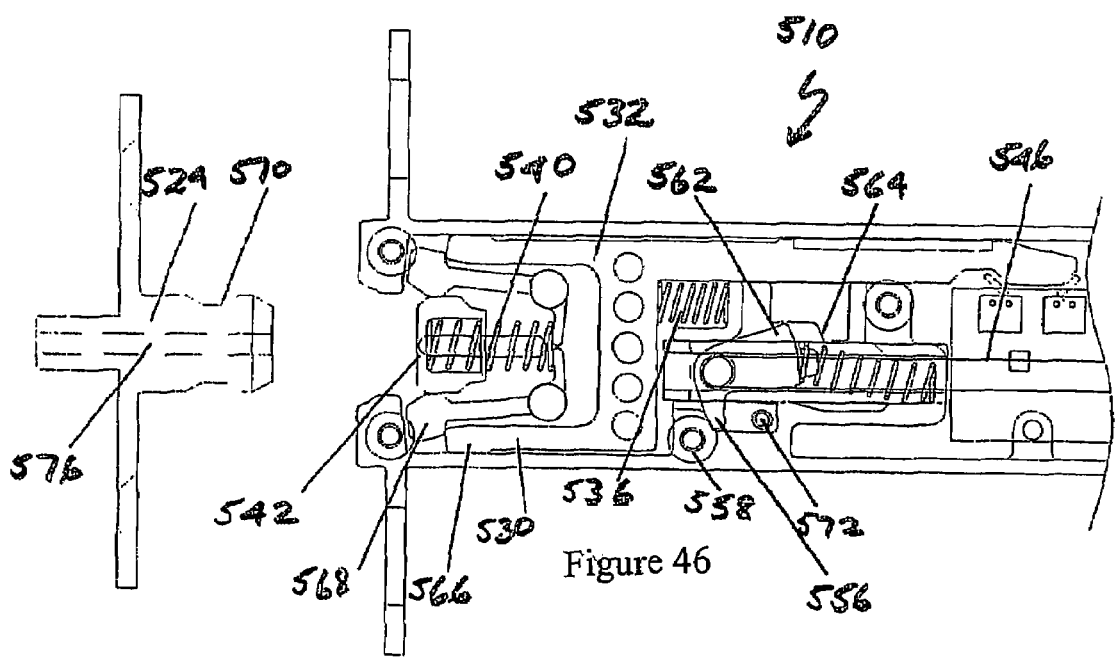
FIG. 46 shows the embodiment of FIG. 45, fully reset in the open position, ready to move to the locking position and if required to unlock again immediately.

In the configuration shown in FIG. 46, wire 546 has completed elongation through cooling, pawl 534 has moved sufficiently away from pin 572 so that projection 556 has contacted pin 558, causing pawl 534 to pivot so that ramp 562 is in position to engage shoulder 564.

If projection 524 is pushed into fastening system 510 at this point, ejector plug 542 will be compressed against spring 540, ends 568 of latch arms 530 will snap into place into recess 570, ends 566 of shuttle 532 will be able to move into position against ends 568 of latch arms 530, spring 536 will move shuttle 532 to the left in FIG. 46 and ramp 562 will engage shoulder 564 of shuttle 532, ready for unlocking if wire 546 is activated.

Aperture 576 though projection 524 is available for use as a light pipe—for example, for indication of locked or unlocked state. In addition, a suitable tool can be inserted though aperture 576, through an aperture (not shown) in ejector plug 542 and though gap 578 (see FIG. 43) between latch arms 530. The tool can then exert pressure on shuttle 532 to manually move shuttle 532 towards the unlocked position, whereupon the contact between ends 566 and ends 568 will be removed, allowing ejection of projection 524 out of fastening system 510.

Reference was made above to the fastening system of the invention including sensors for temperature, for example. In FIG. 41 these are shown at 580. Sensing is not limited to temperature sensing. As will be apparent to one skilled in the art, the fastening system of the invention can sense or control various other functions, such as lights, heaters, fans and so on. Thus the fastening system 510 of the invention may have multiple functions and may be involved in control of lighting, for example, control of lights within a compartment, the door of which is fastened by fastening system 510.

Figure 47:
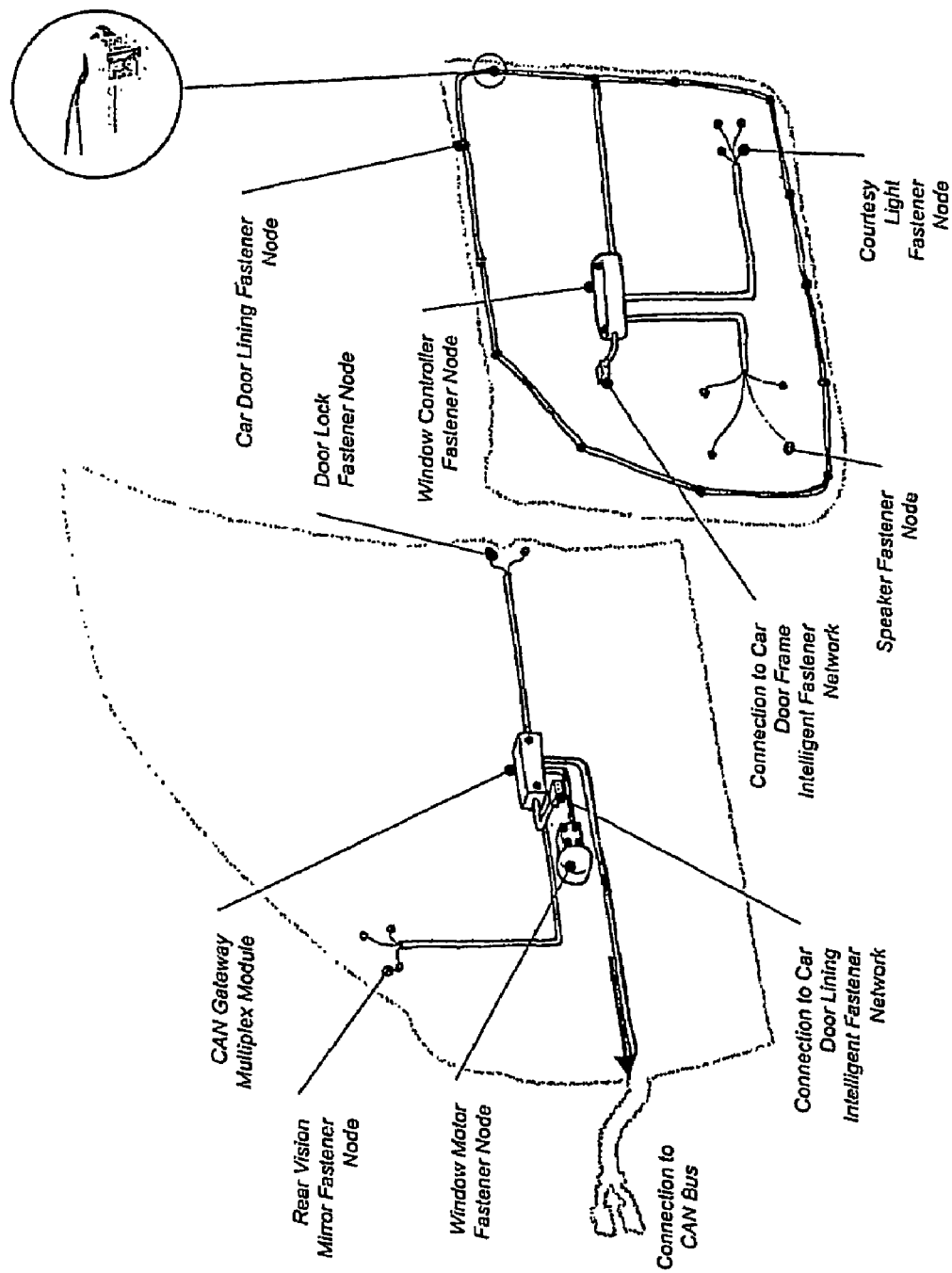
FIG. 47 shows an example of how the fastening systems of the invention may be integrated into a typical vehicle CAN network, in relation to a vehicle door.

FIG. 47 is an example of integration of the fastening systems of the invention in a typical vehicle CAN network, specifically showing a car door. This illustration is largely self-explanatory. Some of the fasteners of the invention are referred to in FIG. 47 as part of the "Intelligent Fastener network". These perform the primary functions of the fastener of the invention, namely to attach components within the vehicle.

Other fasteners referred to in FIG. 47 as "Fastener nodes" are performing a secondary function, namely control of the relevant component, such as the window motor, the rear vision mirror, etc. Connection to the CAN bus is also shown.

It is to be appreciated that the component layout and wiring harness in FIG. 47 is merely an example and not limiting on the scope of the invention.

Figure 48:
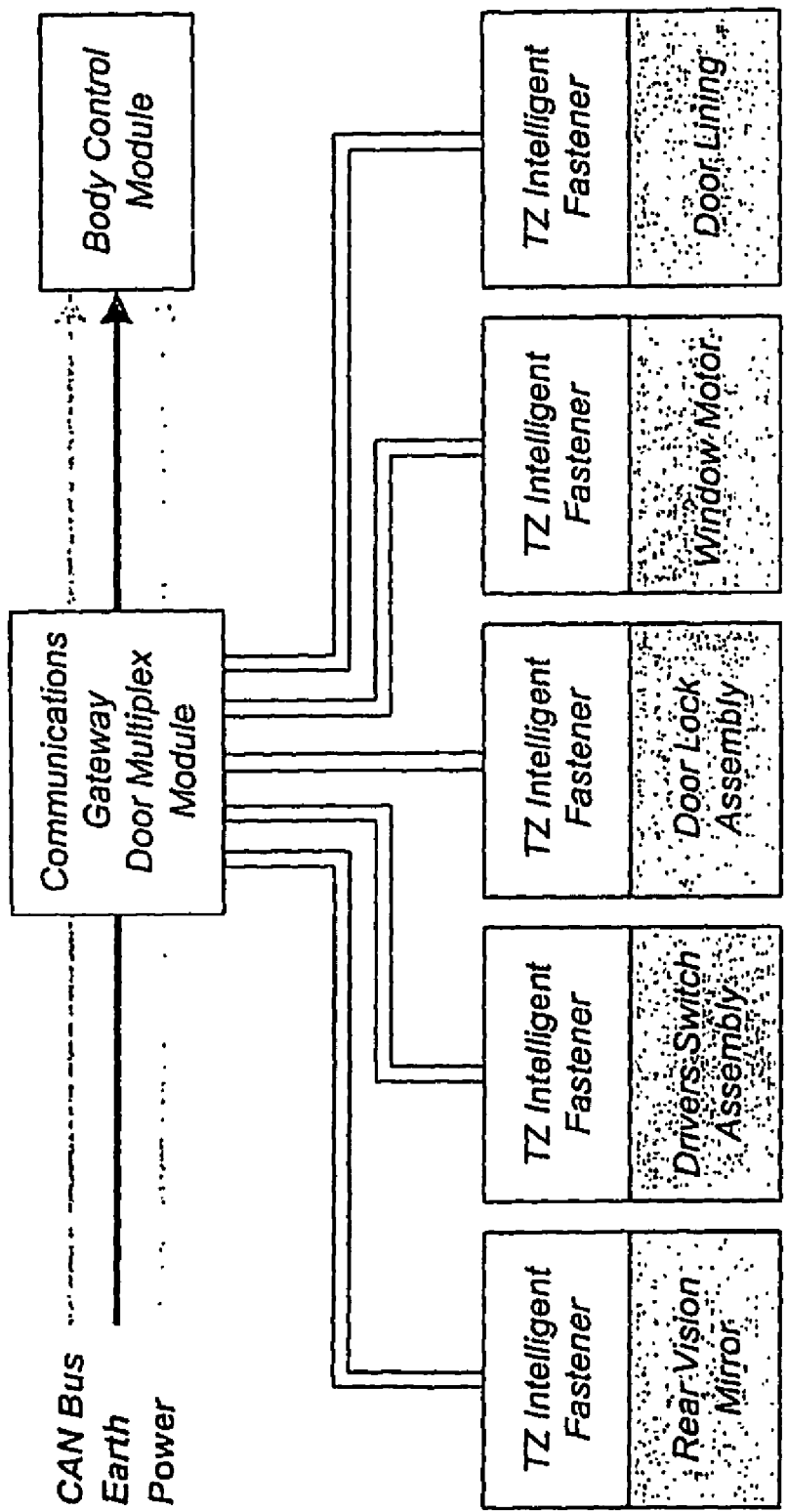
FIG. 48 is a diagrammatic illustration of at least part of the system in FIG. 47.

FIG. 48 is a diagrammatic illustration of part of the system in FIG. 47. Some of the fasteners of the invention, referred to as "TZ Intelligent Fasteners" are carrying out the primary function discussed above and some are carrying out the secondary function.

Figure 49:
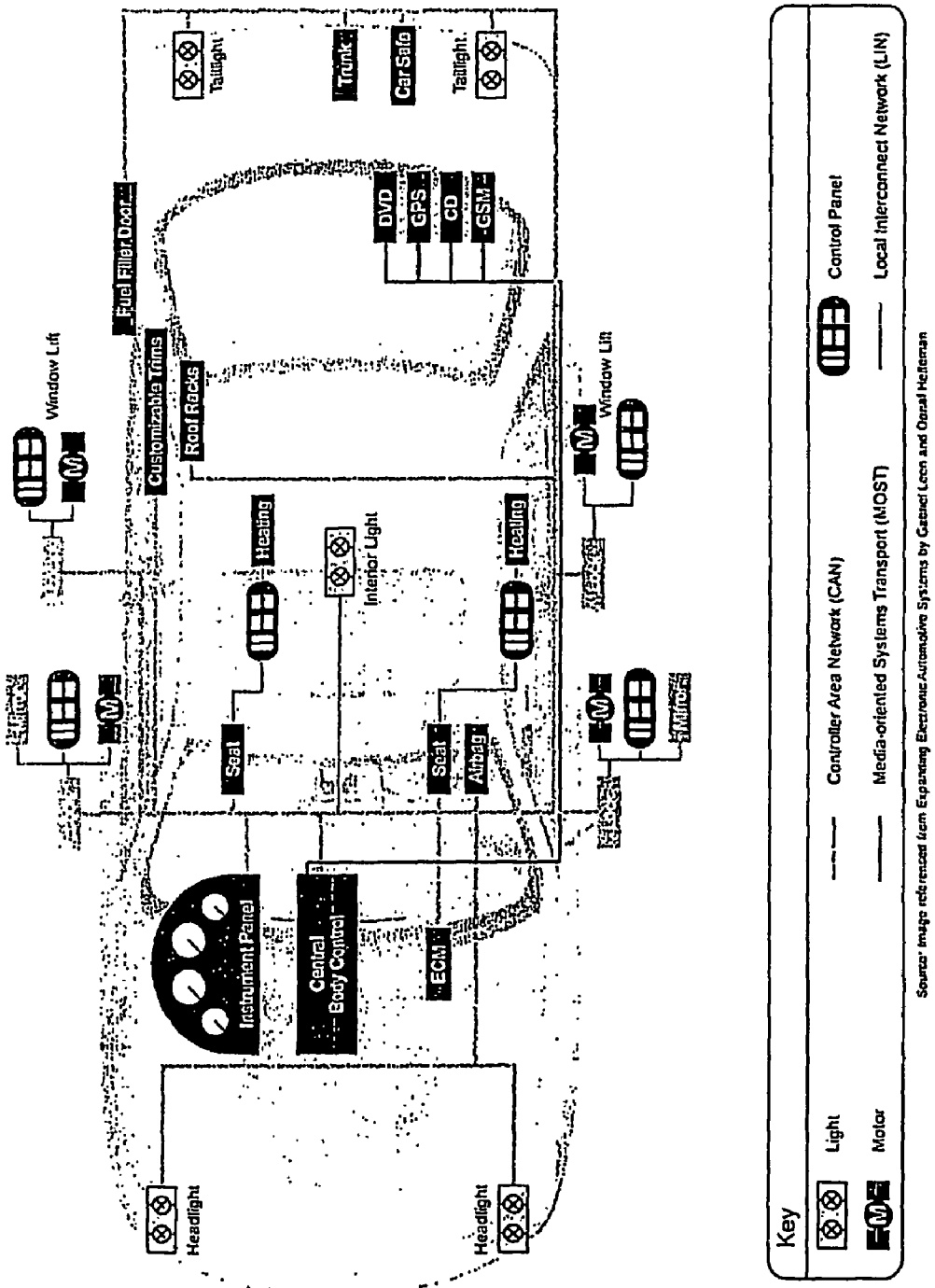
FIG. 49 shows how the network concept exemplified in FIGS. 47 and 48 may be extended throughout many vehicle components.

The primary and secondary functions referred to can be expanded to control or fasten several other vehicle components, such as those shown in FIG. 49. This Figure is self-explanatory.

Figure 50:
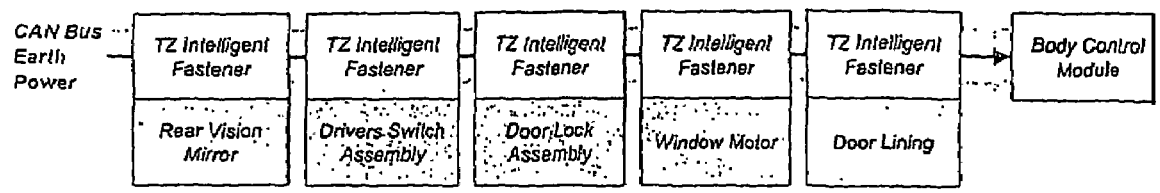
FIG. 50 is similar to FIG. 48 but gives an example of the extension of the function of fastener system of the invention.

FIG. 50 shows how the fasteners of the invention may be arranged to reduce the number of sub-network wiring components through direct connection into the CAN bus. FIG. 50 should be compared with FIG. 48 in this regard. In effect, each fastener of the invention may be able to act as its own multiplex module/communications gateway or node on the CAN bus. This network structure may also enable the fasteners of the invention to extend their function into control of components switching.

Figure 51:
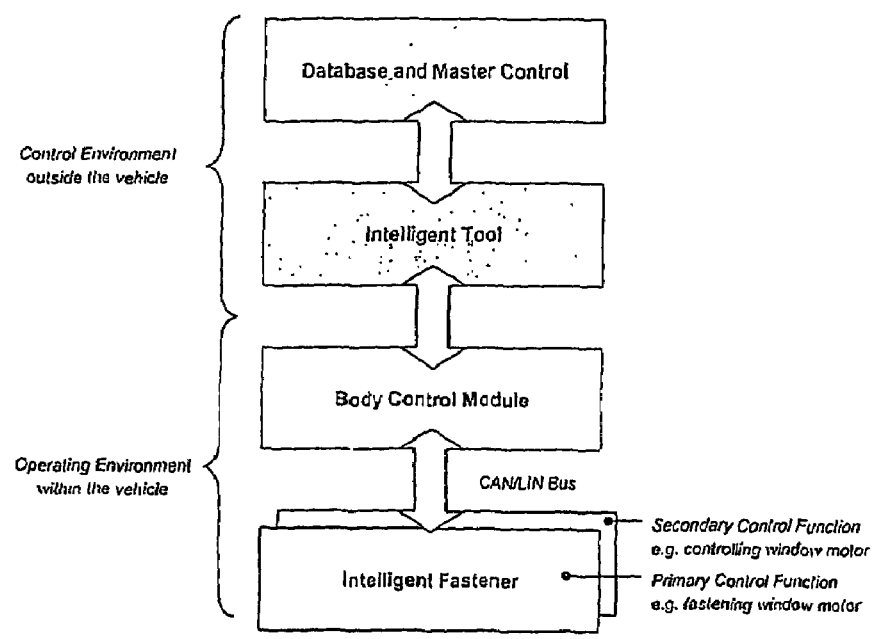
FIG. 51 exemplifies architecture of a fastening system of the invention in a motor vehicle.

With reference to FIG. 51, this illustrates an example of the architecture of a fastening system of the invention in a motor vehicle. At the bottom of the chain is a fastener of the invention, which fastens a component to the vehicle. This fastener (the "Intelligent Fastener") is connected to the vehicle computer via the CAN bus. The vehicle computer transmits data and/or instructions between the Intelligent Fastener and an "Intelligent Tool" such as a personal digital assistant (hand-held computer).

The master control resides at the top level of the hierarchy, providing Intelligent Fastener identity and security information to the Intelligent Tool and logging diagnostic and historical fastener function information.

As before, the Intelligent Fastener may have a primary function of attaching a component to the vehicle and a secondary function of control of switching.

Reference is now made to FIGS. 52 to 55, which illustrate an embodiment of the invention in the third aspect. In FIGS. 52 to 55, fastening system 610 has engagement means 612 movable between the locking position shown in FIG. 54 and the unlocking position shown in FIG. 52.

Engagement means 612 includes a pair of jaws 614 pivotable at pivot point 616.

Block 618 includes cavity 620 defined by arms 622, base 624 and stop 626.

When engagement means 612 is in the locking position as illustrated in FIG. 54, pivot point 616 lies as close to base 624 as possible and stop 626 does not prevent the closing of jaws 614, as illustrated. In contrast, when engagement means 612 is in the unlocking position shown in FIG. 52, pivot point 616 is spaced from base 624 and stop 626 forces apart jaws 614, as illustrated.

Block 618 is urged towards engagement means 612, in the locking position, by coil spring 628 which is positioned between block 618 and tube 630.

Block 618 includes projection 632 containing aperture 634 to which is attached smart memory alloy wire 642. Smart memory alloy wire 642 is connected electrically to printed circuit board 638 which in turn is hard wired via wires 640 to an energy source (not shown). Electrical wire 636 completes the circuit for smart memory alloy wire 642.

Fastening system 610 is intended to be inserted into the edge of a panel through a round hole or bore in the panel, with wires 640 projecting from the rear of the panel. Jaws 614 engage latch 644 on external element 646, in order to secure the panel (not shown) to the external element 646.

To attach the panel to the external element 646, smart memory alloy wire 642 is energised by the external energy source via wires 640 to cause smart memory alloy wire 642 to heat and contract to the position shown in FIG. 52. In this position, block 618 has been drawn back so that stop 626 forces jaws 614 apart. The panel is positioned so that jaws 614 are poised around latch 644. At this stage, power to smart memory alloy wire 642 is cut off and smart memory alloy wire 642 cools and elongates to the configuration shown in FIG. 54. Coil spring 628 pushes block 618 to the left (towards latch 644). Stop 626 is no longer bearing against the base of jaws 614 and accordingly jaws 614 close as shown in FIGS. 54 and 55, engaging latch 644. In this way, the panel is fastened to the external element 646.

To remove the panel, smart memory alloy wire 642 is again energised so that it heats and contracts and fastening system 610 assumes the position shown in FIG. 52, releasing jaws 614 from latch 644.

As will be apparent to one skilled in the art, the design of engagement means 612 can be varied considerably from that shown in FIGS. 52 to 55, as can latch 644. Engagement means 612 and block 618 may be provided as a module, replaceable by a different module with a different engagement mechanism.

Fastening system 610 as illustrated in FIGS. 52 to 55 is a type of "inline" fastener.

Figure 56:
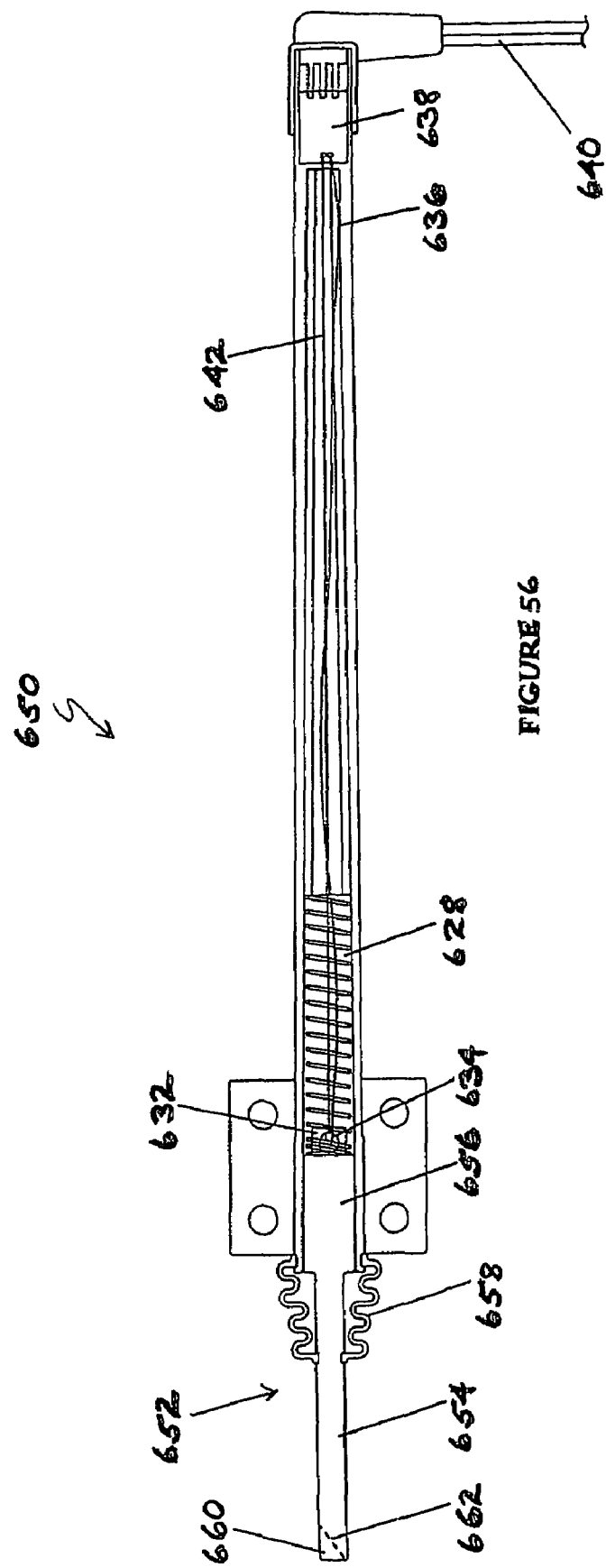
FIG. 56 is a side sectional view of a second embodiment of the fastening system according to the third aspect of the invention.

Fastening system 650 illustrated in FIG. 56 is another type of "inline" fastener. In this second embodiment, fastening system 650 is shown as suitable for use in connection with a fuel filler cap. The engagement means in FIG. 56 may be substituted for engagement means 612 in FIGS. 52 to 55. In FIG. 56, the same parts will be given the same numbers as in FIGS. 52 to 55.

Fastening system 650 has engagement means 652 which includes rod 654 (circular in cross section) integral with block 656. Rubber grommet 658 ensures a liquid and gas-tight seal between rod 654 and the mechanism of fastening system 650.

Fastening system 650 is shown with engagement means 652 in the locking position, so that rod 654 is engaging a fuel filler cap (not shown). Rod 654 may have a squared off end 660 as shown in FIG. 56 or a ramped end 662 as shown in dotted outline. The configuration in this regard will depend on the type of engagement between rod 654 and the fuel filler cap.

Coil spring 628 urges engagement means 652 towards the locking position. Shape memory alloy wire 642, activatable as described above, can contract to draw engagement means 652 to the unlocking position, through attachment of shape memory alloy wire 642 in aperture 634 of projection 632 from block 656.

Locking and unlocking generally takes place as described in relation to the embodiment in FIGS. 52 to 55, in relation to contraction of smart memory wire 642.

It is intended that fastening system 650 will be located within or close to the fuel filler cavity of a vehicle, activation taking place as the result of pressing a button on the vehicle dashboard or pressing a button on the vehicle key fob.

Figure 57:
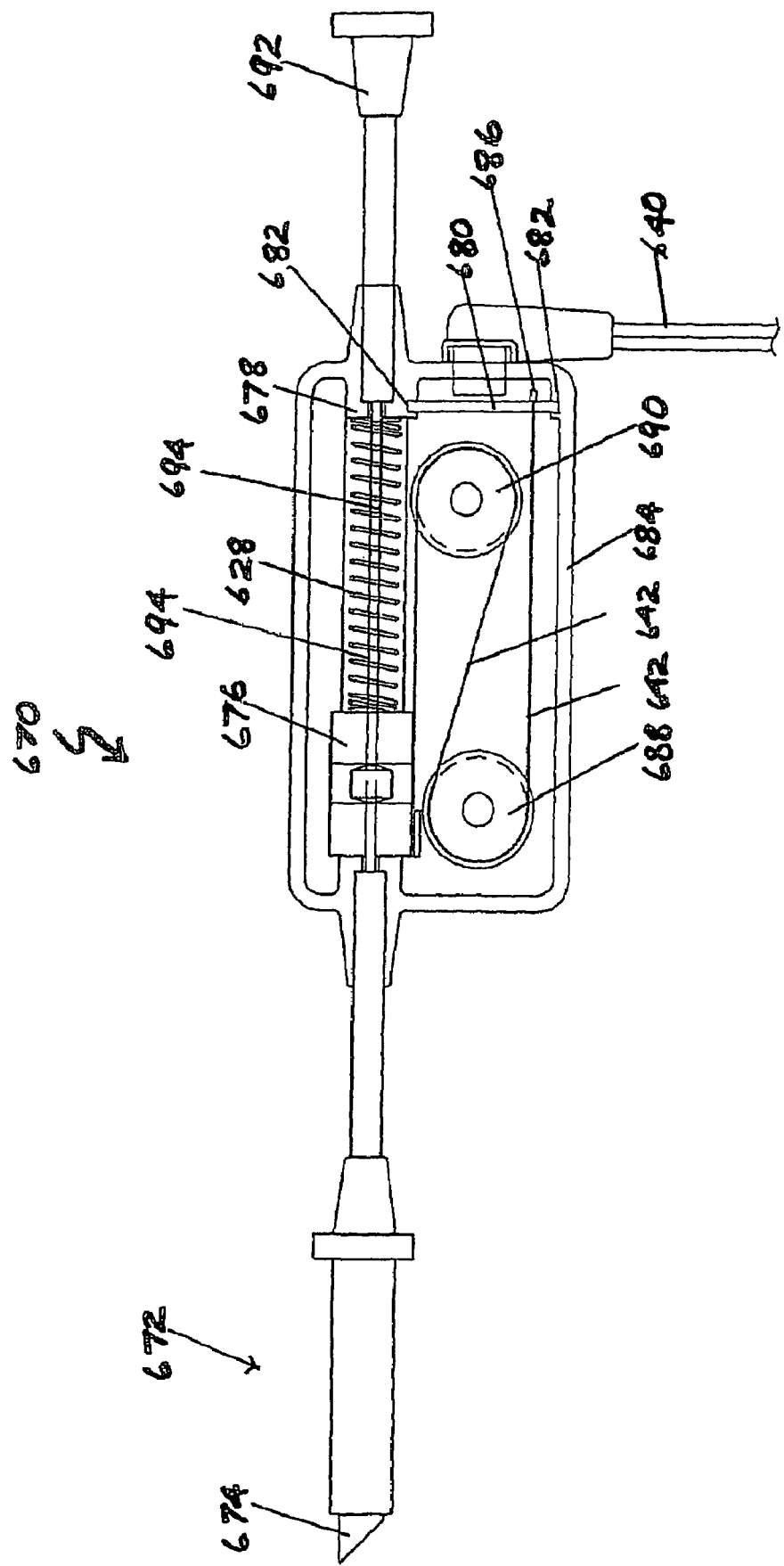
FIG. 57 is a side sectional view of a third embodiment of the fastening system according to the third aspect of the invention, showing a manual override.

The embodiment shown in FIG. 57 is a fastening system for a fuel filler cap which differs from that in FIG. 56 in two respects. Firstly, the embodiment in FIG. 57 permits a longer "travel" for the fuel filler catch. Secondly, the embodiment in FIG. 57 includes a manual override in case there is some malfunction of the activation system from the vehicle dashboard or from the vehicle key fob.

In FIG. 57, fastening system 670 has engagement means 672 which includes tongue 674. Engagement means 672 is biased towards the locking position, as shown in FIG. 57, by coil spring 628, which in this embodiment is positioned between block 676 and housing portion 678.

Shape memory alloy wire 642 is attached at both ends to printed circuit board (PCB) 680 retained in channels 682 within housing 684. Shape memory alloy wire 642 travels from panel 680, where it is fixed through stop 686, over spindle 688, from there to spindle 690 and then to block 676 and returns to pcb 680. This greatly increased the length of shape memory alloy wire 642 which in turn enables a greater distance of travel for engagement means 672.

The embodiment in FIG. 57 includes manual override pull 692, which is attached to block 676 by wires 694. Wires 694 are not of shape memory alloy wire and simply provide a mechanical connection between pull 692 and block 676. In case of failure of shape memory alloy wire 642 to be activated through power provided by an external source (not shown) through wires 640, pull 692 may be used to mechanically draw engagement means 672 to the right of the position shown in FIG. 57, disengaging tongue 674 from the fuel filler cap (not shown).

Referring to the embodiment of the next aspect of the invention, in FIGS. 58 to 61, fastening system 600 has first engagement means, being arms 594 and protrusion 596, and second engagement means, being complementary cavity 598 in cap 602. Fastening system 600 is intended to hold cap 602 onto base 604.

Locking element 606 is in strip form and is slidable vertically between arms 594, as can be seen from comparing FIGS. 58 and 59 to FIGS. 60 and 61. Lugs 607 which assist location of locking element 606 between arms 594 are located in slots 609 in locking element 606.

Locking element 606 is attached to shape memory alloy wire 40. The tension in wire 40 can be adjusted by tension screw 1110.

Spring 1112 assists in maintaining fastening system 600 in the locked state when no power is applied and also assists in returning spring 40 to its original, elongated status when it cools after contraction.

Batteries 37 are activated by switch 39 to provide power to fastening system 600. Printed circuit board 1108 programs the amount of power fed to wire 40. For example, printed circuit board 1108 can permit power to be fed to wire 40 in a series of steps until the desired temperature has been reached, at which stage printed circuit board 1108 can switch off the power to allow wire 40 to relax. Printed circuit board 1108 can also provide reports on the status, history, etc of fastening system 600.

Figure 62:
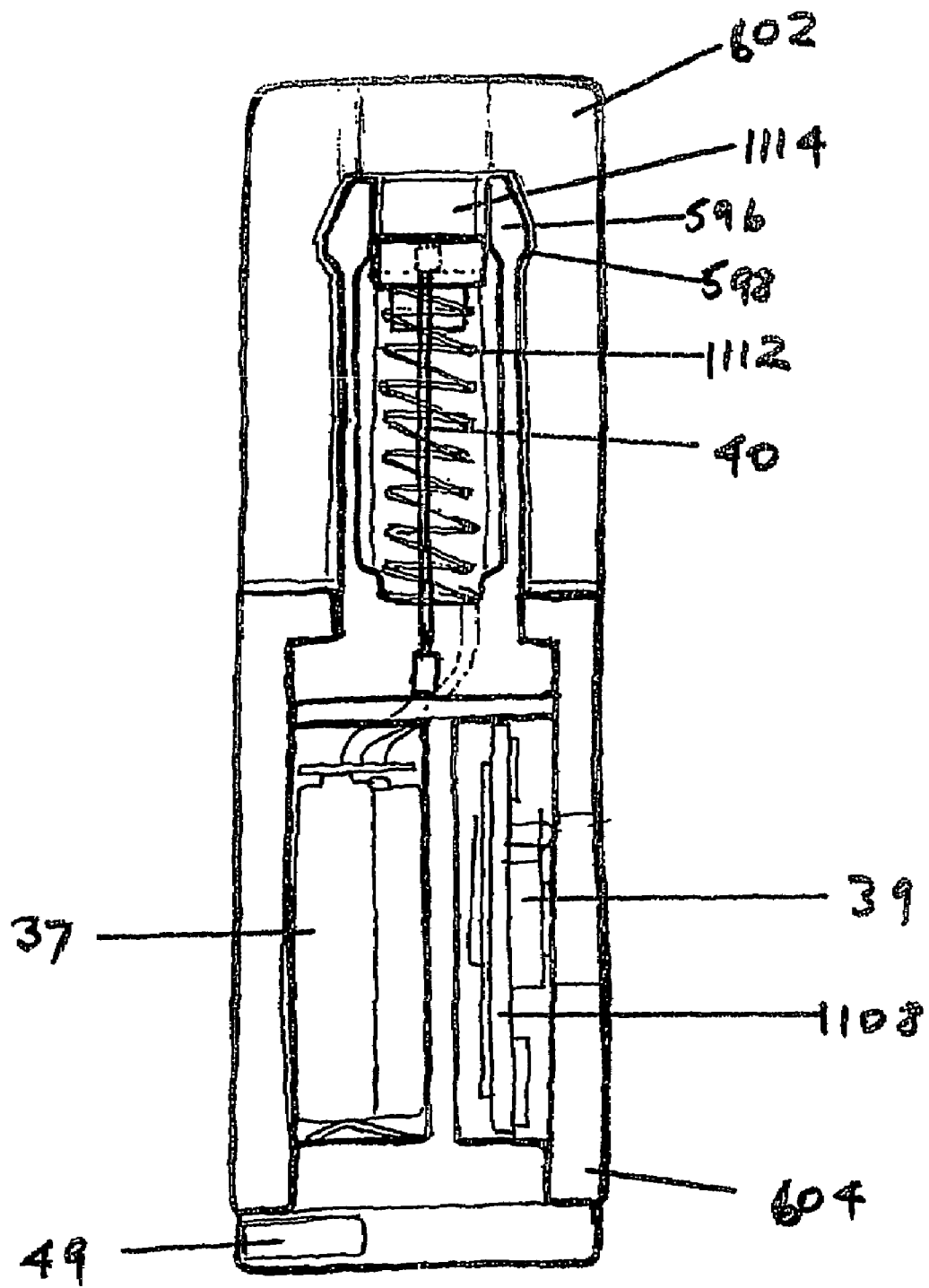
FIG. 62 shows in sectional illustration a second embodiment of the fourth aspect of the invention.
Figure 63:
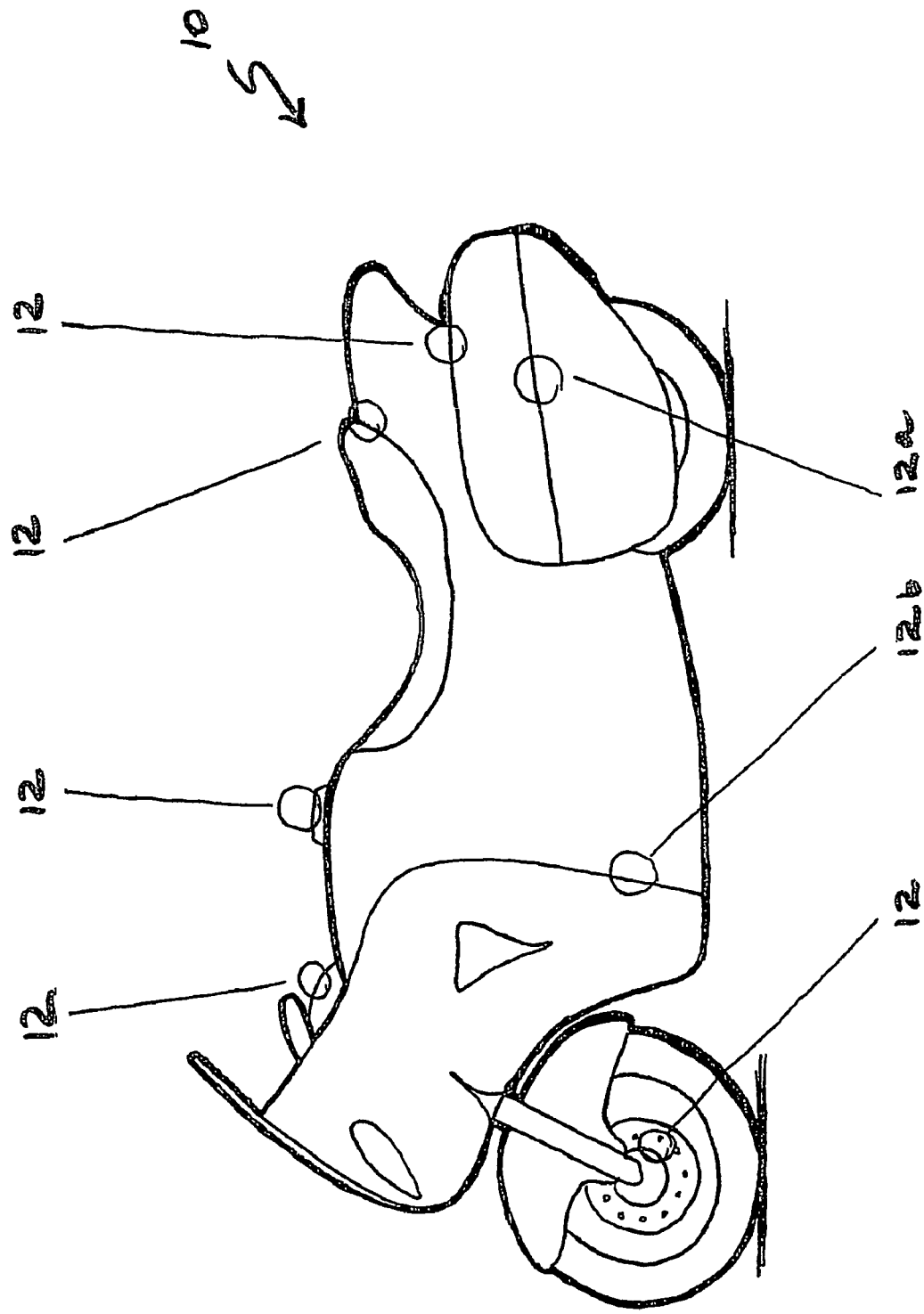
FIG. 63 is a sketch of a motor cycle incorporating the fifth aspect of the invention and showing diagrammatically the location of some of the attachment nodes.

The embodiment of the aspect of the invention in FIG. 62 does not show a strip form of locking element as in the previous embodiment. However, generally, the same numerals will be used for convenience. In the FIG. 62 embodiment, fastening system 600 has first engagement means including arms 594 and protrusions 596. Second engagement means is comprised by cavity 598 in cap 602. As shown, cap 602 is locked to base 604 when protrusions 96 are engaged in cavity 98 by brass slug 1114, which in this embodiment is the locking element. Brass slug 1114 is attached to smart memory alloy wire 40 as shown. Spring 1112 urges brass slug 1114 to its locking position between protrusions 96. When switch 39 is activated, printed circuit board 1118 ensures that batteries 37 provide the appropriate power to wire 40 to heat wire 40 to the temperature at which it contracts, drawing slug 1114 out of position between protrusions 596. At this stage, protrusions 596, which are biased inwardly on arms 594, can clear cavities 598 and allow cap 602 to be released from base 604.

Charging contact 49 is provided for recharging batteries 37. Charging contact 49 may take the form of a socket or plug to be mated with a corresponding plug or socket (not shown).

Turning now to FIGS. 63 to 68, framing system 10 (only part of which can be seen in this Figure) has several attachment nodes 12 which are hidden from view in most cases by the fairings and cowlings attached to frame 10. The fastener at attachment node 12*a* is preferably of the type illustrated in FIGS. 1 to 3 and the fastener at attachment node 12*b* is preferably of the type illustrated in FIGS. 5 to 7.

Figure 65:
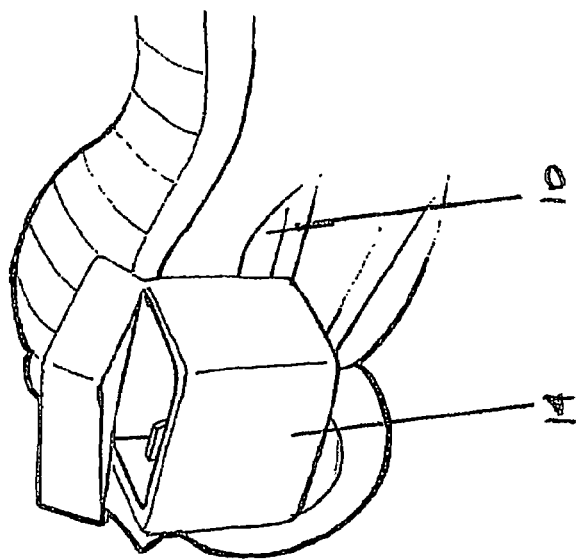
FIG. 65 is a similar view to that in FIG. 64, with the pannier in place.
Figure 64:
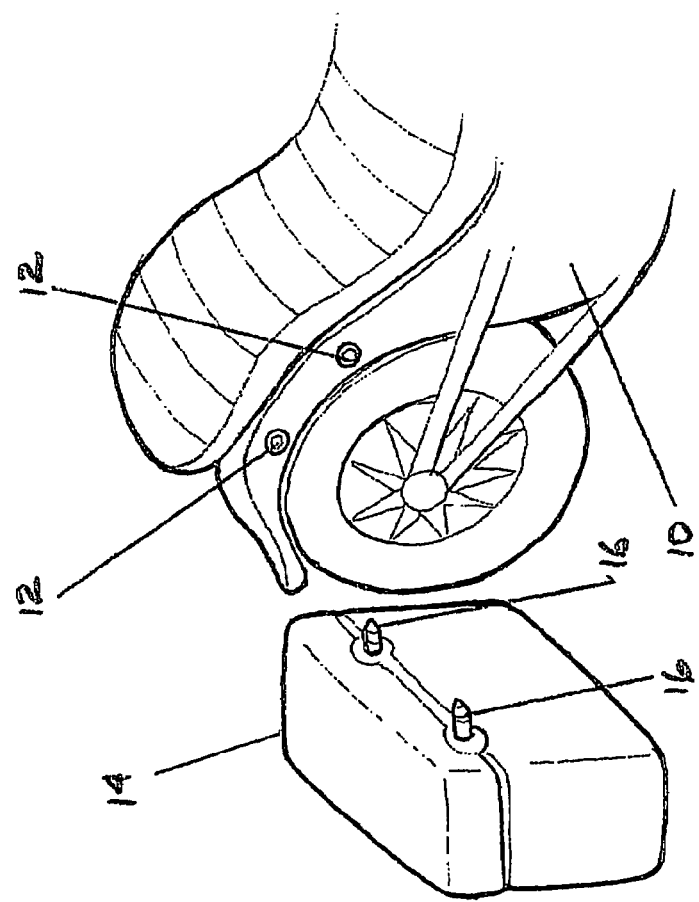
FIG. 64 shows the rear part of the motor cycle of FIG. 63, in connection with the attachment of a pannier.

Individual attachments are shown in FIGS. 64 and 65, where pannier 14 is to be attached to framing system 10. Pannier 14 has two fasteners 16 for insertion in attachment nodes 12. Fasteners 16 preferably are the type illustrated in FIGS. 14 to 16, described above. FIG. 65 shows pannier 14 mounted securely in place. As can be seen in FIG. 65, fasteners 16 are hidden when pannier 14 is mounted. Pannier 14 cannot be removed without authority, without damage to pannier 14 and this can enhance security.

Figure 66:
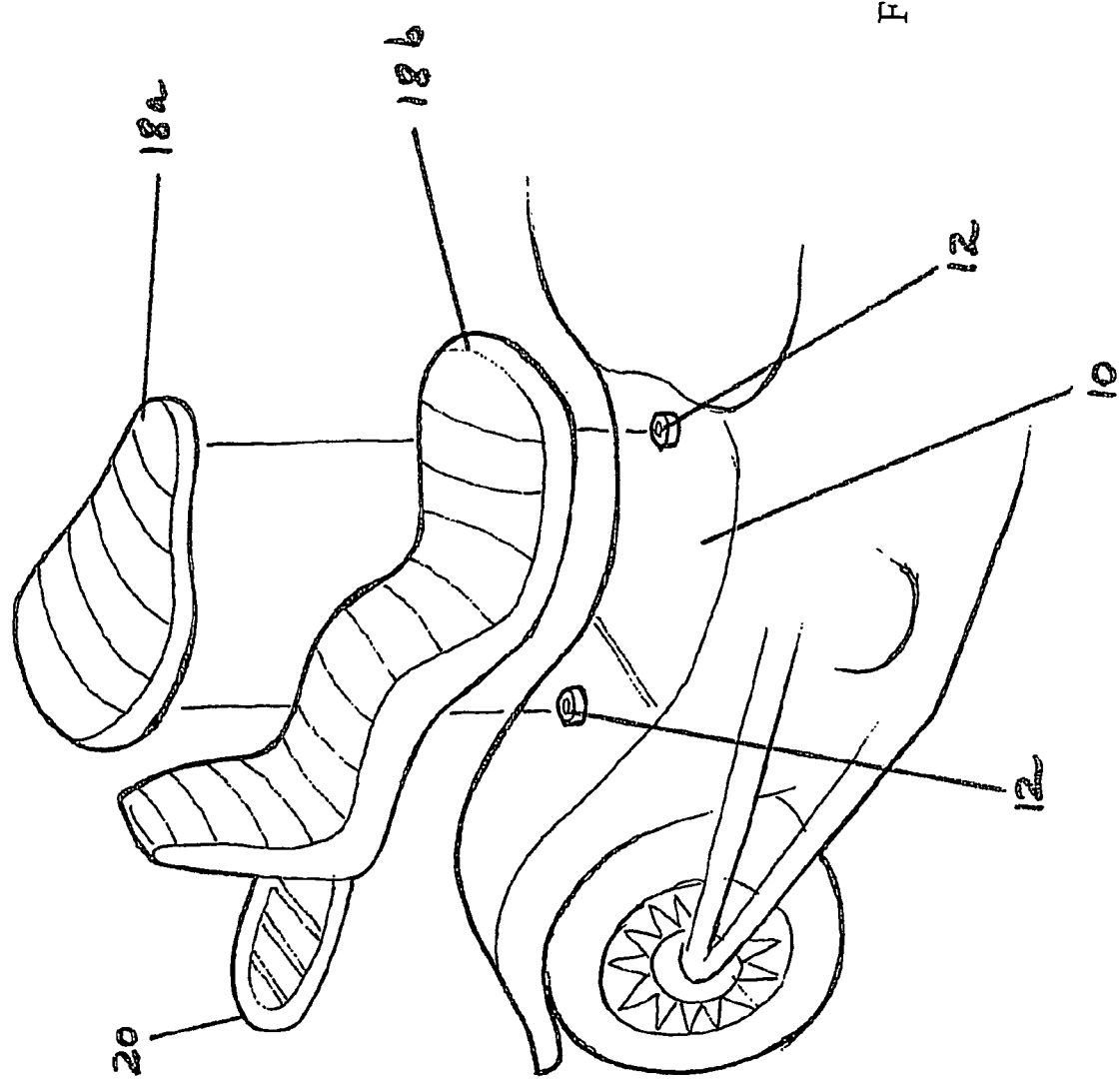
FIG. 66 is a similar view to that in FIGS. 64 and 65, illustrating attachment of alternate forms of a seat.
Figure 67:
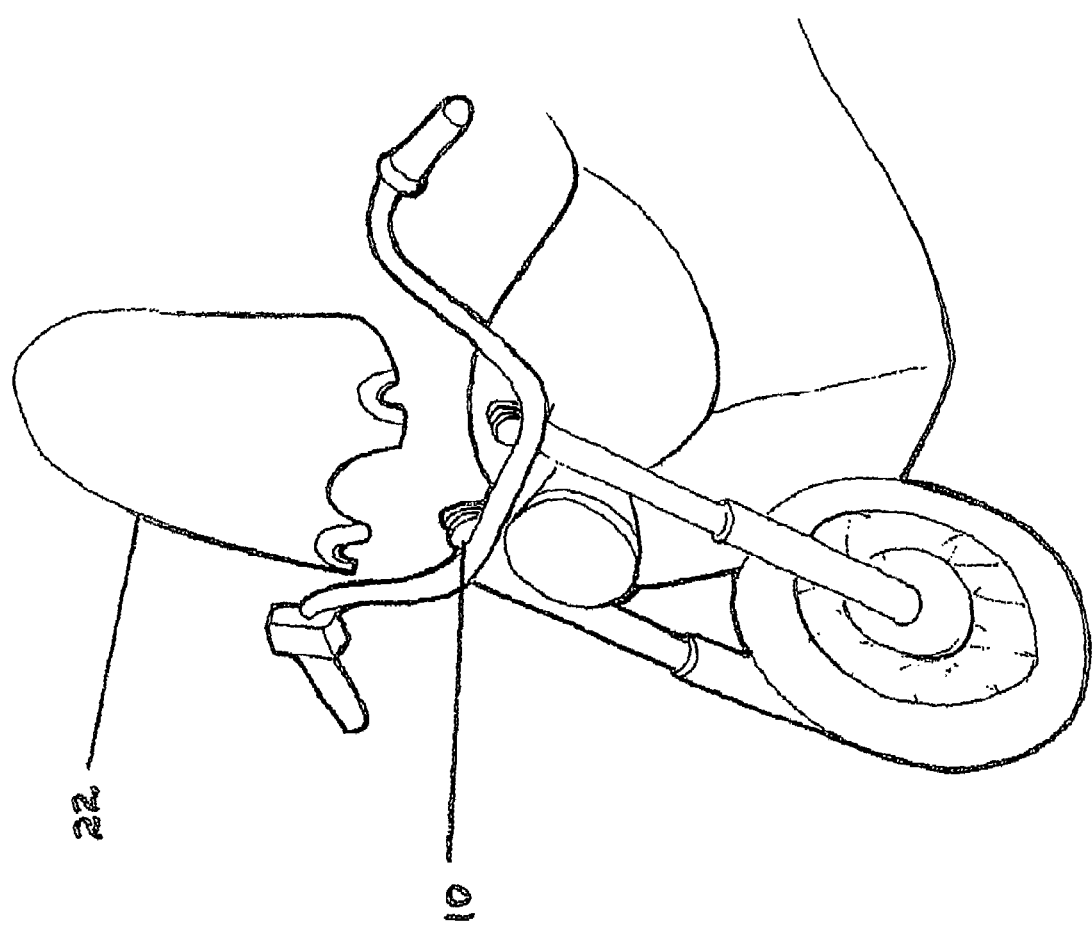
FIG. 67 shows a front portion of the motor cycle of FIG. 63, illustrating detachment or attachment of a windshield.

Turning now to FIG. 66, frame 10 has attachment nodes 12 for two alternate versions of seat 18*a* and 18*b*. Seat 18*a* is a single seat whilst 18*b* is a double seat with a luggage carrier 20. This Figure illustrates the versatility of the framing system of the invention when applied to a motor cycle. When touring, seat 18*a* can be removed and replaced by seat 18*b*, for example.

Figure 68:
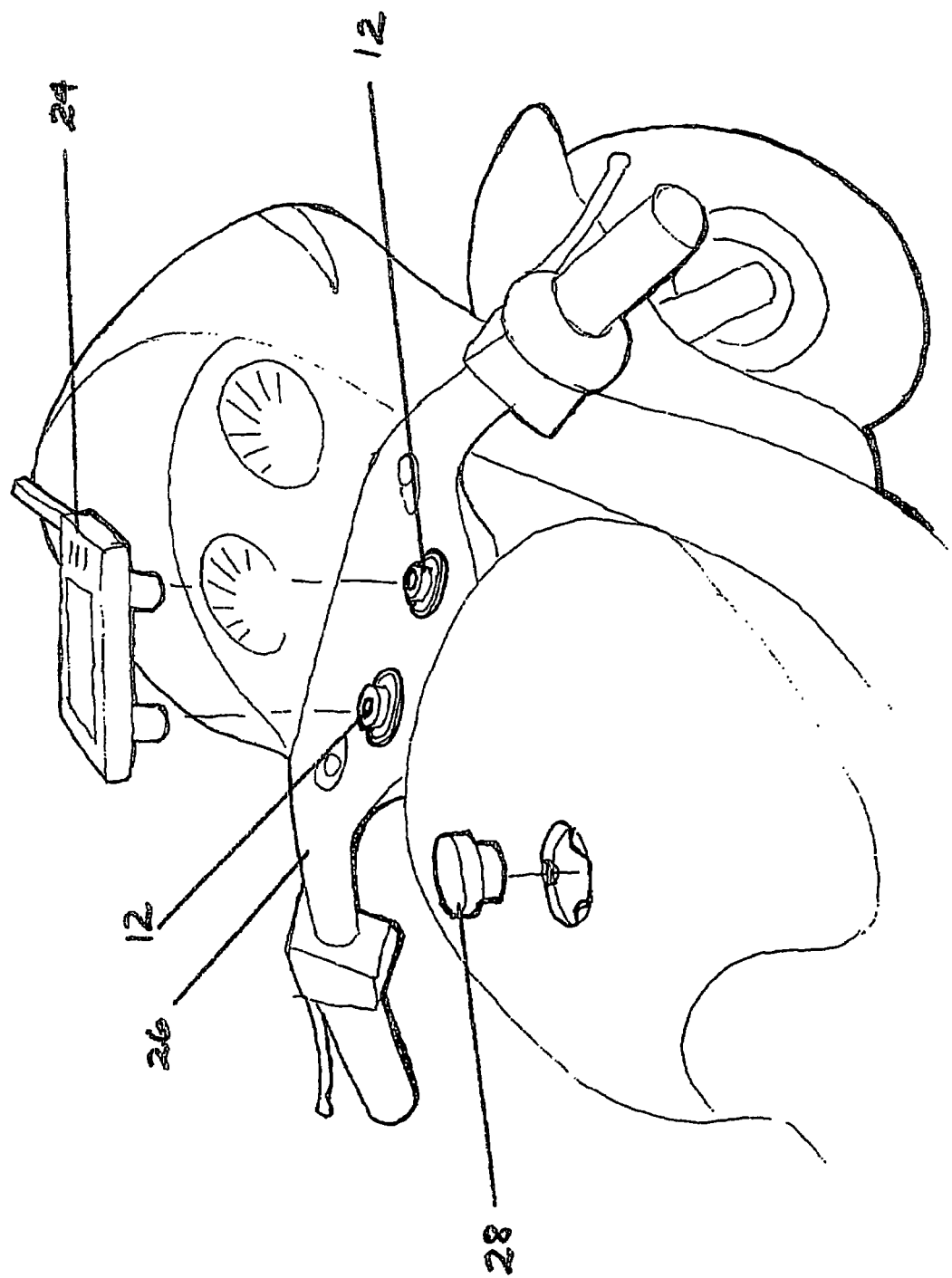
FIG. 68 shows the front part of the motor cycle of FIG. 63, showing nodes for attachment of a GPS system and a fuel cap.

FIG. 68 shows in diagrammatic form the attachment of windscreen 22 to framing system 10 by suitable fasteners (not shown). Windscreen 22 can be removed when not required.

In FIG. 68, GPS system 24 is shown as attachable to handlebars 23. In the same Figure, fuel filler cap 28 can be included in the framing system of the invention. This can help to prevent theft of fuel since fuel filler cap 28 cannot be removed without authorisation or without considerable damage.

Figure 70:
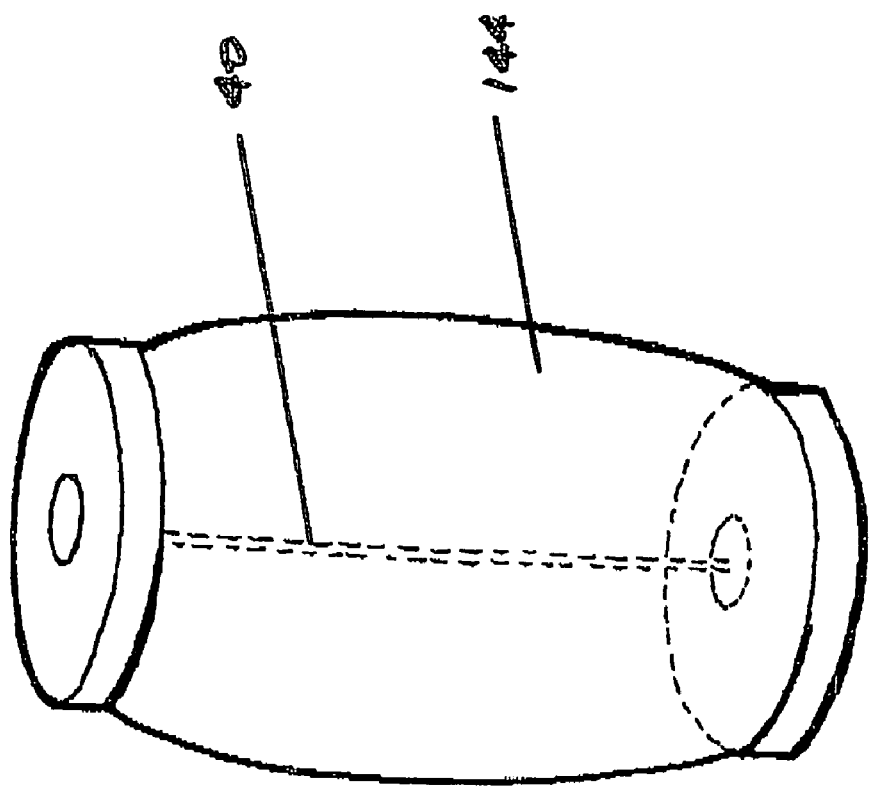
FIGS. 69 and 70 illustrate a first embodiment of the sixth aspect of the invention.
Figure 69:
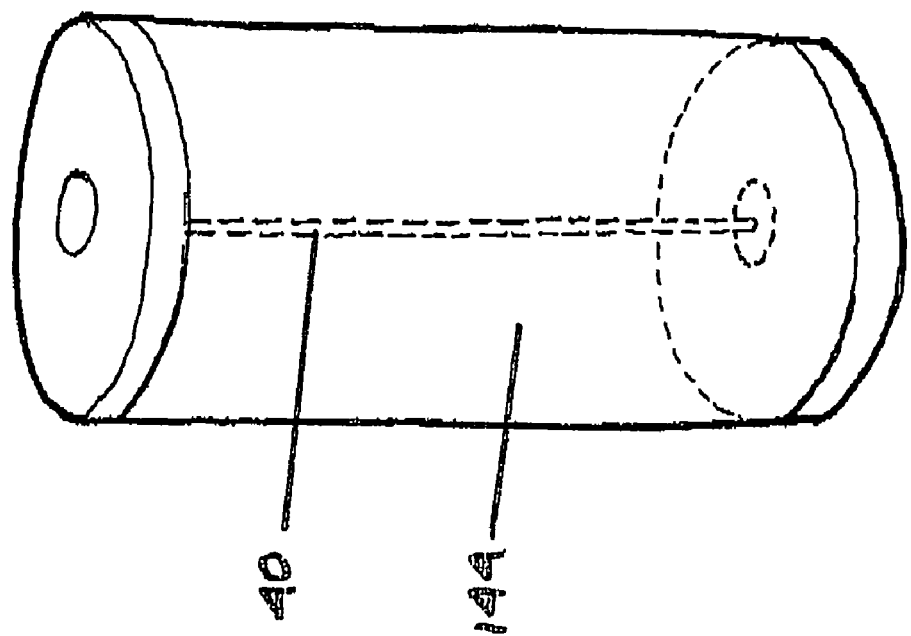

In FIG. 69, shape memory alloy wire 40 is shown encased in elastomeric material 144. In FIG. 69, SMA wire 40 is in the relaxed, uncontracted state. In FIG. 70, wire 40 has contracted, causing elastomeric material 144 to be compressed vertically. Elastomeric material 144 retains the tendency to return to the original configuration in FIG. 69. Consequently, as soon as wire 40 has been allowed to cool to the required temperature, it relaxes and returns to the configuration in FIG. 69 under the influence of elastomeric material 144.

Figure 72:
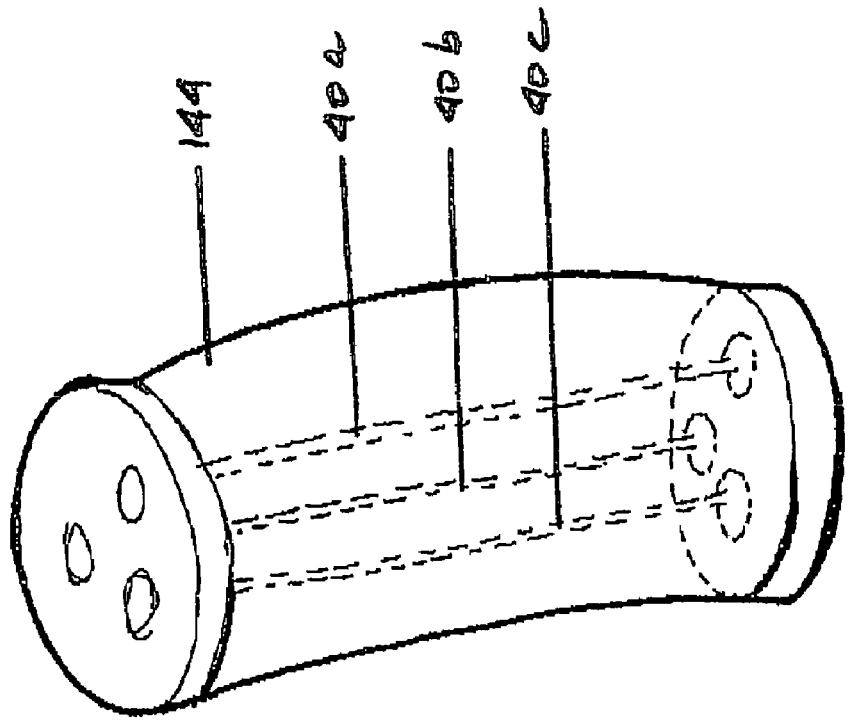
FIGS. 71 and 72 illustrate a second embodiment of the sixth aspect.
Figure 71:
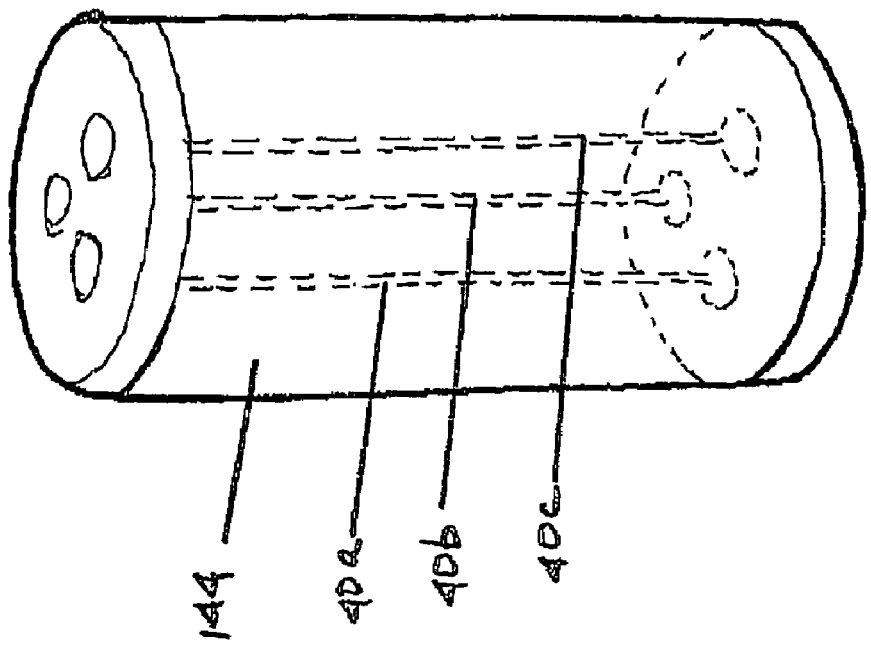

In the FIG. 71 and FIG. 72 embodiment, there are three SMA wires, 40*a*, 40*b* and 40*c*. When wires 40*a* and 40*b* are heated to contract, elastomeric material 144 bends to the left side as shown in FIG. 72. When wires 40*a* and 40*b* relax, elastomeric material 144, with its tendency to restore itself to the original shape, will stretch out wires 40*a* and 40*b* to the configuration shown in FIG. 71.

It will be appreciated that wire 40*c*, if activated, will bend elastomeric material 144 to the right.

Figure 74:
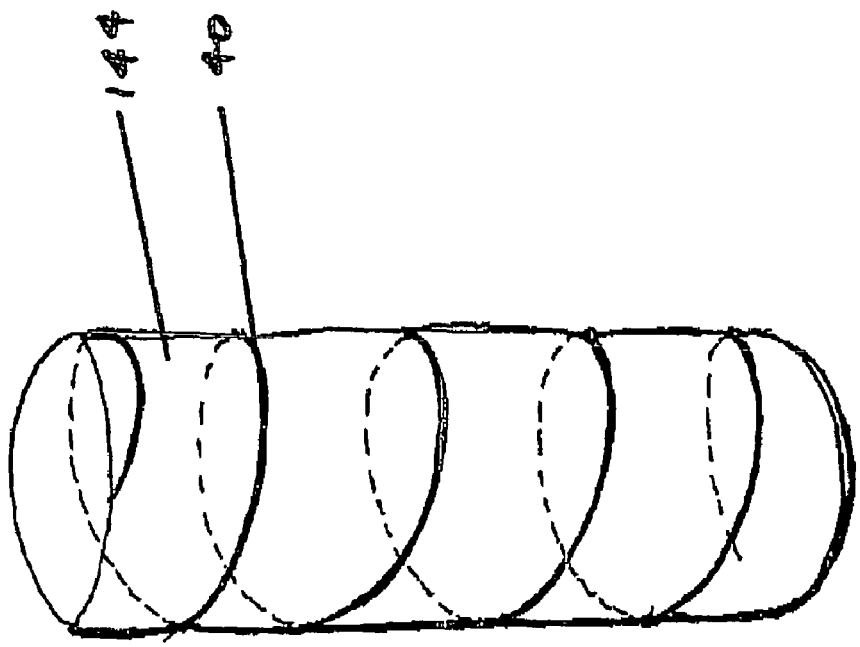
FIGS. 73 and 74 illustrate a third embodiment of the sixth aspect.
Figure 73:
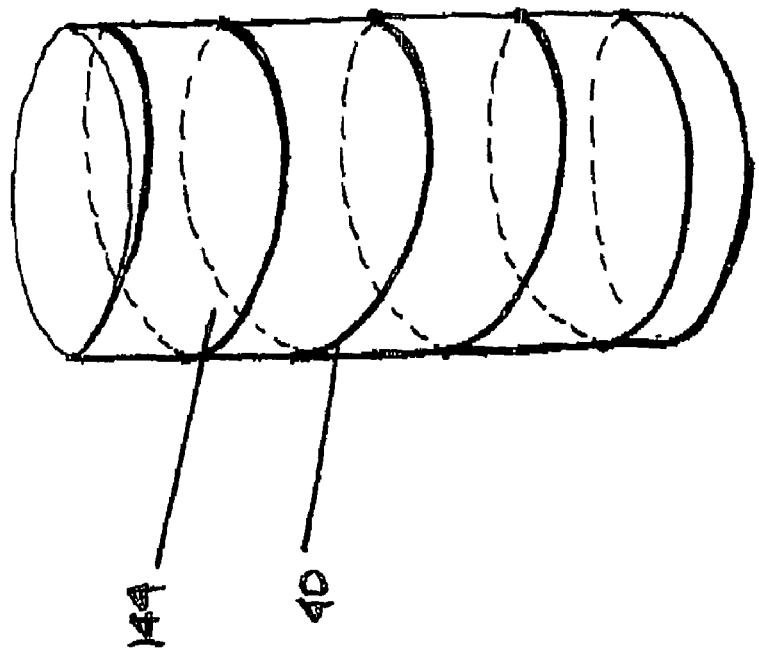

In FIGS. 73 and 74, SMA wire 40 is wrapped around elastomeric material 144 to form a spiral. When wire 40 is activated to contract, it compresses elastomeric material 144 which thus elongates as shown in FIG. 74. The tendency of elastomeric material 144 to return to its original shape will urge wire 40 to extend, when it has cooled sufficiently, to return the assembly to the FIG. 73 configuration.

Figure 76:
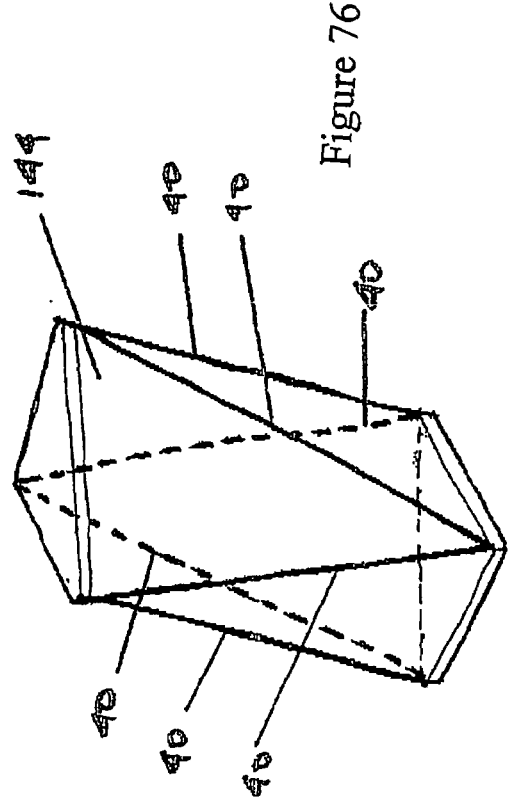
FIGS. 75-77 illustrate a fourth embodiment of the sixth aspect.
Figure 77:
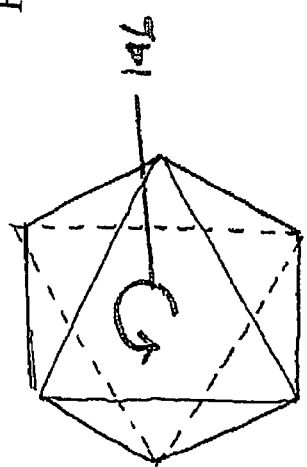
Figure 75:
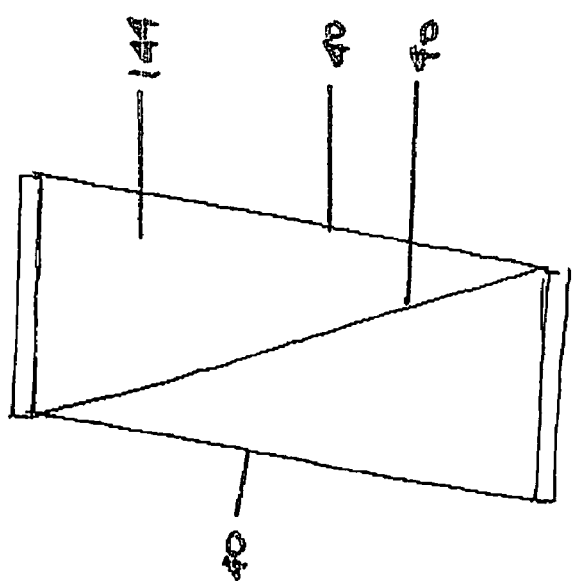

In FIGS. 75, 76 and 77, the SMA wires are shown as forming the sides of a series of triangles. Together, these are situated on the surface of a three dimensional body of elastomeric material 144. Contraction of alternate wires 40 causes elastomeric material 144 to twist as shown by arrow 146 in FIG. 77. Once again, the restoring force of elastomeric material 144 can return the body to the original configuration.

Contraction of all wires 40 together will cause the three dimensional body to elongate, as in the FIGS. 73 and 74 embodiment.

INDUSTRIAL APPLICABILITY

It will be apparent to one skilled in the art that the invention in its various aspects has wide industrial applicability, providing fasteners, fastening systems and other aspects for a plurality of industries.

The invention claimed is:

1. A fastener which includes:
    (a) a fastening element having a beam, an engagement means located on one side of the beam, a base and a flex point separate from the beam; and
    (b) actuating means attached to the fastening element and including a material adapted to contract when activated;
    wherein the beam is movable, upon contraction of the material, between an engagement position and a disengagement position, and wherein the base has a first arm and a second arm joined by the flex point, the beam being located at one end of the first arm and the flex point being located on the same side of the beam as the engagement means.

2. The fastener of claim 1, wherein the engagement means is located at or towards one end of the beam of the fastening element.

3. The fastener of claim 2, wherein the engagement means includes a projecting wedge.

4. The fastener of claim 1, wherein the material adapted to contract when activated is shape memory alloy wire.

5. The fastener of claim 4, wherein the shape memory alloy wire is contained within one or more grooves in the beam.

6. The fastener of claim 5, wherein the one or more grooves are located on one side of the beam and the engagement means is located on the opposite side of the beam.

7. The fastener of claim 1, wherein the beam is integral with the base.

8. The fastener of claim 1, wherein a bias means is located between the first and second arms.

9. The fastener of claim 8, wherein the bias means is a leaf spring.

10. The fastener of claim 1, which includes a microprocessor.

11. The fastener of claim 10, wherein the microprocessor is adapted to control energy delivery to the material adapted to contract when activated.

12. The fastener of claim 10, wherein the microprocessor is adapted to sense whether the engagement means is engaged or disengaged.

13. The fastener of claim 10, wherein the microprocessor is adapted to control temperature of the material adapted to contract when activated.

14. The fastener of claim 12, wherein the microprocessor is adapted to provide a report on whether the engagement means is engaged or disengaged.

15. The fastening system of claim 14, wherein the microprocessor is adapted to provide the report to a network of which the fastener forms a part.

* * * * *